(12) United States Patent
Ashrafi

(10) Patent No.: US 10,084,541 B2
(45) Date of Patent: Sep. 25, 2018

(54) SHORTER WAVELENGTH TRANSMISSION OF OAM BEAMS IN CONVENTIONAL SINGLE MODE FIBER

(71) Applicant: NxGen Partners IP, LLC, Dallas, TX (US)

(72) Inventor: Solyman Ashrafi, Plano, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 0 days.

(21) Appl. No.: 15/459,950

(22) Filed: Mar. 15, 2017

(65) Prior Publication Data

US 2017/0230115 A1     Aug. 10, 2017

Related U.S. Application Data

(63) Continuation-in-part of application No. 14/882,085, filed on Oct. 13, 2015, and a continuation-in-part of application No. 14/323,082, filed on Jul. 3, 2014, now Pat. No. 9,331,875.

(60) Provisional application No. 62/311,636, filed on Mar. 22, 2016, provisional application No. 62/063,028, filed on Oct. 13, 2014, provisional application No. 61/975,142, filed on Apr. 4, 2014.

(51) Int. Cl.
| | |
|---|---|
| *H04J 14/04* | (2006.01) |
| *H04B 10/25* | (2013.01) |
| *H04J 14/02* | (2006.01) |
| *H04B 10/516* | (2013.01) |

(52) U.S. Cl.
CPC ....... *H04B 10/2504* (2013.01); *H04B 10/516* (2013.01); *H04J 14/02* (2013.01)

(58) Field of Classification Search
CPC ...................................................... H04J 14/04
See application file for complete search history.

(56) References Cited

U.S. PATENT DOCUMENTS

| | | |
|---|---|---|
| 3,459,466 A | 8/1969 | Giordmaine |
| 3,614,722 A | 10/1971 | Jones |
| 4,379,409 A | 4/1983 | Primbsch et al. |
| 4,503,336 A | 3/1985 | Hutchin et al. |
| 4,736,463 A | 4/1988 | Chavez |
| 4,862,115 A | 8/1989 | Lee et al. |

(Continued)

OTHER PUBLICATIONS

Bozinovic et al., "Terabit-Scale Orbital Angular Momentum Mode Division Multiplexing in Fibers", Science vol. 340, Jun. 28, 2013.*

(Continued)

*Primary Examiner* — Shi K Li
(74) *Attorney, Agent, or Firm* — Gregory M. Howison

(57) ABSTRACT

A method for transmission of orbital angular momentum (OAM) data over an optical fiber involves generating an optical signal at a selected wavelength. A ratio of a diameter of a core of the optical fiber to the selected wavelength of the optical signal enables transmission of a predetermined number of orbital angular momentum modes over the optical fiber. The optical signal is modulated with at least one input data stream and an OAM signal is applied to the modulated optical signal to generate the OAM data signal. The OAM data signal is transmitted over the optical fiber using a fiber launcher. A received OAM data signal is processed to extract the at least one input data stream.

24 Claims, 35 Drawing Sheets

(56) References Cited

U.S. PATENT DOCUMENTS

| | | | |
|---|---|---|---|
| 5,051,754 | A | 9/1991 | Newberg |
| 5,220,163 | A | 6/1993 | Toughlian et al. |
| 5,222,071 | A | 6/1993 | Pezeshki et al. |
| 5,272,484 | A | 12/1993 | Labaar |
| 5,543,805 | A | 8/1996 | Thaniyavarn |
| 5,555,530 | A | 9/1996 | Meehan |
| 6,337,659 | B1 | 1/2002 | Kim |
| 6,992,829 | B1 | 1/2006 | Jennings et al. |
| 7,577,165 | B1 | 8/2009 | Barrett |
| 7,729,572 | B1 | 6/2010 | Pepper et al. |
| 7,792,431 | B2 | 9/2010 | Jennings et al. |
| 8,432,884 | B1 | 4/2013 | Ashrafi |
| 8,503,546 | B1 | 8/2013 | Ashrafi |
| 8,559,823 | B2 | 10/2013 | Izadpanah et al. |
| 8,811,366 | B2 | 8/2014 | Ashrafi |
| 9,077,577 | B1 | 7/2015 | Ashrafi |
| 2005/0254826 | A1 | 11/2005 | Jennings et al. |
| 2005/0259914 | A1 | 11/2005 | Padgett et al. |
| 2010/0013696 | A1 | 1/2010 | Schmitt et al. |
| 2012/0207470 | A1 | 8/2012 | Djordevic et al. |
| 2013/0027774 | A1 | 1/2013 | Bovino et al. |
| 2013/0235744 | A1 | 9/2013 | Chen et al. |
| 2014/0355624 | A1 | 12/2014 | Li et al. |
| 2015/0098697 | A1 | 4/2015 | Marom et al. |

OTHER PUBLICATIONS

Solyman Ashrafi, Channeling Radiation of Electrons in Crystal Lattices, Essays on Classical and Quantum Dynamics, Gordon and Breach Science Publishers, 1991.

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Performance Metrics and Design Considerations for a Free-Space Optical Orbital-Angular-Momentum Multiplexed Communication Link, The Optical Society, vol. 2, No. 4, Apr. 2015.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

Solyman Ashrafi, An Information Theoretic Framework to Increase Spectral Efficiency, IEEE Transactions on Information Theory, vol. XX, No. Y, Oct. 2014, Dallas, Texas.

Solyman Ashrafi, Acoustically induced stresses in elastic cylinders and their visualization, The Journal of the Acoustical Society of America 82(4):1378-1385, Sep. 1987.

Solyman Ashrafi, Splitting of channeling-radiation peaks in strained-layer superlattices, Journal of the Optical Society of America B 8(12), Nov. 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).

Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).

(56) References Cited

OTHER PUBLICATIONS

Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi, Future Mission Studies: Forecasting Solar Flux Directly From Its Chaotic Time Series, Computer Sciences Corp., Dec. 1991.

Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

H. Yao et al.; Patch Antenna Array for the Generation of Millimeter-wave Hermite-Gaussian Beams, IEEE Antennas and Wireless Propagation Letters; 2016.

Yongxiong Ren et al.; Experimental Investigation of Data Transmission Over a Graded-index Multimode Fiber Using the Basis of Orbital Angular Momentum Modes.

Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE Global TElecom. Conf. 3821-3826 (2014).

Li, X. et al.; Investigation of interference in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Vasnetsov, M. V., Pasko, V.A. & Soskin, M.S.; Analysis of orbital angular momentum of a misaligned optical beam; New Journal of Physics 7, 46 (2005).

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature Communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

Iskander, Magdy F.; Propagation Prediction Models for Wireless Communication Systems; IEEE Transactions on Microwave Theory and Techniques, vol. 50., No. 3, 662-673 (2002).

Wang, Jian, et al.; Terabit free-space data transmission employing orbital angular momentum multiplexing. Nature Photonics; 6, 488-496 (2012).

Katayama, Y., et al.; Wireless Data Center Networking with Steered-Beam mmWave Links; IEEE Wireless Communication Network Conference; 2011, 2179-2184 (2011).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

Rapport, T.S.; Millimeter Wave Mobile Communications for 5G Cellular: It Will Work!; IEEE Access, 1, 335-349 (2013).

\* cited by examiner

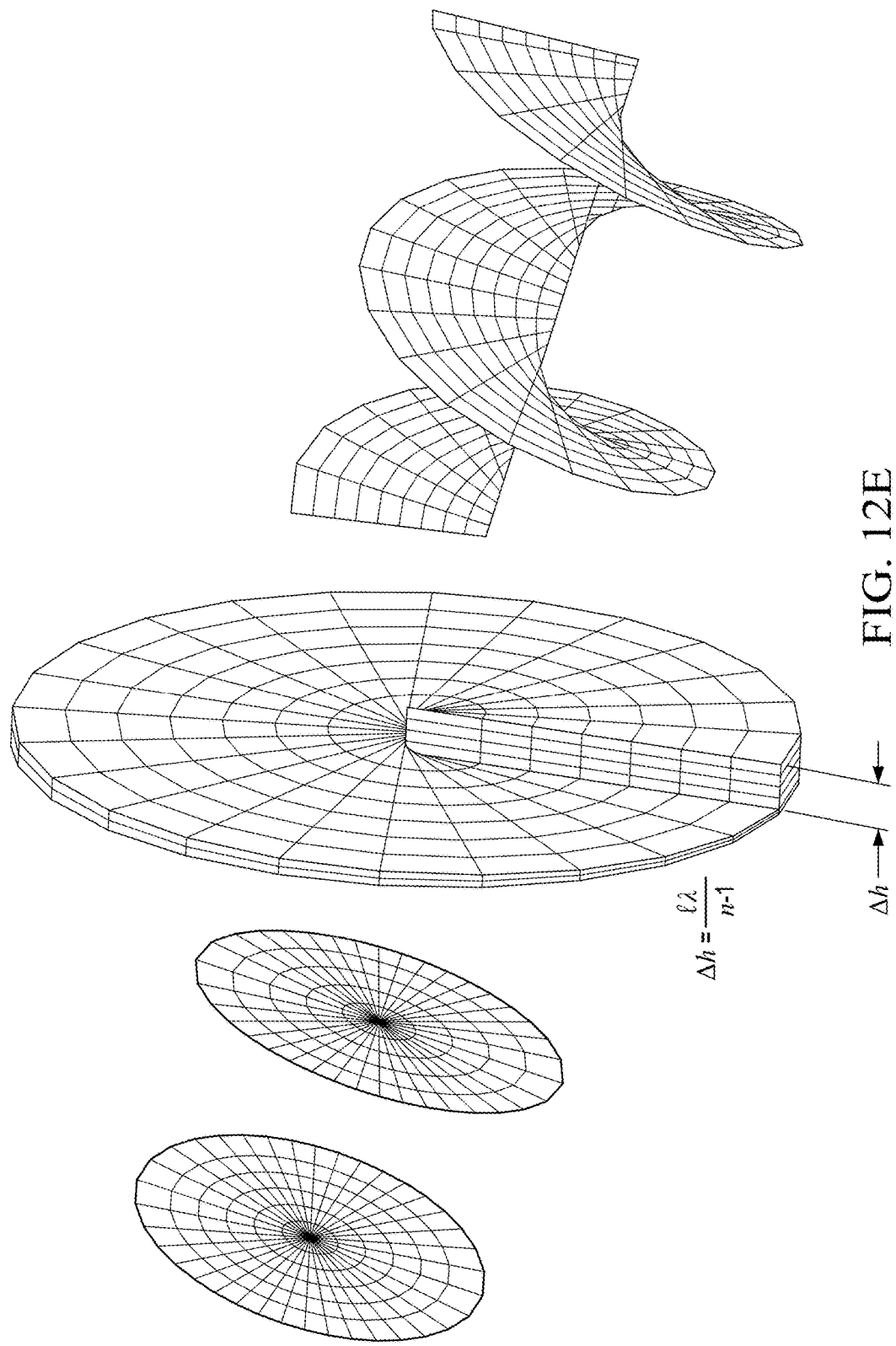

$$\begin{bmatrix} y_1 \\ y_2 \\ y_3 \end{bmatrix} = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} \\ h_{2,1} & h_{2,2} & h_{2,3} & h_{2,4} & h_{2,5} & h_{2,6} & h_{2,7} & h_{2,8} & h_{2,9} & h_{2,10} & h_{2,11} & h_{2,12} & h_{2,13} & h_{2,14} & h_{2,15} \\ h_{3,1} & h_{3,2} & h_{3,3} & h_{3,4} & h_{3,5} & h_{3,6} & h_{3,7} & h_{3,8} & h_{3,9} & h_{3,10} & h_{3,11} & h_{3,12} & h_{3,13} & h_{3,14} & h_{3,15} \end{bmatrix} \begin{bmatrix} x_{-2,1} \\ x_{-1,1} \\ x_{0,1} \\ x_{1,1} \\ x_{2,1} \\ x_{-2,2} \\ x_{-1,2} \\ x_{0,2} \\ x_{1,2} \\ x_{2,2} \\ x_{-2,3} \\ x_{-1,3} \\ x_{0,3} \\ x_{1,3} \\ x_{2,3} \end{bmatrix}$$

SHORTER WAVELENGTH TRANSMISSION OF OAM BEAMS IN CONVENTIONAL SINGLE MODE FIBER

CROSS-REFERENCE TO RELATED APPLICATIONS

This application claims benefit of U.S. Provisional Application Ser. No. 62/311,636, filed on Mar. 22, 2016, entitled SHORTER WAVELENGTH TRANSMISSION OF OAM BEAMS IN CONVENTIONAL SINGLE MODE FIBER, and is a Continuation-in-Part of U.S. patent application Ser. No. 14/882,085, entitled APPLICATION OF ORBITAL ANGULAR MOMENTUM TO FIBER, FSO AND RF, which claims benefit of U.S. Provisional Application No. 62/063,028, filed on Oct. 13, 2014, entitled APPLICATION OF ORBITAL ANGULAR MOMENTUM TO FIBER, FSO AND RF, each of which is incorporated by reference herein in their entirety.

TECHNICAL FIELD

The following disclosure relates to systems and methods for transmitting orbital angular momentum (OAM) beams, and more particularly to using shorter wavelengths for the transmission of OAM beams in a conventional single mode fiber.

BACKGROUND

The use of voice and data networks has greatly increased as the number of personal computing and communication devices, such as laptop computers, mobile telephones, Smartphones, tablets, et cetera, has grown. The astronomically increasing number of personal mobile communication devices has concurrently increased the amount of data being transmitted over the networks providing infrastructure for these mobile communication devices. As these mobile communication devices become more ubiquitous in business and personal lifestyles, the abilities of these networks to support all of the new users and user devices has been strained. Thus, a major concern of network infrastructure providers is the ability to increase their bandwidth in order to support the greater load of voice and data communications and particularly video that are occurring. Traditional manners for increasing the bandwidth in such systems have involved increasing the number of channels so that a greater number of communications may be transmitted, or increasing the speed at which information is transmitted over existing channels in order to provide greater throughput levels over the existing channel resources.

However, while each of these techniques have improved system bandwidths, existing technologies have taken the speed of communications to a level such that drastic additional speed increases are not possible, even though bandwidth requirements due to increased usage are continuing to grow exponentially. Additionally, the number of channels assigned for voice and data communications, while increasing somewhat, have not increased to a level to completely support the increasing demands of a voice and data intensive use society. Thus, there is a great need for some manner for increasing the bandwidth throughput within existing voice and data communication that increases the bandwidth on existing voice and data channels.

SUMMARY

The present invention, as disclosed and described herein, comprises a method for transmission of orbital angular momentum (OAM) data over an optical fiber involves generating an optical signal at a selected wavelength. A ratio of a diameter of a core of the optical fiber to the selected wavelength of the optical signal enables transmission of a predetermined number of orbital angular momentum modes over the optical fiber. The optical signal is modulated with at least one input data stream and an OAM signal is applied to the modulated optical signal to generate the OAM data signal. The OAM data signal is transmitted over the optical fiber using a fiber launcher. A received OAM data signal is processed to extract the at least one input data stream.

BRIEF DESCRIPTION OF THE DRAWINGS

For a more complete understanding, reference is now made to the following description taken in conjunction with the accompanying Drawings in which:

FIG. 12E illustrates a spiral phase plate;

FIG. 24 illustrates a fixed channel matrix;

DETAILED DESCRIPTION

Figure 1:
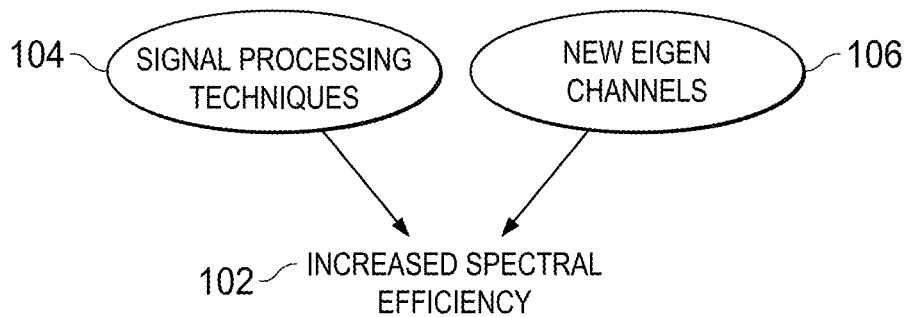
FIG. 1 illustrates various techniques for increasing spectral efficiency within a transmitted signal.

Referring now to the drawings, wherein like reference numbers are used herein to designate like elements throughout, the various views and embodiments of the use of shorter wavelength transmission of OAM beam over a conventional single mode fiber are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Achieving higher data capacity is perhaps one of the primary interest of the communications community. This is led to the investigation of using different physical properties of a light wave for communications, including amplitude, phase, wavelength and polarization. Orthogonal modes in spatial positions are also under investigation and seemed to be useful as well. Generally these investigative efforts can be summarized in 2 categories: 1) encoding and decoding more bets on a single optical pulse; a typical example is the use of advanced modulation formats, which encode information on amplitude, phase and polarization states, and 2) multiplexing and demultiplexing technologies that allow parallel propagation of multiple independent data channels, each of which is addressed by different light property (e.g., wavelength, polarization and space, corresponding to wavelength-division multiplexing (WDM), polarization-division multiplexing (PDM) and space division multiplexing (SDM), respectively).

The recognition that orbital angular momentum (OAM) has applications in communication has made it an interesting research topic. It is well-known that a photon can carry both spin angular momentum and orbital angular momentum. Contrary to spin angular momentum (e.g., circularly polarized light), which is identified by the electrical field erection, OAM is usually carried by a light beam with a helical phase front. Due to the helical phase structure, an OAM carrying beam usually has an annular intensity profile with a phase singularity at the beam center. Importantly, depending on discrete twisting speed of the helical phase, OAM beams can be quantified is different states, which are completely distinguishable while propagating coaxially. This property allows OAM beams to be potentially useful in either of the 2 aforementioned categories to help improve the performance of a free space or fiber communication system. Specifically, OAM states could be used as a different dimension to encode bits on a single pulse (or a single photon), or be used to create additional data carriers in an SDM system.

There are some potential benefits of using OAM for communications, some specially designed novel fibers allow less mode coupling and cross talk while propagating in fibers. In addition, OAM beams with different states share a ring-shaped beam profile, which indicate rotational insensitivity for receiving the beams. Since the distinction of OAM beams does not rely on the wavelength or polarization, OAM multiplexing could be used in addition to WDM and PDM techniques so that potentially improve the system performance may be provided.

Referring now to the drawings, and more particularly to FIG. 1, wherein there is illustrated two manners for increasing spectral efficiency of a communications system. In general, there are basically two ways to increase spectral efficiency 102 of a communications system. The increase may be brought about by signal processing techniques 104 in the modulation scheme or using multiple access technique. Additionally, the spectral efficiency can be increase by creating new Eigen channels 106 within the electromagnetic propagation. These two techniques are completely independent of one another and innovations from one class can be added to innovations from the second class. Therefore, the combination of this technique introduced a further innovation.

Spectral efficiency 102 is the key driver of the business model of a communications system. The spectral efficiency is defined in units of bit/sec/hz and the higher the spectral efficiency, the better the business model. This is because spectral efficiency can translate to a greater number of users, higher throughput, higher quality or some of each within a communications system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 106, the innovations include diversity techniques including space and polarization diversity as well as multiple input/multiple output (MIMO) where uncorrelated radio paths create independent Eigen channels and propagation of electromagnetic waves.

Figure 2:
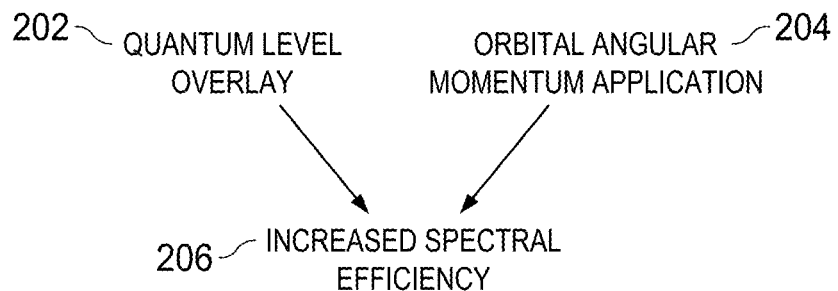
FIG. 2 illustrates a particular technique for increasing spectral efficiency within a transmitted signal.

Referring now to FIG. 2, the present communication system configuration introduces two techniques, one from the signal processing techniques 104 category and one from the creation of new eigen channels 106 category that are entirely independent from each other. Their combination provides a unique manner to disrupt the access part of an end to end communications system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access. The first technique involves the use of a new signal processing technique using new orthogonal signals to upgrade QAM modulation using non sinusoidal functions. This is referred to as quantum level overlay (QLO) 202. The second technique involves the application of new electromagnetic wavefronts using a property of electromagnetic waves or photon, called orbital angular momentum (QAM) 104. Application of each of the quantum level overlay techniques 202 and orbital angular momentum application 204 uniquely offers orders of magnitude higher spectral efficiency 206 within communication systems in their combination.

With respect to the quantum level overlay technique 202, new eigen functions are introduced that when overlapped (on top of one another within a symbol) significantly increases the spectral efficiency of the system. The quantum level overlay technique 302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 204, this technique introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a communications link. OAM beams are interesting in communications due to their potential ability in special multiplexing multiple independent data carrying channels.

With respect to the combination of quantum level overlay techniques 202 and orbital angular momentum application 204, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (TOT), to Wi-Fi, to Bluetooth, to a personal device cable replacement, to an RF and FSO hybrid system, to Radar, to electromagnetic tags and to all types of wireless access.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Telecom operators and vendors are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 202 has an advantage that the independent channels are created within the symbols without needing new antennas. This will have a tremendous cost and time benefit compared to other techniques. Also, the quantum layer overlay technique 202 is a physical layer technique, which means there are other techniques at higher layers of the protocol that can all ride on top of the QLO techniques 202 and thus increase the spectral efficiency even further. QLO technique 202 uses standard QAM modulation used in OFDM based multiple access technologies such as WIMAX or LTE. QLO technique 202 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 3:
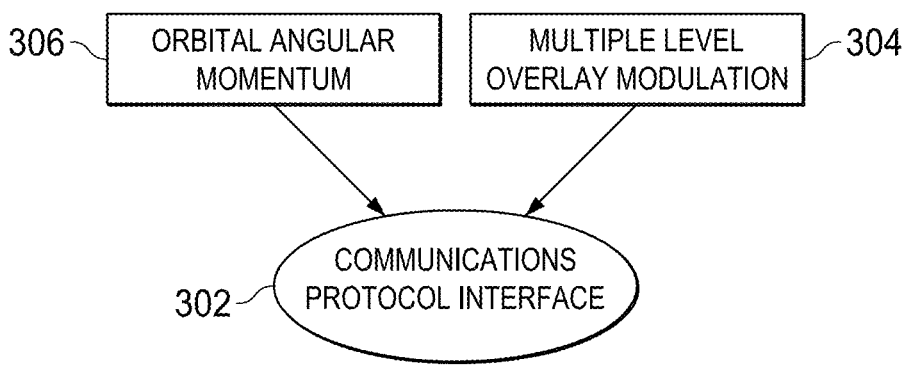
FIG. 3 illustrates a general overview of the manner for providing communication bandwidth between various communication protocol interfaces.

Referring now more particularly to FIG. 3, there is illustrated a general overview of the manner for providing improved communication bandwidth within various communication protocol interfaces 302, using a combination of multiple level overlay modulation 304 and the application of orbital angular momentum 306 to increase the number of communications channels.

The various communication protocol interfaces 302 may comprise a variety of communication links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 304 with orbital angular momentum (OAM) technique 306, a higher throughput over various types of communication links 302 may be achieved. The use of multiple level overlay modulation alone without OAM increases the spectral efficiency of communication links 302, whether wired, optical, or wireless. However, with OAM, the increase in spectral efficiency is even more significant.

Multiple overlay modulation techniques 304 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 304. Within the multiple level overlay modulation technique 304, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form:

$$\Delta t \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 306 provides a twist to wave fronts of the electromagnetic fields carrying the data stream that may enable the transmission of multiple data streams on the same frequency, wavelength, or other signal-supporting mechanism. Similarly, other orthogonal signals may be applied to the different data streams to enable transmission of multiple data streams on the same frequency, wavelength or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 4:
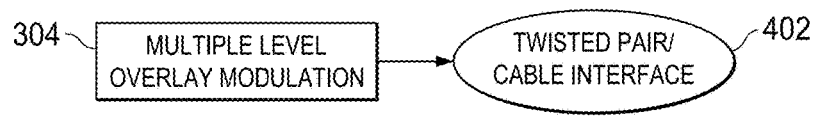
FIG. 4 illustrates the manner for utilizing multiple level overlay modulation with twisted pair/cable interfaces.

Referring now to FIG. 4, there is illustrated a further communication implementation technique using the above described techniques as twisted pairs or cables carry electrons (not photons). Rather than using each of the multiple level overlay modulation 304 and orbital angular momentum techniques 306, only the multiple level overlay modulation 304 can be used in conjunction with a single wireline interface and, more particularly, a twisted pair communication link or a cable communication link 402. The operation of the multiple level overlay modulation 404, is similar to that discussed previously with respect to FIG. 3, but is used by itself without the use of orbital angular momentum techniques 306, and is used with either a twisted pair communication link or cable interface communication link 402 or with fiber optics, free space optics, RF used in cellular, backhaul and satellite, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), Internet of Things (IOT), Wi-Fi, Bluetooth, a personal device cable replacement, an RF and FSO hybrid system, Radar, electromagnetic tags and all types of wireless access.

Figure 5:
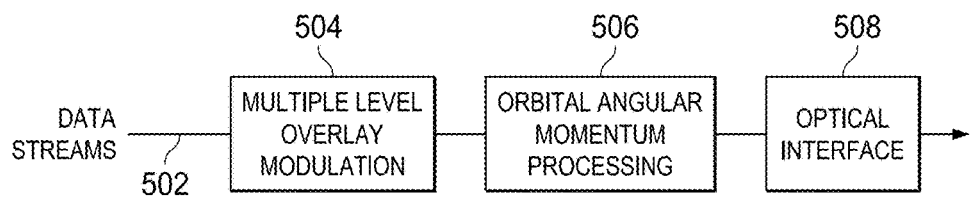
FIG. 5 illustrates a general block diagram for processing a plurality of data streams within an optical communication system.

Referring now to FIG. 5, there is illustrated a general block diagram for processing a plurality of data streams 502 for transmission in an optical communication system. The multiple data streams 502 are provided to the multi-layer overlay modulation circuitry 504 wherein the signals are modulated using the multi-layer overlay modulation technique. The modulated signals are provided to orbital angular momentum processing circuitry 506 which applies a twist to each of the wave fronts being transmitted on the wavelengths of the optical communication channel. The twisted waves are transmitted through the optical interface 508 over an optical or other communications link such as an optical fiber or free space optics communication system. FIG. 5 may also illustrate an RF mechanism wherein the interface 508 would comprise and RF interface rather than an optical interface.

Figure 6:
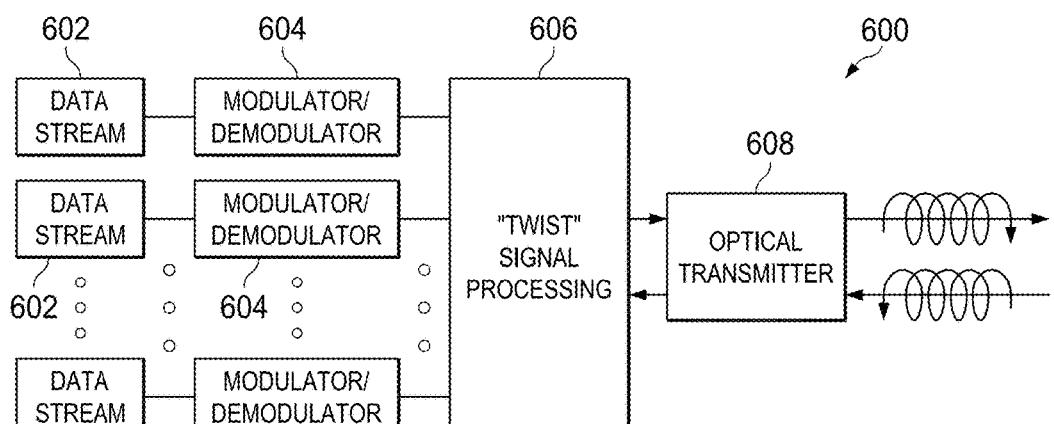
FIG. 6 is a functional block diagram of a system for generating orbital angular momentum within a communication system.

Referring now more particularly to FIG. 6, there is illustrated a functional block diagram of a system for generating the orbital angular momentum "twist" within a communication system, such as that illustrated with respect to FIG. 3, to provide a data stream that may be combined with multiple other data streams for transmission upon a same wavelength or frequency. Multiple data streams 602 are provided to the transmission processing circuitry 600. Each of the data streams 602 comprises, for example, an end to end link connection carrying a voice call or a packet connection transmitting non-circuit switch packed data over a data connection. The multiple data streams 602 are processed by modulator/demodulator circuitry 604. The modulator/demodulator circuitry 604 modulates the received data stream 602 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 606. The orbital angular momentum signal processing block 606 applies in one embodiment an orbital angular momentum to a signal. In other embodiments the processing block 606 can apply any orthogonal function to a signal being transmitted. These orthogonal functions can be spatial Bessel functions, Laguerre-Gaussian functions, Hermite-Gaussian functions or any other orthogonal function. Each of the modulated data streams from the modulator/demodulator 604 are provided a different orbital angular momentum by the orbital angular momentum electromagnetic block 606 such that each of the modulated data streams have a unique and different orbital angular momentum associated therewith. Each of the modulated signals having an associated orbital angular momentum are provided to an optical transmitter 608 that transmits each of the modulated data streams having a unique orbital angular momentum on a same wavelength. Each wavelength has a selected number of bandwidth slots B and may have its data transmission capability increase by a factor of the number of degrees of orbital angular momentum l that are provided from the OAM electromagnetic block 606. The optical transmitter 608 transmitting signals at a single wavelength could transmit B groups of information. The optical transmitter 608 and OAM electromagnetic block 606 may transmit l×B groups of information according to the configuration described herein.

In a receiving mode, the optical transmitter 608 will have a wavelength including multiple signals transmitted therein having different orbital angular momentum signals embedded therein. The optical transmitter 608 forwards these signals to the OAM signal processing block 606, which separates each of the signals having different orbital angular momentum and provides the separated signals to the demodulator circuitry 604. The demodulation process extracts the data streams 602 from the modulated signals and provides it at the receiving end using the multiple layer overlay demodulation technique.

Figure 7:
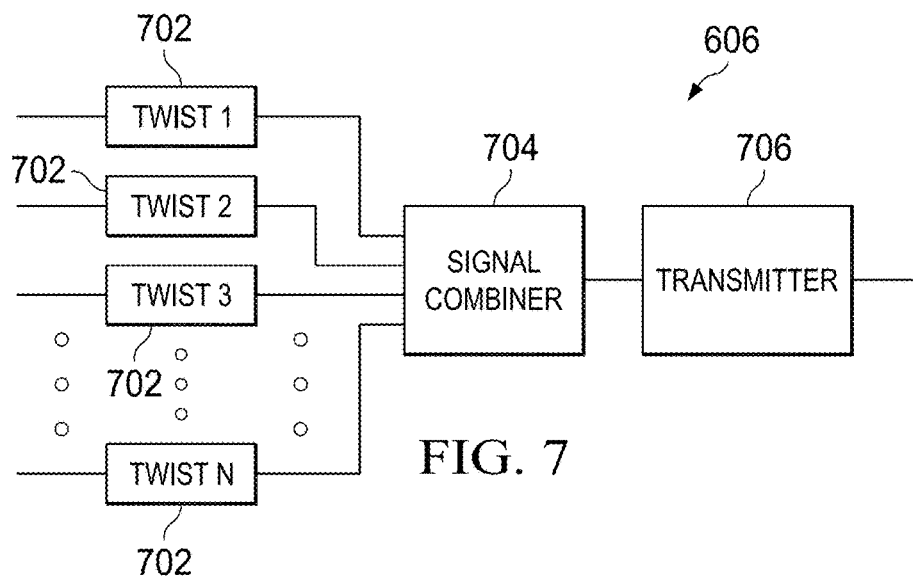
FIG. 7 is a functional block diagram of the orbital angular momentum signal processing block of FIG. 6.

Referring now to FIG. 7, there is provided a more detailed functional description of the OAM signal processing block 606. Each of the input data streams are provided to OAM circuitry 702. Each of the OAM circuitry 702 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 702 are unique to the data stream that is provided thereto. An infinite number of orbital angular momentums may be applied to different input data streams using many different currents. Each of the separately generated data streams are provided to a signal combiner 704, which combines/multiplexes the signals onto a wavelength for transmission from the transmitter 706. The combiner 704 performs a spatial mode division multiplexing to place all of the signals upon a same carrier signal in the space domain.

Figure 8:
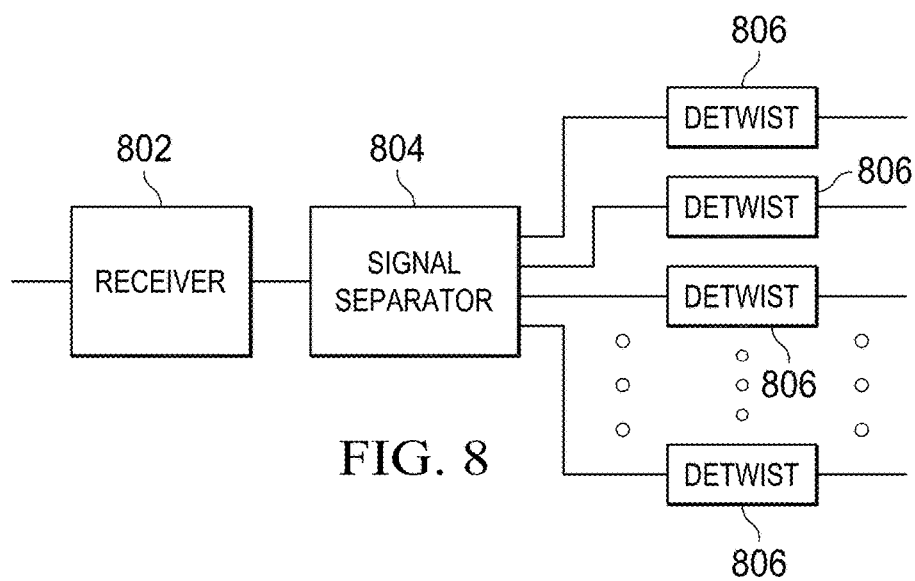
FIG. 8 is a functional block diagram illustrating the manner for removing orbital angular momentum from a received signal including a plurality of data streams.

Referring now to FIG. 8, there is illustrated the manner in which the OAM processing circuitry 606 may separate a received signal into multiple data streams. The receiver 802 receives the combined OAM signals on a single wavelength and provides this information to a signal separator 804. The signal separator 804 separates each of the signals having different orbital angular momentums from the received wavelength and provides the separated signals to OAM de-twisting circuitry 806. The OAM de-twisting circuitry 806 removes the associated OAM twist from each of the associated signals and provides the received modulated data stream for further processing. The signal separator 804 separates each of the received signals that have had the orbital angular momentum removed therefrom into individual received signals. The individually received signals are provided to the receiver 802 for demodulation using, for example, multiple level overlay demodulation as will be more fully described herein below.

Figure 9:
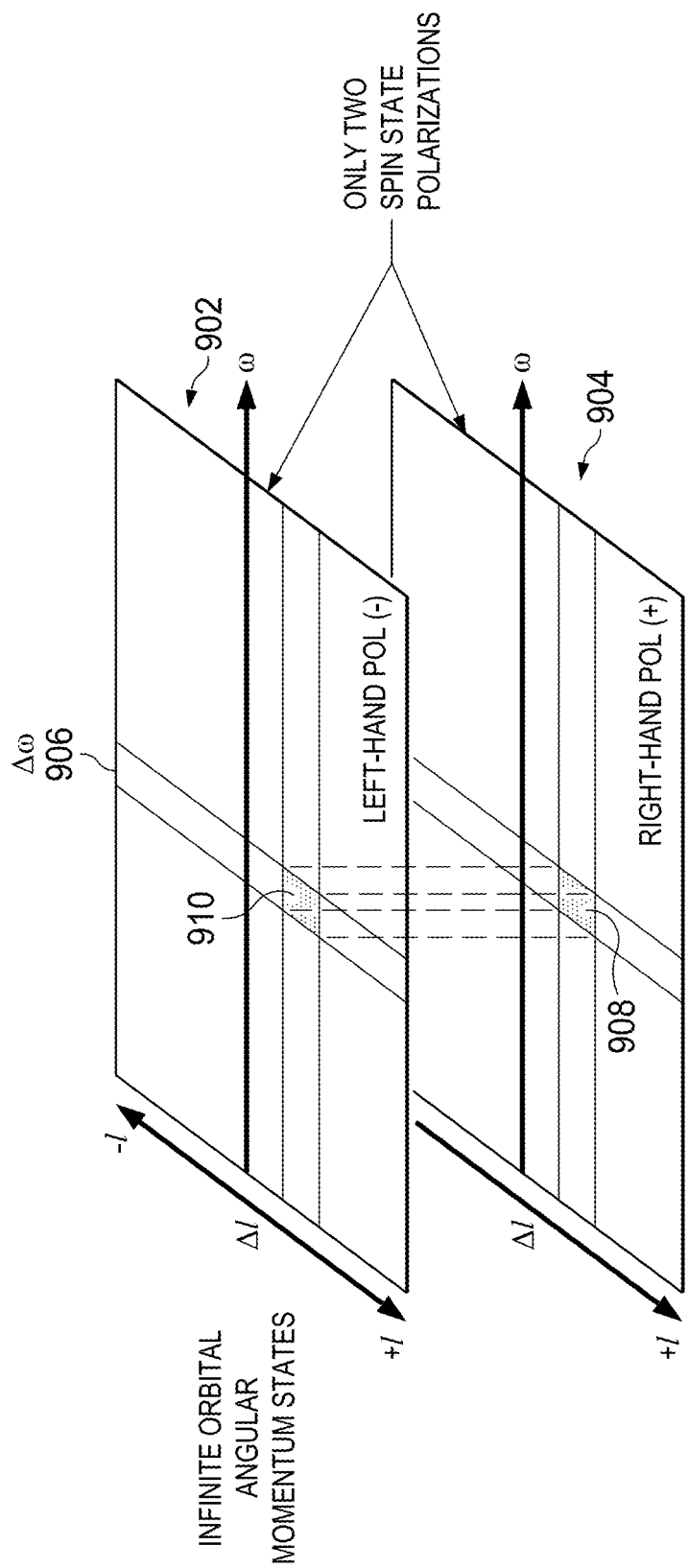
FIG. 9 illustrates a single wavelength having two quanti-spin polarizations providing an infinite number of signals having various orbital angular momentums associated therewith.

FIG. 9 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 902 represents the potentially available signals for a left handed signal polarization, while the bottom grid 904 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 906 in both the left handed polarization plane 902 and the right handed polarization plane 904 can provide an infinite number of signals at different orbital angular momentum states Δl. Blocks 908 and 910 represent a particular signal having an orbital angular momentum Δl at a frequency Δω or wavelength in both the right handed polarization plane 904 and left handed polarization plane 910, respectively. By changing to a different orbital angular momentum within the same frequency Δω or wavelength 906, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 9, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 10A:
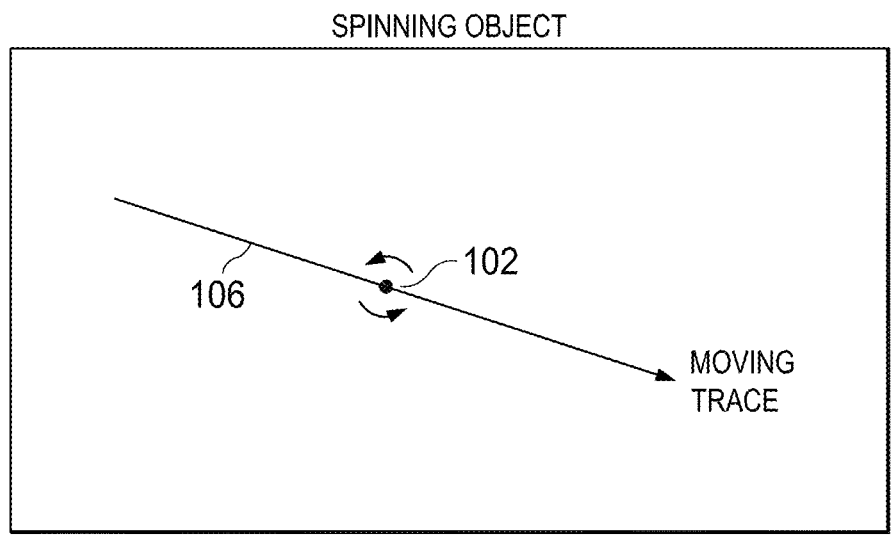
FIG. 10A illustrates an object with only a spin angular momentum.
Figure 10B:
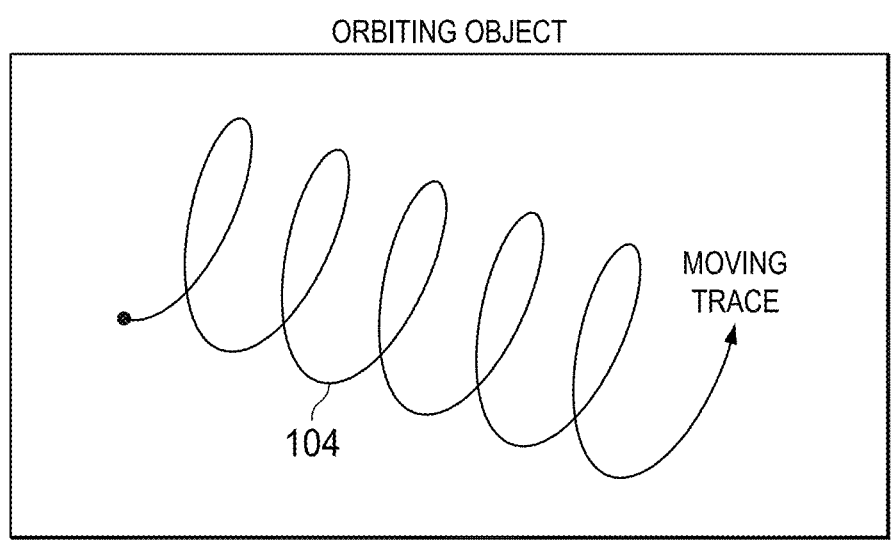
FIG. 10B illustrates an object with an orbital angular momentum.
Figure 10C:
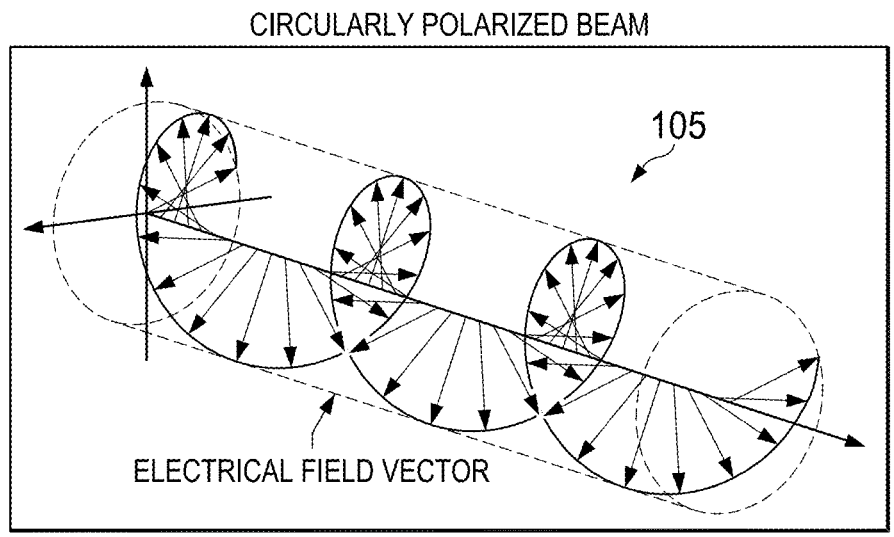
FIG. 10C illustrates a circularly polarized beam carrying spin angular momentum.
Figure 10D:
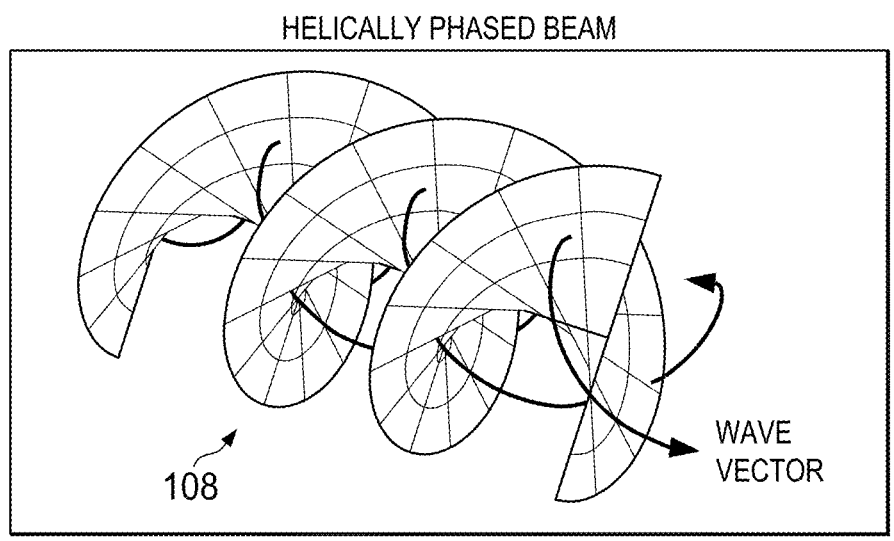
FIG. 10D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 1002), or orbiting around an axis 1006 (i.e., OAM 1004), as shown in FIGS. 10A and 10B, respectively. A light beam may also have rotational motion as it propagates. In paraxial approximation, a light beam carries SAM 1002 if the electrical field rotates along the beam axis 1006 (i.e., circularly polarized light 1005), and carries OAM 1004 if the wave vector spirals around the beam axis 1006, leading to a helical phase front 1008, as shown in FIGS. 10C and 10D. In its analytical expression, this helical phase front 1008 is usually related to a phase term of exp(ilθ) in the transverse plane, where θ refers to the angular coordinate, and l is an integer indicating the number of intertwined helices (i.e., the number of a phase shifts along the circle around the beam axis). l could be a positive, negative integer or zero, corresponding to clockwise, counterclockwise phase helices or a Gaussian beam with no helix, respectively.

Two important concepts relating to OAM include: 1) OAM and polarization: As mentioned above, an OAM beam is manifested as a beam with a helical phase front and therefore a twisting wavevector, while polarization states can only be connected to SAM 1002. A light beam carries SAM 1002 of ±h/2π (h is Plank's constant) per photon if it is left or right circularly polarized, and carries no SAM 1002 if it is linearly polarized. Although the SAM 1002 and OAM 1004 of light can be coupled to each other under certain scenarios, they can be clearly distinguished for a paraxial light beam. Therefore, with the paraxial assumption, OAM 1004 and polarization can be considered as two independent properties of light.

2) OAM beam and Laguerre-Gaussian (LG) beam: In general, an OAM-carrying beam could refer to any helically phased light beam, irrespective of its radial distribution (although sometimes OAM could also be carried by a non-helically phased beam). LG beam is a special subset among all OAM-carrying beams, due to that the analytical expression of LG beams are eigen-solutions of paraxial form of the wave equation in a cylindrical coordinates. For an LG beam, both azimuthal and radial wavefront distributions are well defined, and are indicated by two index numbers, l and p, of which l has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same l index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where ∇ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electronic states (the A μ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the A μ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

Hamiltonian (total energy)

$$H = \sum_i m_i \gamma_i c^2 + \frac{\varepsilon_0}{2} \int d^3 x (|E|^2 + c^2 |B|^2)$$

conservation of energy $$\frac{dU^{mech}}{dt} + \frac{dU^{em}}{dt} + \oint_{s'} d^2 x' \hat{n}' \cdot S = 0$$

The space symmetry, i.e., the conservation of system linear momentum representing the electromagnetic Doppler shift can be represented by the equations:

linear momentum $$p = \sum_i m_i \gamma_i v_i + \varepsilon_0 \int d^3 x (E \times B)$$

conservation of linear momentum $$\frac{dp^{mech}}{dt} + \frac{dp^{em}}{dt} + \oint_{s'} d^2 x' \hat{n}' \cdot T = 0$$

The conservation of system center of energy is represented by the equation:

$$R = \frac{1}{H}\sum_i (x_i - x_0)m_i\gamma_i c^2 + \frac{\varepsilon_0}{2H}\int d^3x(x-x_0)(|E|^2 + c^2|B|^2)$$

Similarly, the conservation of system angular momentum, which gives rise to the azimuthal Doppler shift is represented by the equation:

conservation of angular momentum $$\frac{dJ^{mech}}{dt} + \frac{dJ^{em}}{dt} + \oint_{s'} d^2x'\hat{n}' \cdot M = 0$$

For radiation beams in free space, the EM field angular momentum $J^{em}$ can be separated into two parts:

$$J^{em} = \varepsilon_0\int_{V'} d^3x'(E \times A) + \varepsilon_0\int_{V'} d^3x'E_i[(x'-x_0)\times \nabla]A_i$$

For each singular Fourier mode in real valued representation:

$$J^{em} = -i\frac{\varepsilon_0}{2\omega}\int_{V'} d^3x'(E^* \times E) - i\frac{\varepsilon_0}{2\omega}\int_{V'} d^3x'E_i[(x'-x_0)\times \nabla]E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em}=L^{em}+S^{em}$ are radiated all the way to the far field.

By using Poynting theorem, the optical vorticity of the signals may be determined according to the optical velocity equation:

$$\frac{\partial U}{\partial t} + \nabla \cdot S = 0, \quad \text{continuity equation}$$

where S is the Poynting vector $$S = \tfrac{1}{4}(E \times H^* + E^* \times h),$$

and U is the energy density $$U = \tfrac{1}{4}(\varepsilon|E|^2 + \mu_0|H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left(\frac{E \times H^* + E^* \times H}{\varepsilon|E|^2 + \mu_0|H|^2}\right)$$

Figure 11A:
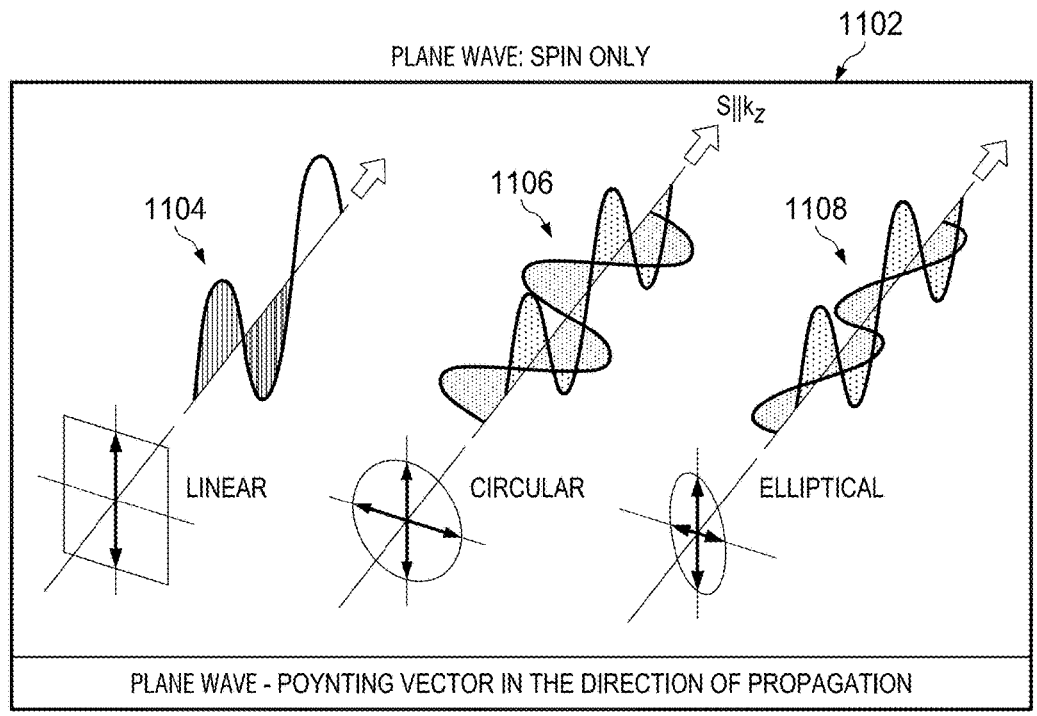
FIG. 11A illustrates a plane wave having only variations in the spin angular momentum.
Figure 11B:
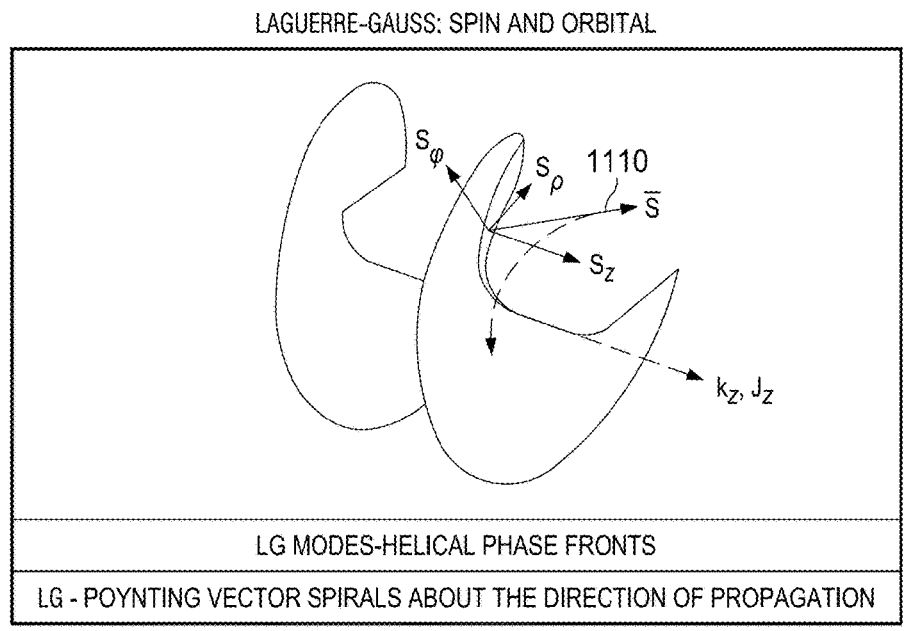
FIG. 11B illustrates a signal having both spin and orbital angular momentum applied thereto.

Referring now to FIGS. 11A and 11B, there is illustrated the manner in which a signal and its associated Poynting vector in a plane wave situation. In the plane wave situation illustrated generally at 1102, the transmitted signal may take one of three configurations. When the electric field vectors are in the same direction, a linear signal is provided, as illustrated generally at 1104. Within a circular polarization 1106, the electric field vectors rotate with the same magnitude. Within the elliptical polarization 1108, the electric field vectors rotate but have differing magnitudes. The Poynting vector remains in a constant direction for the signal configuration to FIG. 11A and always perpendicular to the electric and magnetic fields. Referring now to FIG. 11B, when a unique orbital angular momentum is applied to a signal as described here and above, the Poynting vector S 1110 will spiral about the direction of propagation of the signal. This spiral may be varied in order to enable signals to be transmitted on the same frequency as described herein.

Figure 12A:
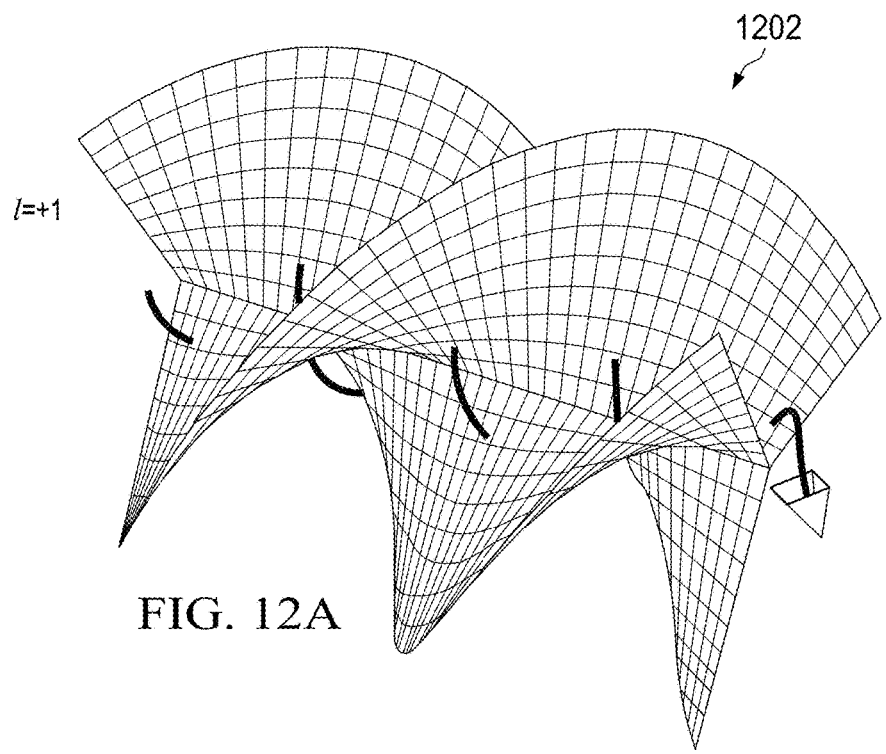
FIGS. 12A-12C illustrate various signals having different orbital angular momentum applied thereto.
Figure 12B:
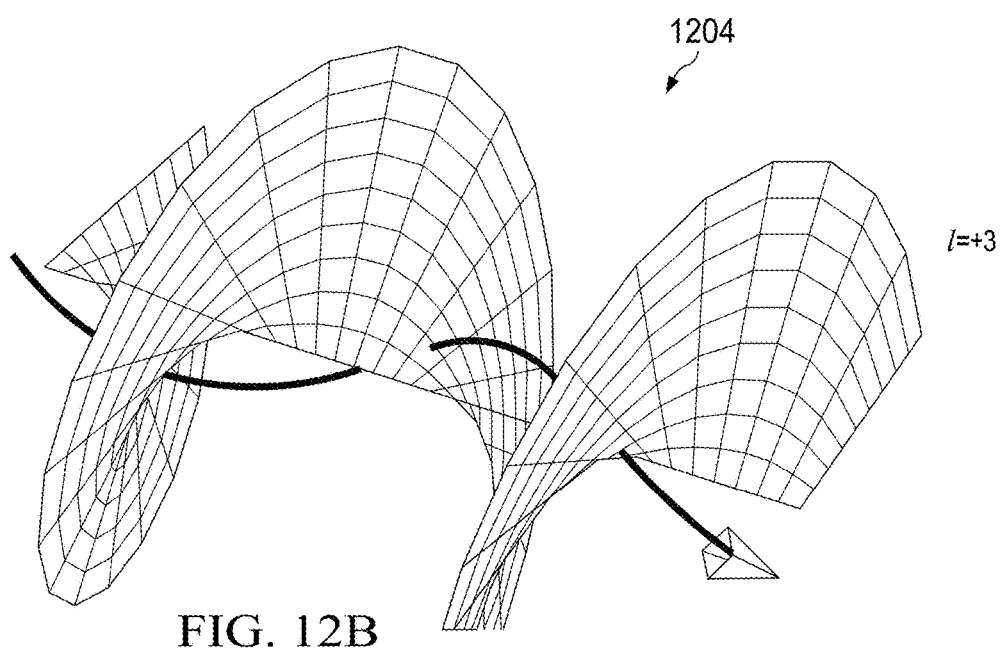
Figure 12C:
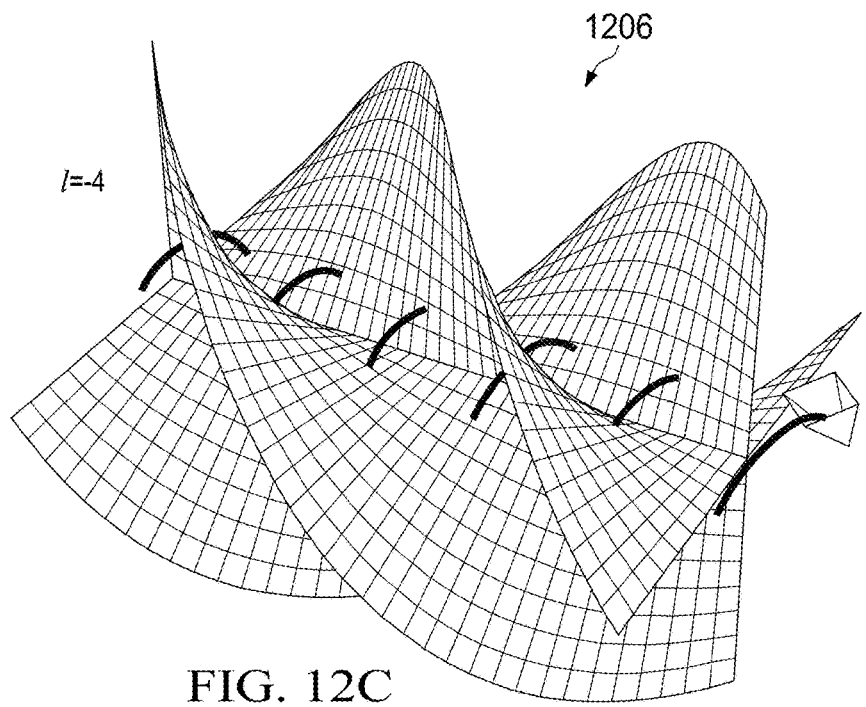

FIGS. 12A through 12C illustrate the differences in signals having different helicity (i.e., orbital angular momentums). Each of the spiraling Poynting vectors associated with the signals 1202, 1204, and 1206 provide a different shaped signal. Signal 1202 has an orbital angular momentum of +1, signal 1204 has an orbital angular momentum of +3, and signal 1206 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 12D:
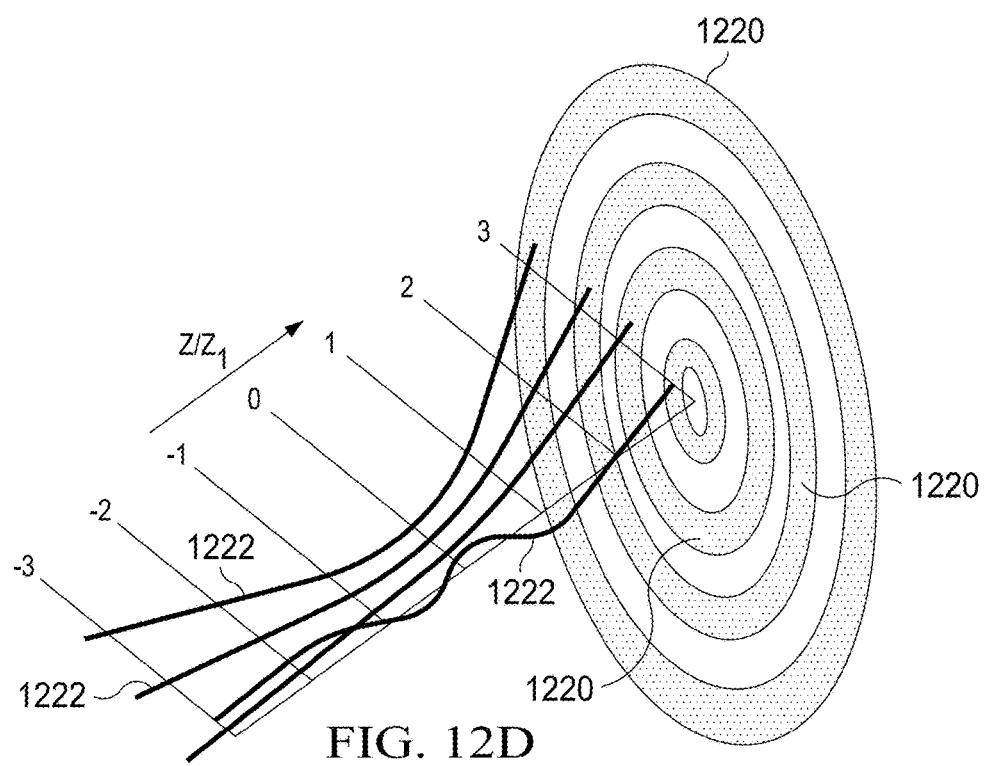
FIG. 12D illustrates a propagation of Poynting vectors for various Eigen modes.

FIG. 12D illustrates the propagation of Poynting vectors for various Eigen modes. Each of the rings 1220 represents a different Eigen mode or twist representing a different orbital angular momentum within the same frequency. Each of these rings 1220 represents a different orthogonal channel. Each of the Eigen modes has a Poynting vector 1222 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "I" or the amount of twist or OAM applied to the signal. Also, use of the orthogonal functions discussed herein above may also be multiplexed together onto a same signal in order to transmit multiple streams of information. The helicity index may be positive or negative. In wireless communications, different topological charges/orthogonal functions can be created and muxed together and de-muxed to separate the topological charges charges/orthogonal functions. The signals having different orthogonal function are spatially combined together on a same signal but do not interfere with each other since they are orthogonal to each other.

The topological charges ls can be created using Spiral Phase Plates (SPPs) as shown in FIG. 12E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

While the application of orbital angular momentum to various signals allow the signals to be orthogonal to each other and used on a same signal carrying medium, other orthogonal function/signals can be applied to data streams to create the orthogonal signals on the same signal media carrier.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta (Δf), a given signal transmitted through it in minimum time Δt will have an envelope described by certain time-bandwidth minimizing signals. The time-bandwidth products for these signals take the form;

$$\Delta t \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms. These types of orthogonal signals that reduce the time bandwidth product and thereby increase the spectral efficiency of the channel.

Hermite-Gaussian polynomials are one example of a classical orthogonal polynomial sequence, which are the Eigenstates of a quantum harmonic oscillator. Signals based on Hermite-Gaussian polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre-Gaussian polynomials. Q-functions are another class of functions that can be employed as a basis for MLO signals.

In addition to the time bandwidth minimization described above, the plurality of data streams can be processed to provide minimization of the Space-Momentum products in spatial modulation. In this case:

$$\Delta x \Delta p = \frac{1}{2}$$

Processing of the data streams in this manner create wavefronts that are spatial. The processing creates wavefronts that are also orthogonal to each other like the OAM twisted functions but these comprise different types of orthogonal functions that are in the spatial domain rather than the temporal domain.

The above described scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Hermite Gaussian Beams

Hermite Gaussian beams may also be used for transmitting orthogonal data streams. In the scalar field approximation (e.g. neglecting the vector character of the electromagnetic field), any electric field amplitude distribution can be represented as a superposition of plane waves, i.e. by:

$$E \propto \int\int \frac{dk_x dk_y}{(2\pi)^2} A(k_x, k_y) e^{ik_x x + ik_y y + ik_z z + iz\sqrt{k^2 - k_x^2 - k_y^2}}$$

This representation is also called angular spectrum of plane waves or plane-wave expansion of the electromagnetic field. Here $A(k_x, k_y)$ is the amplitude of the plane wave. This representation is chosen in such a way that the net energy flux connected with the electromagnetic field is towards the propagation axis z. Every plane wave is connected with an energy flow that has direction k. Actual lasers generate a spatially coherent electromagnetic field which has a finite transversal extension and propagates with moderate spreading. That means that the wave amplitude changes only slowly along the propagation axis (z-axis) compared to the wavelength and finite width of the beam. Thus, the paraxial approximation can be applied, assuming that the amplitude function $A(k_x, k_y)$ falls off sufficiently fast with increasing values of $(k_x, k_y)$.

Two principal characteristics of the total energy flux can be considered: the divergence (spread of the plane wave amplitudes in wave vector space), defined as:

$$\text{Divergence} \propto \int\int \frac{dk_x dk_y}{(2\pi)^2} (K_x^2 + K_y^2) |A(k_x, k_y)|^2$$

and the transversal spatial extension (spread of the field intensity perpendicular to the z-direction) defined as:

$$\text{Transversal Extention} \propto \int_{-\infty}^{\infty} dx \int_{-\infty}^{\infty} dy (x^2 + y^2) |E|^2 =$$

$$\int\int \frac{dk_x dk_y}{(2\pi)^2} \left[ \left|\frac{\partial A}{\partial x}\right|^2 + \left|\frac{\partial A}{\partial y}\right|^2 \right]$$

Let's now look for the fundamental mode of the beam as the electromagnetic field having simultaneously minimal divergence and minimal transversal extension, i.e. as the field that minimizes the product of divergence and extension. By symmetry reasons, this leads to looking for an amplitude function minimizing the product:

$$\left[ \int_{-\infty}^{\infty} \frac{dk_x}{(2\pi)} k_x^2 |A|^2 \right] \left[ \int_{-\infty}^{\infty} \frac{dk_x}{(2\pi)} \left|\frac{\partial A}{\partial k_x}\right|^2 \right] = \frac{\|A\|^4}{(8\pi^2)^2}$$

Thus, seeking the field with minimal divergence and minimal transversal extension can lead directly to the fundamental Gaussian beam. This means that the Gaussian beam is the mode with minimum uncertainty, i.e. the product of its sizes in real space and wave-vector space is the theoretical minimum as given by the Heisenberg's uncertainty principle of Quantum Mechanics. Consequently, the Gaussian mode has less dispersion than any other optical field of the same size, and its diffraction sets a lower threshold for the diffraction of real optical beams.

Hermite-Gaussian beams are a family of structurally stable laser modes which have rectangular symmetry along the propagation axis. In order to derive such modes, the simplest approach is to include an additional modulation of the form:

$$E_{m,n}^H = \int_{-\infty}^{\infty} \frac{dk_x dk_y}{(2\pi)^2} (ik_x)^m (ik_y)^n e^S$$

$$S(k_x, k_y, x, y, z) = ik_x x + ik_y y + ik_z z - \frac{w_0}{4}\left(1 + i\frac{Z}{Z_R}\right)[k_x^2 + k_y^2]$$

The new field modes occur to be differential derivatives of the fundamental Gaussian mode $E_0$.

$$E_{m,n}^H = \frac{\partial^{m+n}}{\partial x^m \partial y^n} E_0$$

Looking at the explicit form E0 shows that the differentiations in the last equation lead to expressions of the form:

$$\frac{\partial^P}{\partial x^P} e^{(-\alpha x^2)}$$

with some constant p and α. Using now the definition of Hermits' polynomials, $$H_p(x) = (-1)^p e^{(x^2)} \frac{d^P}{dx^P} e^{(-\alpha x^2)}$$

Then the field amplitude becomes $$E_{m,n}^H(x, y, z) = \sum_m \sum_n C_{mn} E_0 \frac{w_0}{w(z)} H_m\left(\sqrt{2}\frac{x}{w(z)}\right)$$

$$H_n\left(\sqrt{2}\frac{y}{w(z)}\right)e^{\frac{-(x^2+y^2)}{w(z)^2}} e^{-j(m+n+1)\tan^{-1} z/z_R} e^{\frac{-(x^2+y^2)}{2R(z)}}$$

Where $$\rho^2 = x^2 + y^2$$

$$\xi = \frac{z}{z_R}$$

and Rayleigh length $z_R$ $$z_R = \frac{\pi w_0^2}{\lambda}$$

And beam diameter $$w(\xi) = w_0\sqrt{(1+\xi^2)}$$

In cylindrical coordinates, the filed takes the form:

$$E_{l,p}^L(\rho, \varphi, z) = \sum_l \sum_{np} C_{lp} E \frac{w_0}{w(z)}\left(\sqrt{2}\frac{\rho}{w(z)}\right)^l$$

-continued $$L_p^l\left(\sqrt{2}\frac{\rho}{w(z)}\right)e^{\frac{-\rho^2}{w(z)^2}} e^{-j(2p+l+1)\tan^{-1} z/z_R} e^{jl\varphi} e^{\frac{-jk\rho^2}{2R(z)}}$$

Where $L_p^l$ is Laguerre functions.

Mode division multiplexing (MDM) of multiple orthogonal beams increases the system capacity and spectral efficiency in optical communication systems. For free space systems, multiple beams each on a different orthogonal mode can be transmitted through a single transmitter and receiver aperture pair. Moreover, the modal orthogonality of different beans enables the efficient multiplexing at the transmitter and demultiplexing at the receiver.

Different optical modal basis sets exist that exhibit orthogonality. For example, orbital angular momentum (OAM) beams that are either Laguerre Gaussian (LG or Laguerre Gaussian light modes may be used for multiplexing of multiple orthogonal beams in free space optical and RF transmission systems. However, there exist other modal groups that also may be used for multiplexing that do not contain OAM. Hermite Gaussian (HG) modes are one such modal group. The intensity of an $HG_{m,n}$ beam is shown according to the equation:

$$I(x, y, z) = C_{m,n} H_m^2\left(\frac{\sqrt{2}x}{w(z)}\right) H_n^2\left(\frac{\sqrt{2}y}{w(z)}\right) \times \exp\left(-\frac{2x^2}{w(z)^2} - \frac{2y^2}{w(z)^2}\right), w(z)$$

$$= w_0\sqrt{1 + [\lambda z/\pi w_0^2]}$$

in which $H_m(*)$ and $H_n(*)$ are the Hermite polynomials of the mth and nth order. The value $w_0$ is the beam waist at distance Z=0. The spatial orthogonality of HG modes with the same beam waist $w_0$ relies on the orthogonality of Hermite polynomial in x or y directions.

Figure 13:
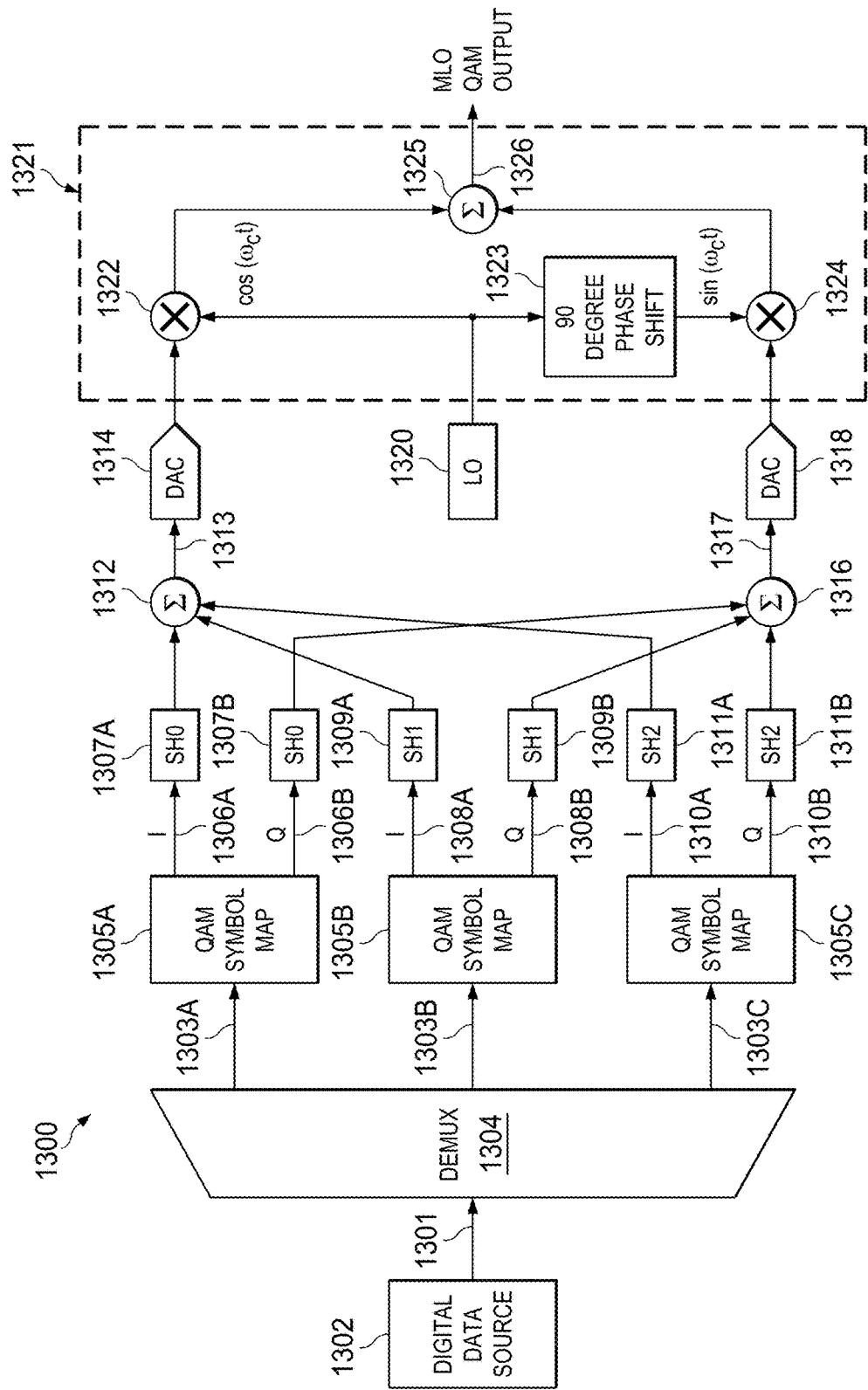
FIG. 13 illustrates a multiple level overlay modulation system.

Referring now to FIG. 13, the reference number 1300 generally indicates an embodiment of a multiple level overlay (MLO) modulation system, although it should be understood that the term MLO and the illustrated system 1300 are examples of embodiments. The MLO system may comprise one such as that disclosed in U.S. Pat. No. 8,503,546 entitled Multiple Layer Overlay Modulation which is incorporated herein by reference. In one example, the modulation system 1300 would be implemented within the multiple level overlay modulation box 504 of FIG. 5. System 1300 takes as input an input data stream 1301 from a digital source 1302, which is separated into three parallel, separate data streams, 1303A-1303C, of logical 1s and 0s by input stage demultiplexer (DEMUX) 1304. Data stream 1301 may represent a data file to be transferred, or an audio or video data stream. It should be understood that a greater or lesser number of separated data streams may be used. In some of the embodiments, each of the separated data streams 1303A-1303C has a data rate of 1/N of the original rate, where N is the number of parallel data streams. In the embodiment illustrated in FIG. 13, N is 3.

Each of the separated data streams 1303A-1303C is mapped to a quadrature amplitude modulation (QAM) symbol in an M-QAM constellation, for example, 16 QAM or 64 QAM, by one of the QAM symbol mappers 1305A-C. The QAM symbol mappers 1305A-C are coupled to respective outputs of DEMUX 1304, and produced parallel in phase (I) 1306A, 1308A, and 1310A and quadrature phase (Q) 1306B, 1308B, and 1310B data streams at discrete levels. For example, in 64 QAM, each I and Q channel uses 8 discrete levels to transmit 3 bits per symbol. Each of the three I and Q pairs, 1306A-1306B, 1308A-1308B, and 1310A-1310B, is used to weight the output of the corresponding pair of function generators 1307A-1307B, 1309A-1309B, and 1311A-1311B, which in some embodiments generate signals such as the modified Hermite polynomials described above and weights them based on the amplitude value of the input symbols. This provides 2N weighted or modulated signals, each carrying a portion of the data originally from income data stream 1301, and is in place of modulating each symbol in the I and Q pairs, 1306A-1306B, 1308A-1308B, and 1310A-1310B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

While the description relates to the application of QLO modulation to improve operation of a quadrature amplitude modulation (QAM) system, the application of QLO modulation will also improve the spectral efficiency of other legacy modulation schemes.

The weighted signals are not subcarriers, but rather are sublayers of a modulated carrier, and are combined, superimposed in both frequency and time, using summers 1312 and 1316, without mutual interference in each of the I and Q dimensions, due to the signal orthogonality. Summers 1312 and 1316 act as signal combiners to produce composite signals 1313 and 1317. The weighted orthogonal signals are used for both I and Q channels, which have been processed equivalently by system 1300, and are summed before the QAM signal is transmitted. Therefore, although new orthogonal functions are used, some embodiments additionally use QAM for transmission. Because of the tapering of the signals in the time domain, as will be shown in FIGS. 18A through 18K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 1313 and 1317 are converted to analogue signals 1315 and 1319 using digital to analogue converters 1314 and 1318, and are then used to modulate a carrier signal at the frequency of local oscillator (LO) 1320, using modulator 1321. Modulator 1321 comprises mixers 1322 and 1324 coupled to DACs 1314 and 1318, respectively. Ninety degree phase shifter 1323 converts the signals from LO 1320 into a Q component of the carrier signal. The output of mixers 1322 and 1324 are summed in summer 1325 to produce output signals 1326.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. In this manner, MLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. MLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, coaxial cable, fiber optic, RF satellite, RF broadcast, RF point-to-point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Figure 14:
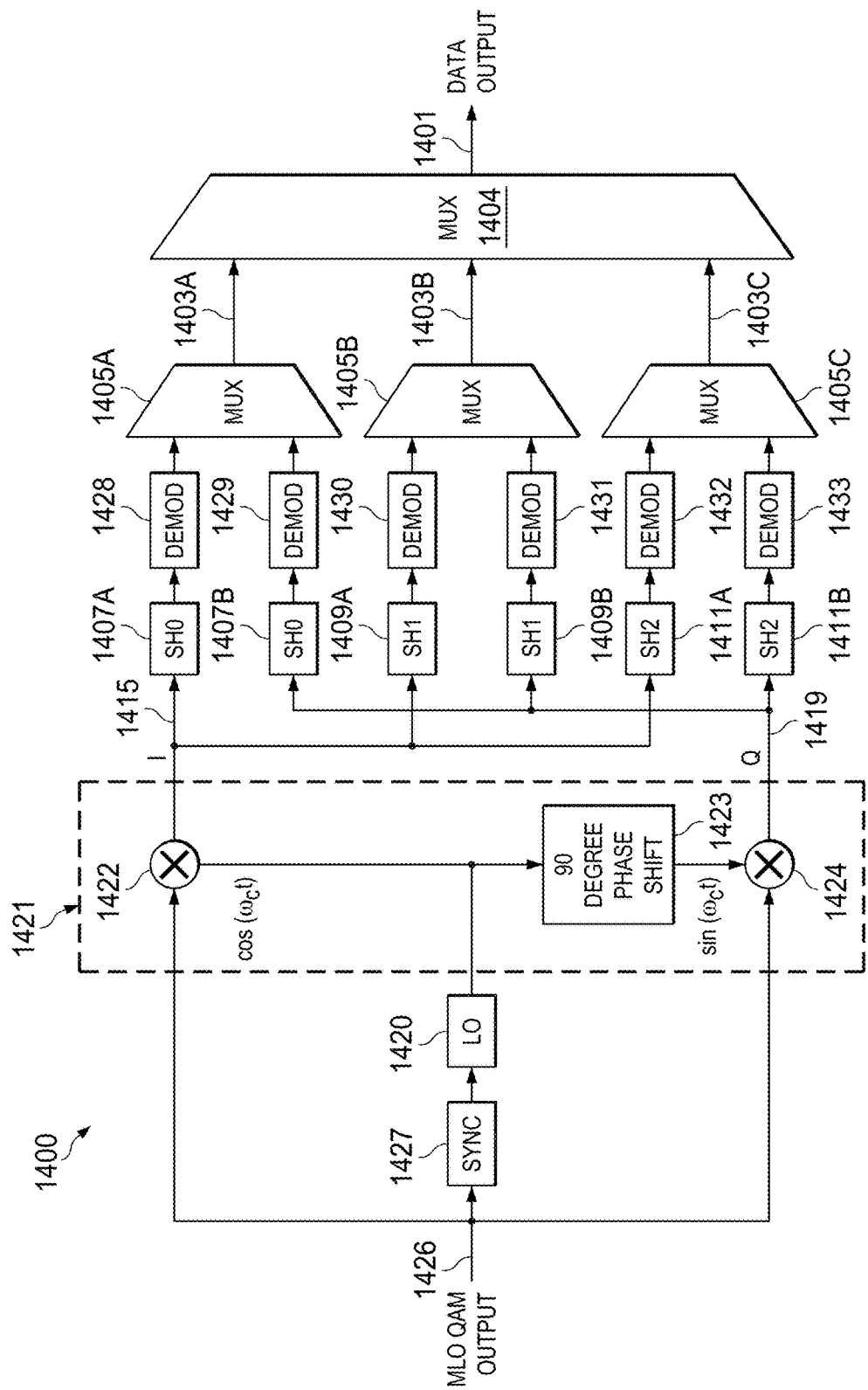
FIG. 14 illustrates a multiple level overlay demodulator.

Referring now back to FIG. 14, an MLO demodulator 1400 is illustrated, although it should be understood that the term MLO and the illustrated system 1400 are examples of embodiments. The modulator 1400 takes as input an MLO signal 1426 which may be similar to output signal 1426 from system 1300. Synchronizer 1427 extracts phase information, which is input to local oscillator 1420 to maintain coherence so that the modulator 1421 can produce base band to analogue I signal 1415 and Q signal 1419. The modulator 1421 comprises mixers 1422 and 1424, which, coupled to OL1520 through 90 degree phase shifter 1423. I signal 1415 is input to each of signal filters 1407A, 1409A, and 1411A, and Q signal 1419 is input to each of signal filters 1407B, 1409B, and 1411B. Since the orthogonal functions are known, they can be separated using correlation or other techniques to recover the modulated data. Information in each of the I and Q signals 1415 and 1419 can be extracted from the overlapped functions which have been summed within each of the symbols because the functions are orthogonal in a correlative sense.

In some embodiments, signal filters 1407A-1407B, 1409A-1409B, and 1411A-1411B use locally generated replicas of the polynomials as known signals in match filters. The outputs of the match filters are the recovered data bits, for example, equivalence of the QAM symbols 1406A-1406B, 1408A-1408B, and 1410A-1410B of system 1400. Signal filters 1407A-1407B, 1409A-1409B, and 1411A-1411B produce 2n streams of n, I, and Q signal pairs, which are input into demodulators 1428-1433. Demodulators 1428-1433 integrate the energy in their respective input signals to determine the value of the QAM symbol, and hence the logical 1s and 0s data bit stream segment represented by the determined symbol. The outputs of the modulators 1428-1433 are then input into multiplexers (MUXs) 1405A-1405C to generate data streams 1403A-1403C. If system 1400 is demodulating a signal from system 1300, data streams 1403A-1403C correspond to data streams 1303A-1303C. Data streams 1403A-1403C are multiplexed by MUX 1404 to generate data output stream 1401. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 15:
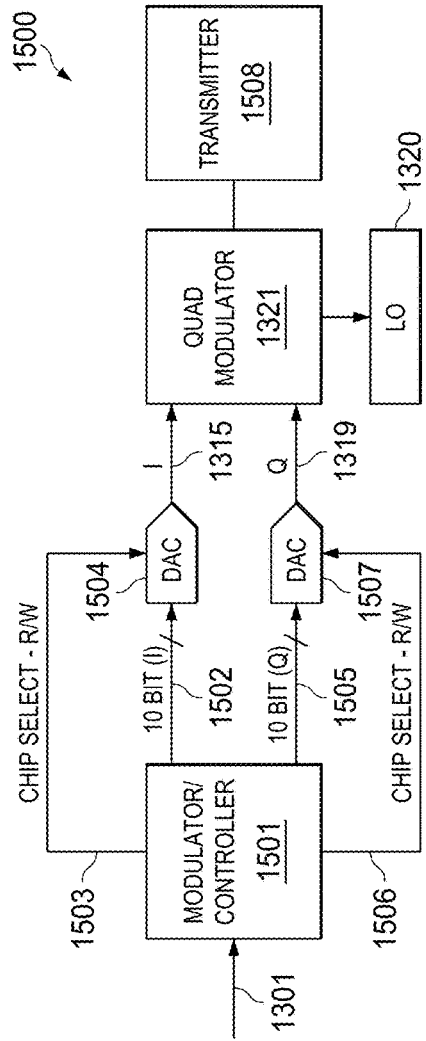
FIG. 15 illustrates a multiple level overlay transmitter system.

FIG. 15 illustrates an embodiment of an MLO transmitter system 1500, which receives input data stream 1501. System 1500 represents a modulator/controller, which incorporates equivalent functionality of DEMUX 1504, QAM symbol mappers 1305A-C, function generators 1307A-1307B, 1309A-1309B, and 1311A-1311B, and summers 1312 and 1316 of system 1300, shown in FIG. 13. However, it should be understood that modulator/controller 1501 may use a greater or lesser quantity of signals than the three illustrated in system 1300. Modulator/controller 1501 may comprise an application specific integrated circuit (ASIC), a field programmable gate array (FPGA), and/or other components, whether discrete circuit elements or integrated into a single integrated circuit (IC) chip.

Modulator/controller 1501 is coupled to DACs 1504 and 1507, communicating a 10 bit I signal 1502 and a 10 bit Q signal 1505, respectively. In some embodiments, I signal 1502 and Q signal 1505 correspond to composite signals 1313 and 1317 of system 1300. It should be understood, however, that the 10 bit capacity of I signal 1502 and Q signal 1505 is merely representative of an embodiment. As illustrated, modulator/controller 1501 also controls DACs 1504 and 1507 using control signals 1503 and 1506, respectively. In some embodiments, DACs 1504 and 1507 each comprise an AD5433, complementary metal oxide semiconductor (CMOS) 10 bit current output DAC. In some embodiments, multiple control signals are sent to each of DACs 1504 and 1507.

DACs 1504 and 1507 output analogue signals 1315 and 1319 to quadrature modulator 1321, which is coupled to LO 1320. The output of modulator 1320 is illustrated as coupled to a transmitter 1508 to transmit data wirelessly, although in some embodiments, modulator 1321 may be coupled to a fiber-optic modem, a twisted pair, a coaxial cable, or other suitable transmission media.

Figure 16:
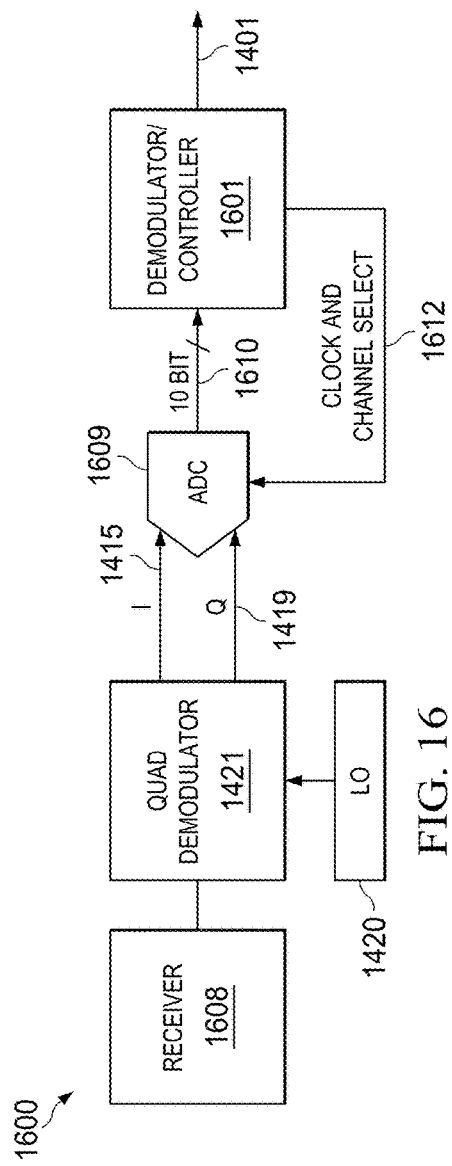
FIG. 16 illustrates a multiple level overlay receiver system.

FIG. 16 illustrates an embodiment of an MLO receiver system 1600 capable of receiving and demodulating signals from system 1500. System 1600 receives an input signal from a receiver 1608 that may comprise input medium, such as RF, wired or optical. The modulator 1521 driven by LO 1520 converts the input to baseband I signal 1515 and Q signal 1519. I signal 1515 and Q signal 1519 are input to analogue to digital converter (ADC) 1609.

ADC 1609 outputs 10 bit signal 1610 to demodulator/controller 1601 and receives a control signal 1612 from demodulator/controller 1601. Demodulator/controller 1601 may comprise an application specific integrated circuit (ASIC), a field programmable gate array (FPGA), and/or other components, whether discrete circuit elements or integrated into a single integrated circuit (IC) chip. Demodulator/controller 1601 correlates received signals with locally generated replicas of the signal set used, in order to perform demodulation and identify the symbols sent. Demodulator/controller 1601 also estimates frequency errors and recovers the data clock, which is used to read data from the ADC 1609. The clock timing is sent back to ADC 1609 using control signal 1612, enabling ADC 1609 to segment the digital I and Q signals 1515 and 1519. In some embodiments, multiple control signals are sent by demodulator/controller 1601 to ADC 1609. Demodulator/controller 1601 also outputs data signal 1301.

Hermite-Gaussian polynomials are a classical orthogonal polynomial sequence, which are the Eigenstates of a quantum harmonic oscillator. Signals based on Hermite-Gaussian polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre-Gaussian polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, 4n, and are defined by:

$$\psi_n(t,\xi) = \frac{(\tanh\xi)^{n/2}}{2^{n/2}(n!\cosh\xi)^{1/2}} e^{\frac{1}{2}t^2[1-\tanh\xi]} H_n\left(\frac{t}{\sqrt{2\cosh\xi\sinh\xi}}\right)$$

where t is time, and $\xi$ is a bandwidth utilization parameter. Plots of $\Psi_n$ for n ranging from 0 to 9, along with their Fourier transforms (amplitude squared), are shown in FIGS. 5A-5K. The orthogonality of different orders of the functions may be verified by integrating:

$$\iint \psi_n(t,\xi)\psi_m(t,\xi)dtd\xi$$

The Hermite polynomial is defined by the contour integral:

$$H_n(z) = \frac{n!}{2\pi i}\oint e^{-t^2+2t z}t^{-n-1}dt$$

where the contour encloses the origin and is traversed in a counterclockwise direction. Hermite polynomials are described in Mathematical Methods for Physicists, by George Arfken, for example on page 416, the disclosure of which is incorporated by reference.

Figure 17A:
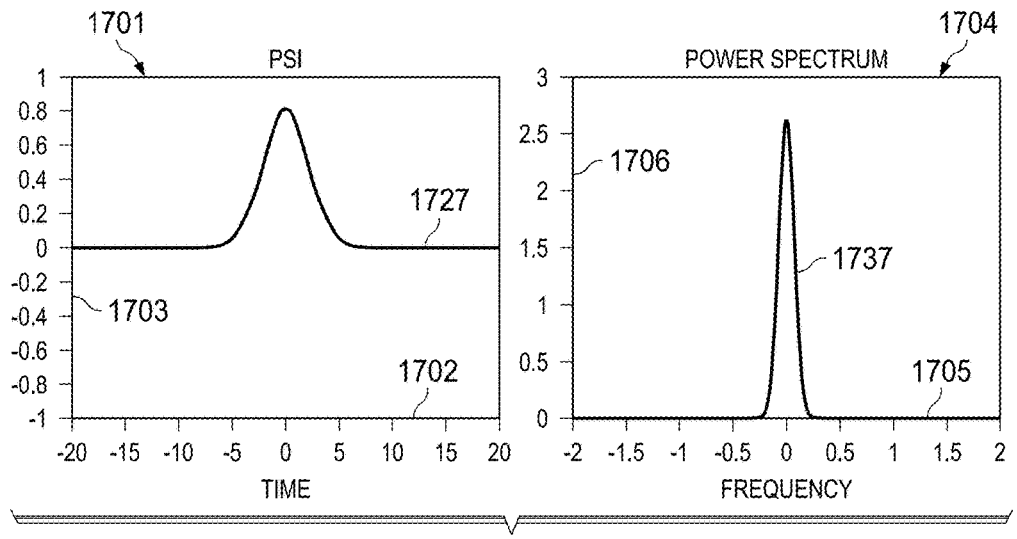
FIGS. 17A-17K illustrate representative multiple level overlay signals and their respective spectral power densities.
Figure 17B:
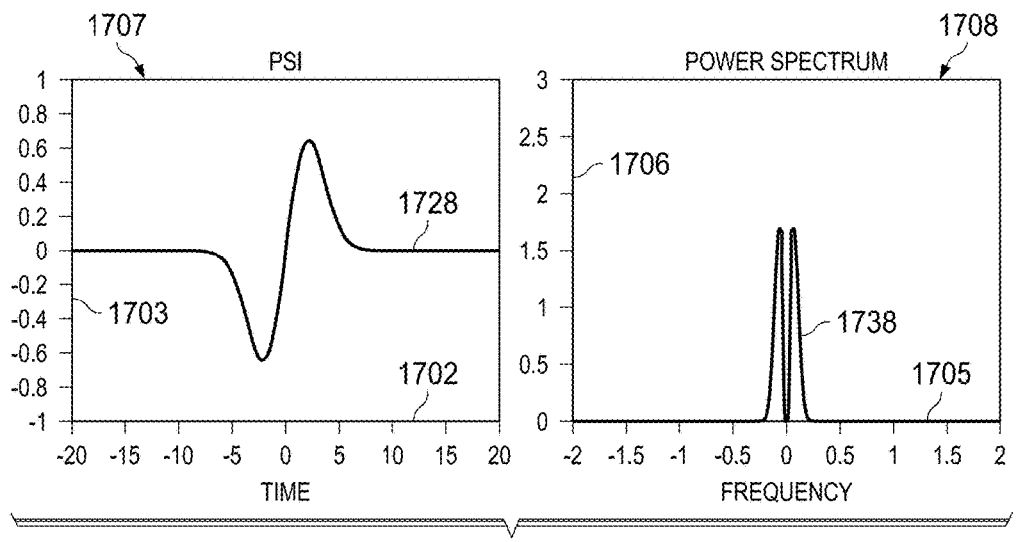
Figure 17C:
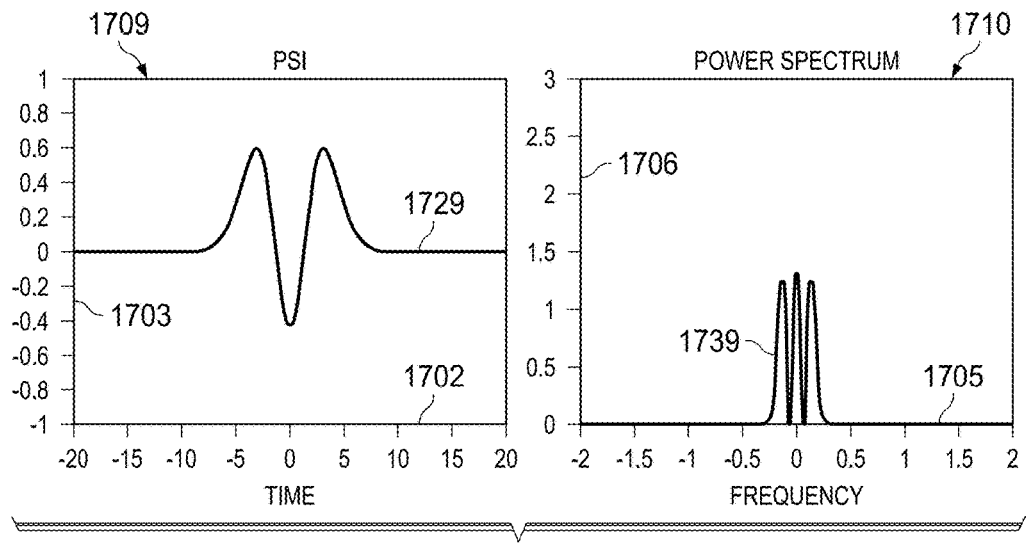
Figure 17D:
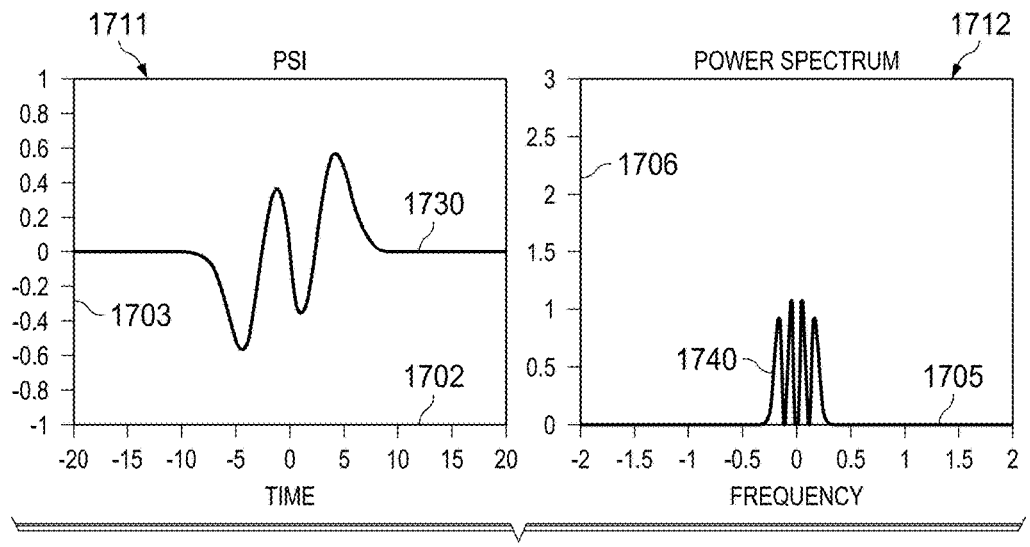
Figure 17E:
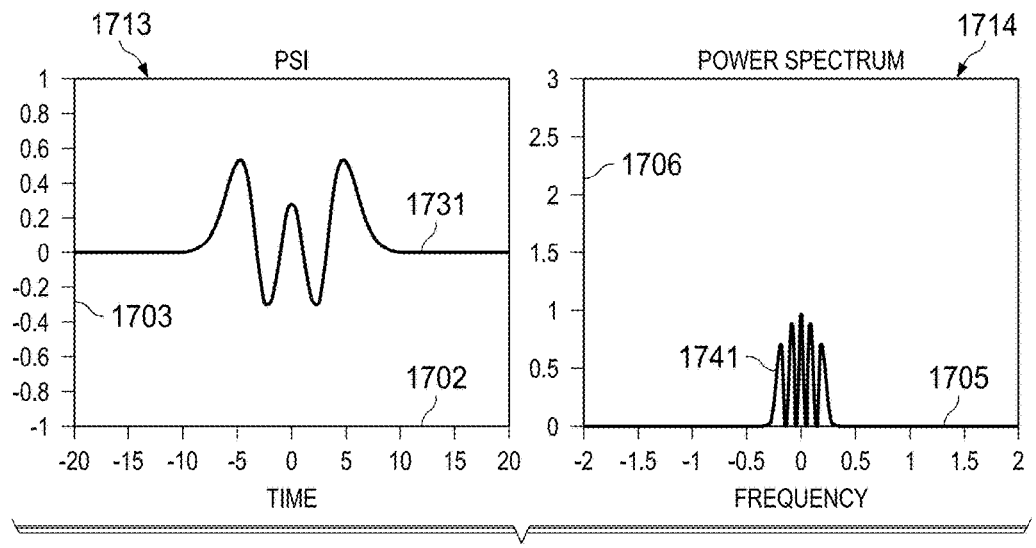
Figure 17F:
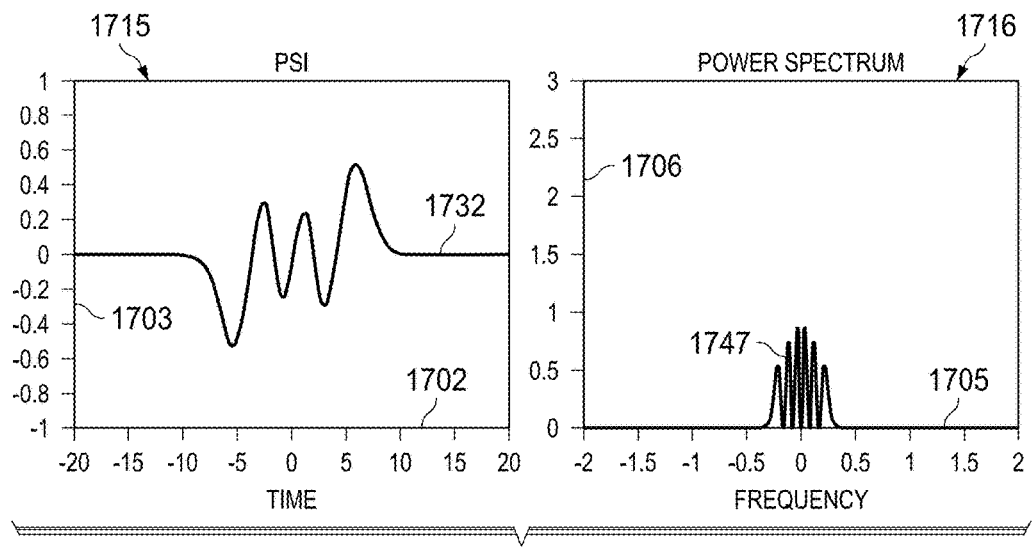
Figure 17G:
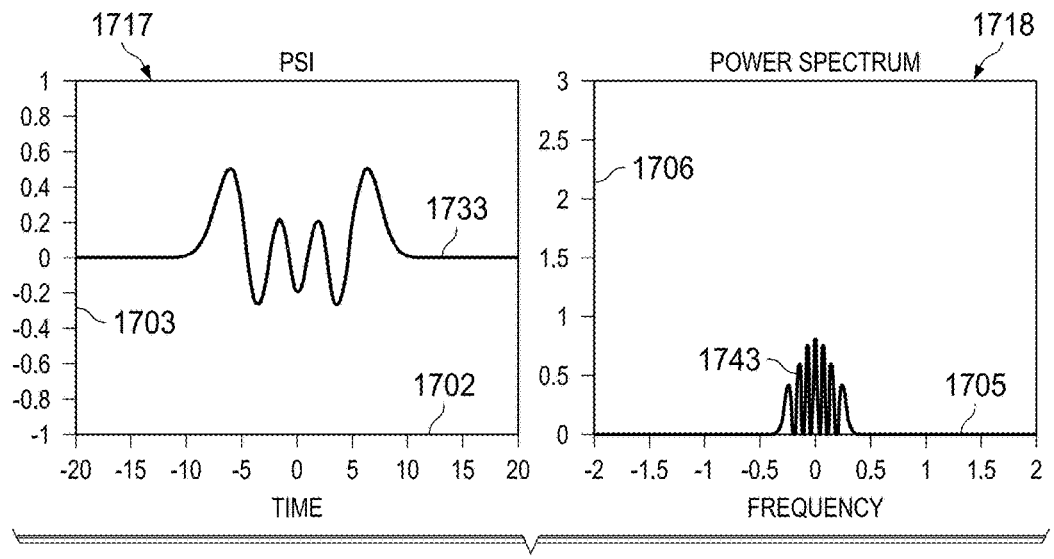
Figure 17H:
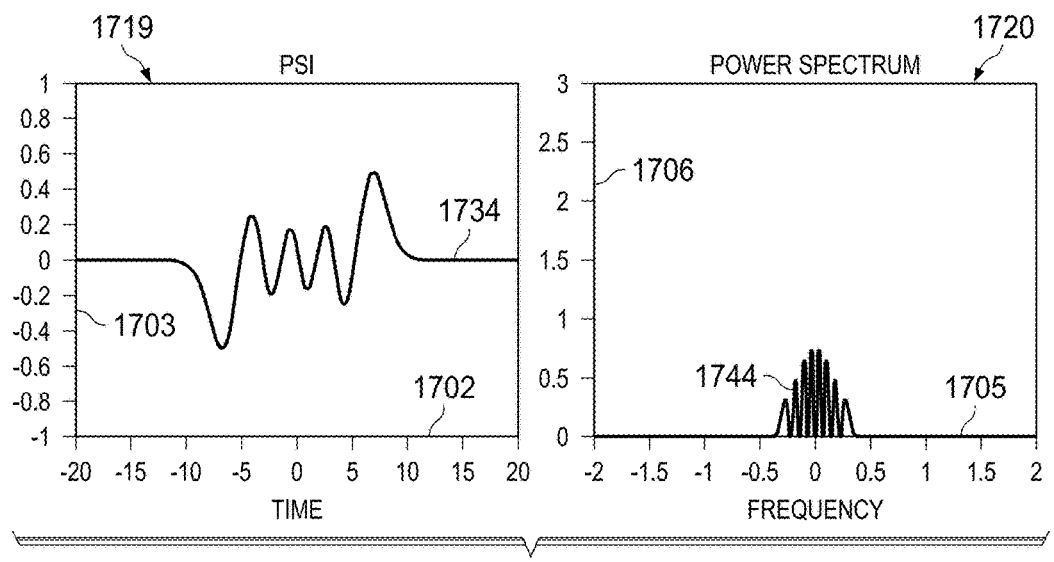
Figure 17I:
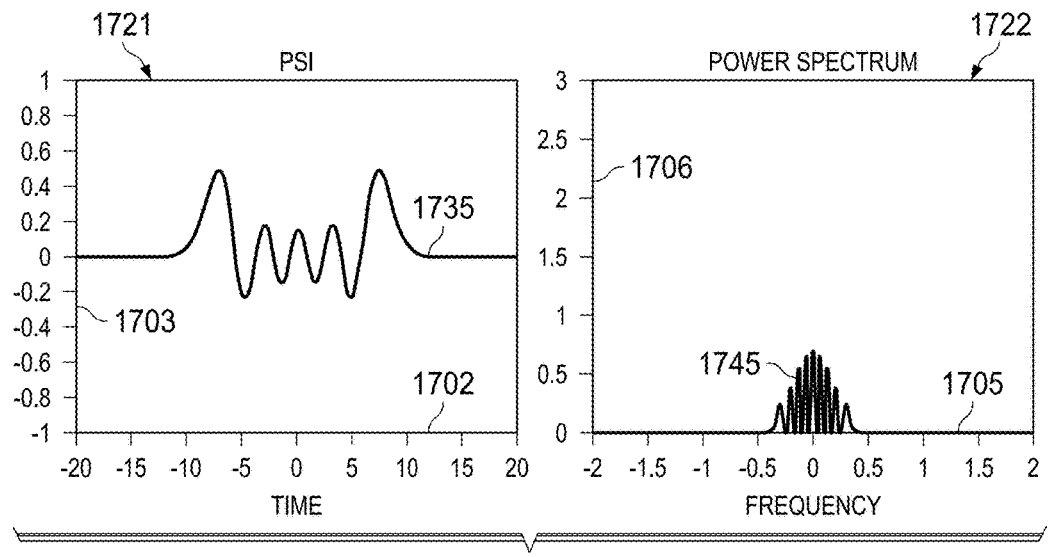
Figure 17J:
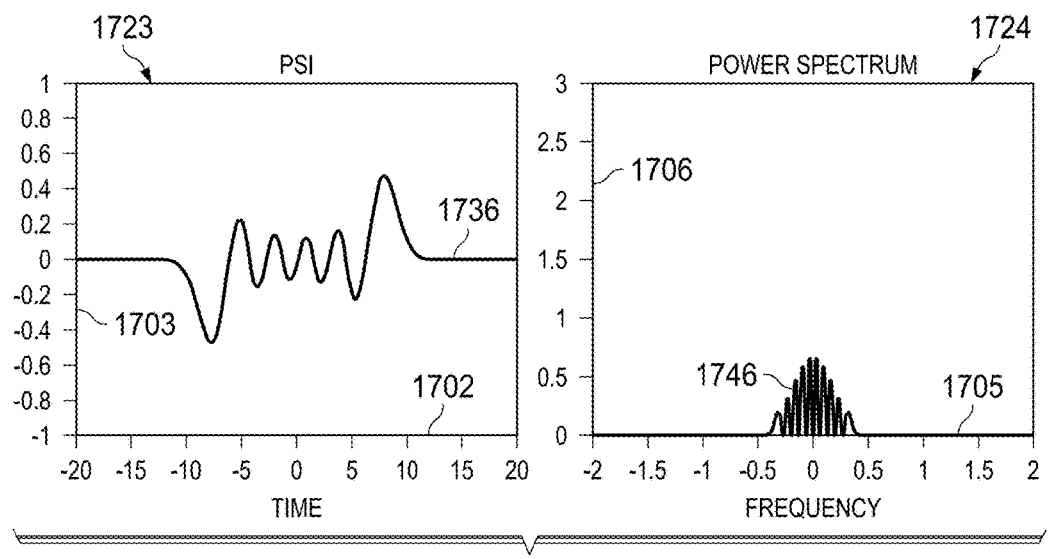

FIGS. 17A-17K illustrate representative MLO signals and their respective spectral power densities based on the modified Hermite polynomials $\Psi_n$ for n ranging from 0 to 9. FIG. 17A shows plots 1701 and 1704. Plot 1701 comprises a curve 1727 representing $\Psi_0$ plotted against a time axis 1702 and an amplitude axis 1703. As can be seen in plot 1701, curve 1727 approximates a Gaussian curve. Plot 1704 comprises a curve 1737 representing the power spectrum of $\Psi_0$ plotted against a frequency axis 1705 and a power axis 1706. As can be seen in plot 1704, curve 1737 also approximates a Gaussian curve. Frequency domain curve 1707 is generated using a Fourier transform of time domain curve 1727. The units of time and frequency on axis 1702 and 1705 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the megahertz (MHz) or gigahertz (GHz) ranges and the non-0 duration of a symbol represented by curve 1727, i.e., the time period at which curve 1727 is above 0 would be compressed to the appropriate length calculated using the inverse of the desired symbol rate. For an available bandwidth in the megahertz range, the non-0 duration of a time domain signal will be in the microsecond range.

FIGS. 17B-17J show plots 1707-1724, with time domain curves 1728-1736 representing $\Psi_1$ through $\Psi_9$, respectively, and their corresponding frequency domain curves 1738-1746. As can be seen in FIGS. 17A-17J, the number of peaks in the time domain plots, whether positive or negative, corresponds to the number of peaks in the corresponding frequency domain plot. For example, in plot 1723 of FIG. 17J, time domain curve 1736 has five positive and five negative peaks. In corresponding plot 1724 therefore, frequency domain curve 1746 has ten peaks.

Figure 17K:
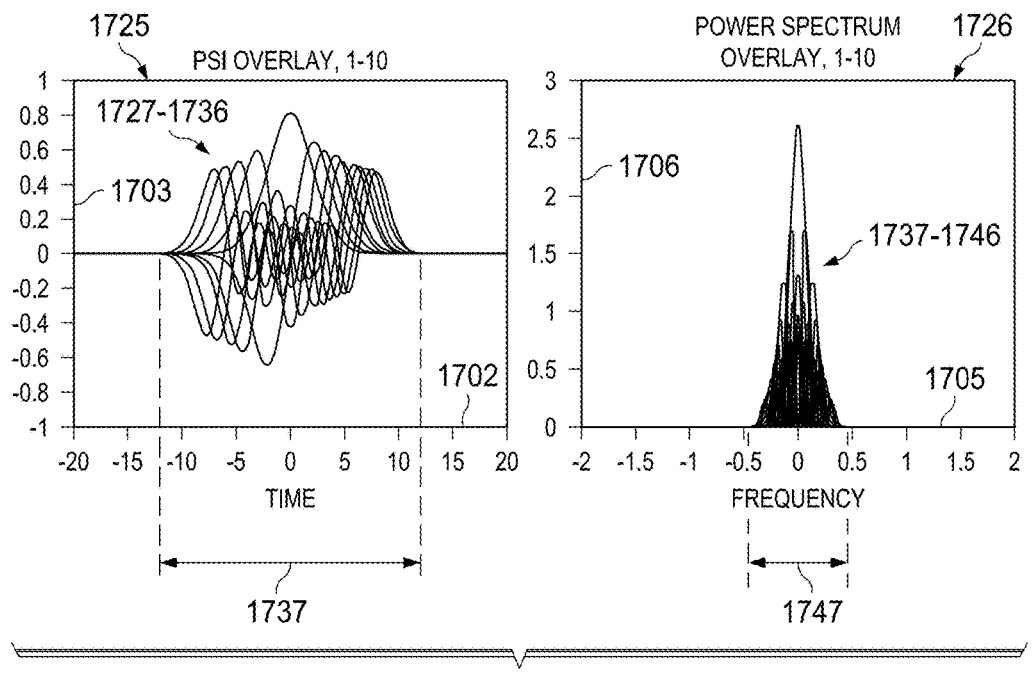

FIG. 17K shows overlay plots 1725 and 1726, which overlay curves 1727-1736 and 1737-1746, respectively. As indicated in plot 1725, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 17A-17K, a greater or lesser quantity of signals may be used, and that further, a different set of signals, rather than the $\Psi_n$ signals plotted, may be used.

MLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 18:
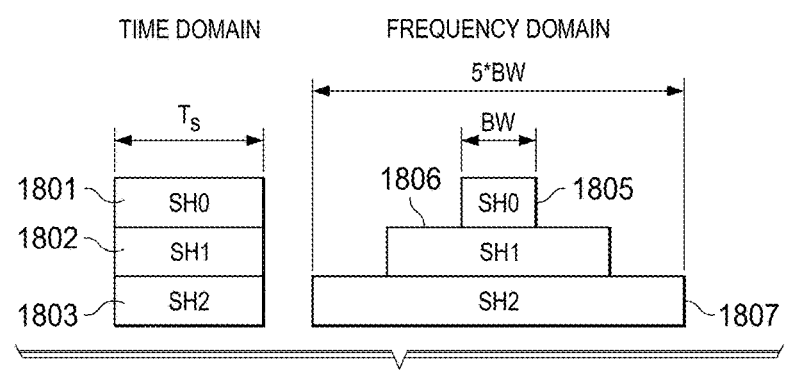
FIG. 18 illustrates comparisons of multiple level overlay signals within the time and frequency domain.

FIG. 18 illustrates a comparison of MLO signal widths in the time and frequency domains. Time domain envelope representations 1801-1803 of signals SH0-SH3 are illustrated as all having a duration $T_S$. SH0-SH3 may represent $PSI_0$-$PSI_2$, or may be other signals. The corresponding frequency domain envelope representations are 1805-1807, respectively. SH0 has a bandwidth BW, SH1 has a bandwidth three times BW, and SH2 has a bandwidth of 5BW, which is five times as great as that of SH0. The bandwidth used by an MLO system will be determined, at least in part, by the widest bandwidth of any of the signals used. The highest order signal must set within the available bandwidth. This will set the parameters for each of the lower order signals in each of the layers and enable the signals to fit together without interference. If each layer uses only a single signal type within identical time windows, the spectrum will not be fully utilized, because the lower order signals will use less of the available bandwidth than is used by the higher order signals.

FIG. 19A illustrates a spectral alignment of MLO signals that accounts for the differing bandwidths of the signals, and makes spectral usage more uniform, using SH0-SH3. Blocks 1901-1904 are frequency domain blocks of an OFDM signal with multiple subcarriers. Block 1903 is expanded to show further detail. Block 1903 comprises a first layer 1903x comprised of multiple SH0 envelopes 1903a-1903o. A second layer 1903y of SH1 envelopes 1903p-1903t has one third the number of envelopes as the first layer. In the illustrated example, first layer 1903x has 15 SH0 envelopes, and second layer 1903y has five SH1 envelopes. This is because, since the SH1 bandwidth envelope is three times as wide as that of SH0, 15 SH0 envelopes occupy the same spectral width as five SH1 envelopes. The third layer 1903z of block 1903 comprises three SH2 envelopes 1903u-1903w, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15BW, which is a block in the frequency domain. The OFDM-MLO signal can have multiple blocks, and the spectral efficiency of this illustrated implementation is proportional to (15+5+3)/15.

FIGS. 19B-19C illustrate a situation wherein the frequency domain envelopes 1920-1924 are each located in a separate layer within a same physical band width 1925. However, each envelope rather than being centered on a same center frequency as shown in FIG. 18 has its own center frequency 1926-1930 shifted in order to allow a slided overlay. The purposed of the slided center frequency is to allow better use of the available bandwidth and insert more envelopes in a same physical bandwidth.

Since each of the layers within the MLO signal comprises a different channel, different service providers may share a same bandwidth by being assigned to different MLO layers within a same bandwidth. Thus, within a same bandwidth, service provider one may be assigned to a first MLO layer, service provider two may be assigned to a second MLO layer and so forth.

Figure 19:
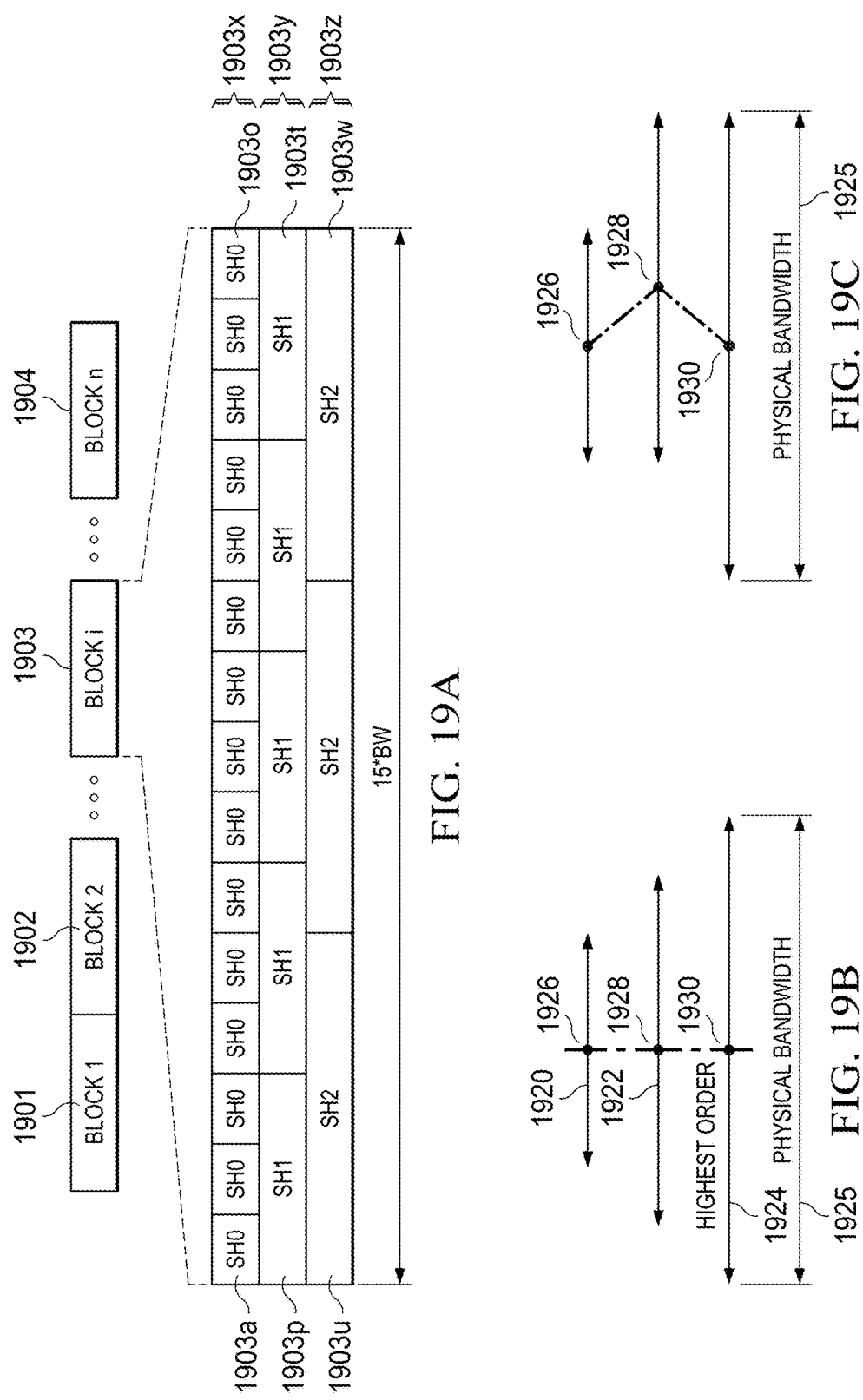
FIG. 19A illustrates a spectral alignment of multiple level overlay signals for differing bandwidths of signals.
FIG. 19B-19C illustrate frequency domain envelopes located in separate layers within a same physical bandwidth.
Figure 20:
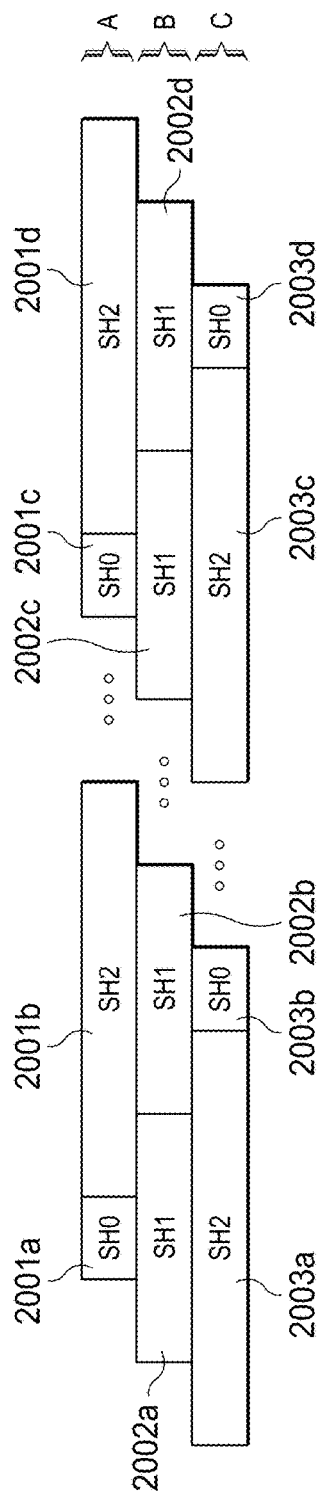
FIG. 20 illustrates an alternative spectral alignment of multiple level overlay signals.

FIG. 20 illustrates another spectral alignment of MLO signals, which may be used alternatively to alignment scheme shown in FIG. 19. In the embodiment illustrated in FIG. 20, the OFDM-MLO implementation stacks the spectrum of SH0, SH1, and SH2 in such a way that the spectrum in each layer is utilized uniformly. Layer 2000A comprises envelopes 2001A-2001D, which includes both SH0 and SH2 envelopes. Similarly, layer 2000C, comprising envelopes 2003A-2003D, includes both SH0 and SH2 envelopes. Layer 2000B, however, comprising envelopes 2002A-2002D, includes only SH1 envelopes. Using the ratio of envelope sizes described above, it can be easily seen that BW+5BW=3BW+3BW. Thus, for each SH0 envelope in layer 2000A, there is one SH2 envelope also in layer 2000C and two SH1 envelopes in layer 2000B.

Three Scenarios Compared:
1) MLO with 3 Layers defined by:

$$f_0(t) = W_0 e^{\frac{t^2}{4}}, W_0 \approx 0.6316$$

-continued $$f_1(t) = W_1 t e^{\frac{t^2}{4}}, W_1 \approx 0.6316$$

$$f_2(t) = W_2(t^2 - 1)e^{\frac{t^2}{4}}, W_2 \approx 0.4466$$

(The current FPGA implementation uses the truncation interval of [−6, 6].)
2) Conventional scheme using rectangular pulse
3) Conventional scheme using a square-root raised cosine (SRRC) pulse with a roll-off factor of 0.5

For MLO pulses and SRRC pulse, the truncation interval is denoted by [−t1, t1] in the following figures. For simplicity, we used the MLO pulses defined above, which can be easily scaled in time to get the desired time interval (say micro-seconds or nano-seconds). For the SRRC pulse, we fix the truncation interval of [−3T, 3T] where T is the symbol duration for all results presented in this document.
Bandwidth Efficiency The X-dB bounded power spectral density bandwidth is defined as the smallest frequency interval outside which the power spectral density (PSD) is X dB below the maximum value of the PSD. The X-dB can be considered as the out-of-band attenuation.

The bandwidth efficiency is expressed in Symbols per second per Hertz. The bit per second per Hertz can be obtained by multiplying the symbols per second per Hertz with the number of bits per symbol (i.e., multiplying with log 2 M for M-ary QAM).

Figure 21:
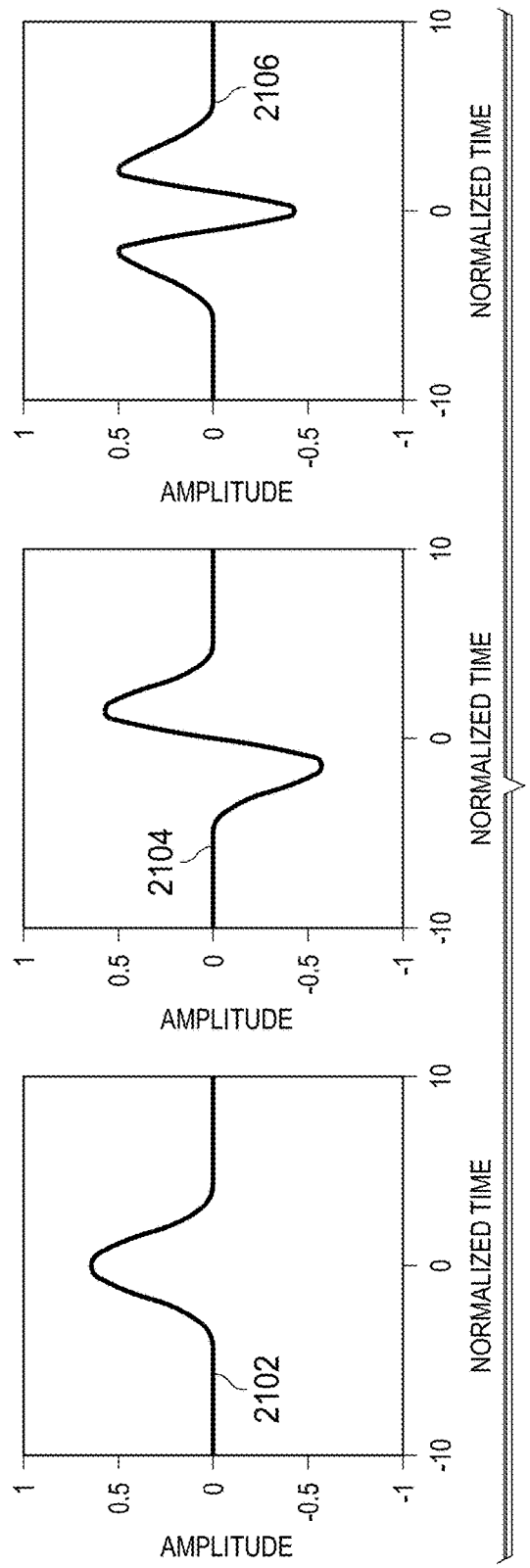
FIG. 21 illustrates three different superQAM signals.
Figures 22, 25:
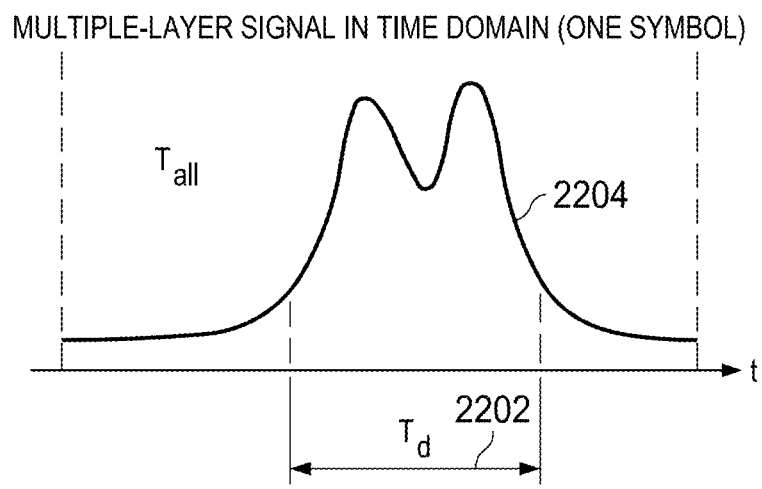
FIG. 22 illustrates the creation of inter-symbol interference in overlapped multilayer signals.
FIG. 25 illustrates truncated orthogonal functions.

Truncation of MLO pulses introduces inter-layer interferences (ILI). However, the truncation interval of [−6, 6] yields negligible ILI while [−4, 4] causes slight tolerable ILI. Referring now to FIG. 21, there is illustrated the manner in which a signal, for example a superQAM signal, may be layered to create ILI. FIG. 21 illustrates 3 different superQAM signals 2102, 2104 and 2106. The superQAM signals 2102-2106 may be truncated and overlapped into multiple layers using QLO in the manner described herein above. However, as illustrated in FIG. 22, the truncation of the superQAM signals 2102-2106 that enables the signals to be layered together within a bandwidth $T_d$ 2202 creates a single signal 2204 having the interlayer interference between each of the layers containing a different signal produced by the QLO process. The ILI is caused between a specific bit within a specific layer having an effect on other bits within another layer of the same symbol.

Figure 23:
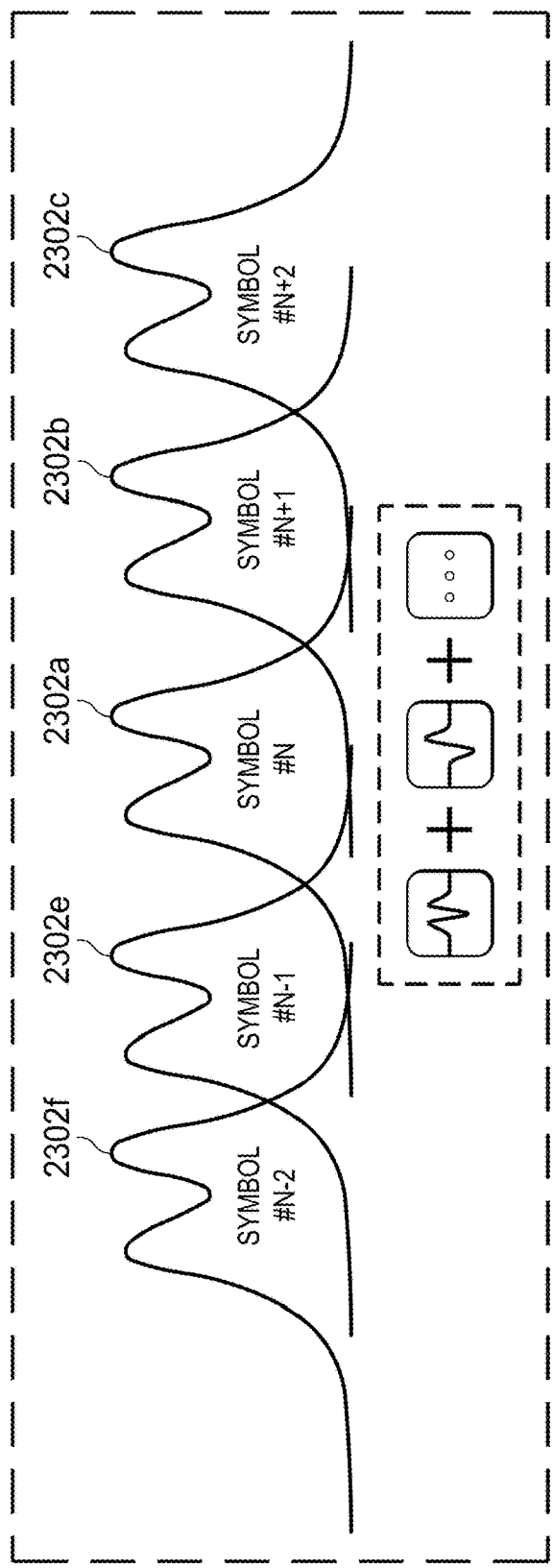
FIG. 23 illustrates overlapped multilayer signals.

The bandwidth efficiency of MLO may be enhanced by allowing inter-symbol interference (ISI). To realize this enhancement, designing transmitter side parameters as well as developing receiver side detection algorithms and error performance evaluation can be performed. One manner in which ISI may be created is when multilayer signals such as that illustrated in FIG. 22 are overlapped with each other in the manner illustrated in FIG. 23. Multiple signal symbols 2302 are overlapped with each other in order to enable to enable more symbols to be located within a single bandwidth. The portions of the signal symbols 2302 that are overlapping cause the creation of ISI. Thus, a specific bit at a specific layer will have an effect on the bits of nearby symbols.

The QLO transmission and reception system can be designed to have a particular known overlap between symbols. The system can also be designed to calculate the overlaps causing ISI (symbol overlap) and ILI (layer overlay). The ISI and ILI can be expressed in the format of a NM*NM matrix derived from a N*NM matrix. N comprises the number of layers and M is the number of symbols when considering ISI. Referring now to FIG. 24, there is illustrated a fixed channel matrix $H_{xy}$ which is a N*NM matrix. From this we can calculate another matrix which is $H_{yx}$ which is a NM*NM matrix. The ISI and ILI can be canceled by (a) applying a filter of $H_{yx}^{-1}$ to the received vector or (b) pre-distorting the transmitted signal by the SVD (singular value decomposition) of $H_{yx}^{-1}$. Therefore, by determining the matrix $H_{xy}$ of the fixed channel, the signal may be mathematically processed to remove ISL and ILI.

When using orthogonal functions such as Hermite Guassian (HG) functions, the functions are all orthogonal for any permutations of the index if infinitely extended. However, when the orthogonal functions are truncated as discussed herein above, the functions become pseudo-orthogonal. This is more particularly illustrated in FIG. 25. In this case, orthogonal functions are represented along each of the axes. At the intersection of the same orthogonal functions, functions are completely correlated and a value of "1" is indicated. Thus, a diagonal of "1" exists with each of the off diagonal elements comprising a "0" since these functions are completely orthogonal with each other. When truncated HG choose functions are used the 0 values will not be exactly 0 since the functions are no longer orthogonal but are pseudo-orthogonal.

However, the HG functions can be selected in a manner that the functions are practically orthogonal. This is achieved by selecting the HG signals in a sequence to achieve better orthogonality. Thus, rather than selecting the initial three signals in a three signal HG signal sequence (P0 P1 P2), various other sequences that do not necessarily comprise the first three signals of the HG sequence may be selected as shown below.

| | |
|---|---|
| P0 P1 P4 | P0 P3 P6 |
| P0 P1 P6 | P0 P4 P5 |
| P0 P2 P3 | P0 P5 P6 |
| P0 P2 P5 | P1 P3 P6 |
| P0 P3 P4 | P2 P5 P6 |

Similar selection of sequences may be done to achieve better orthogonality with two signals, four signals, etc.

The techniques described herein are applicable to a wide variety of communication band environments. They may be applied across the visible and invisible bands and include RF, Fiber, Freespace optical and any other communications bands that can benefit from the increased bandwidth provided by the disclosed techniques.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of l 1 and l 2, respectively:

$$U_1(r,\theta,z) = A_1(r,z)\exp(il_1\theta) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } l_1 \neq l_2 \\ A_1 A_2^* & \text{if } l_1 = l_2 \end{cases} \quad (13)$$

There are two different ways to take advantage of the distinction between OAM beams with different l states in communications. In the first approach, N different OAM states can be encoded as N different data symbols representing "0", "1", ..., "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

Figure 26:
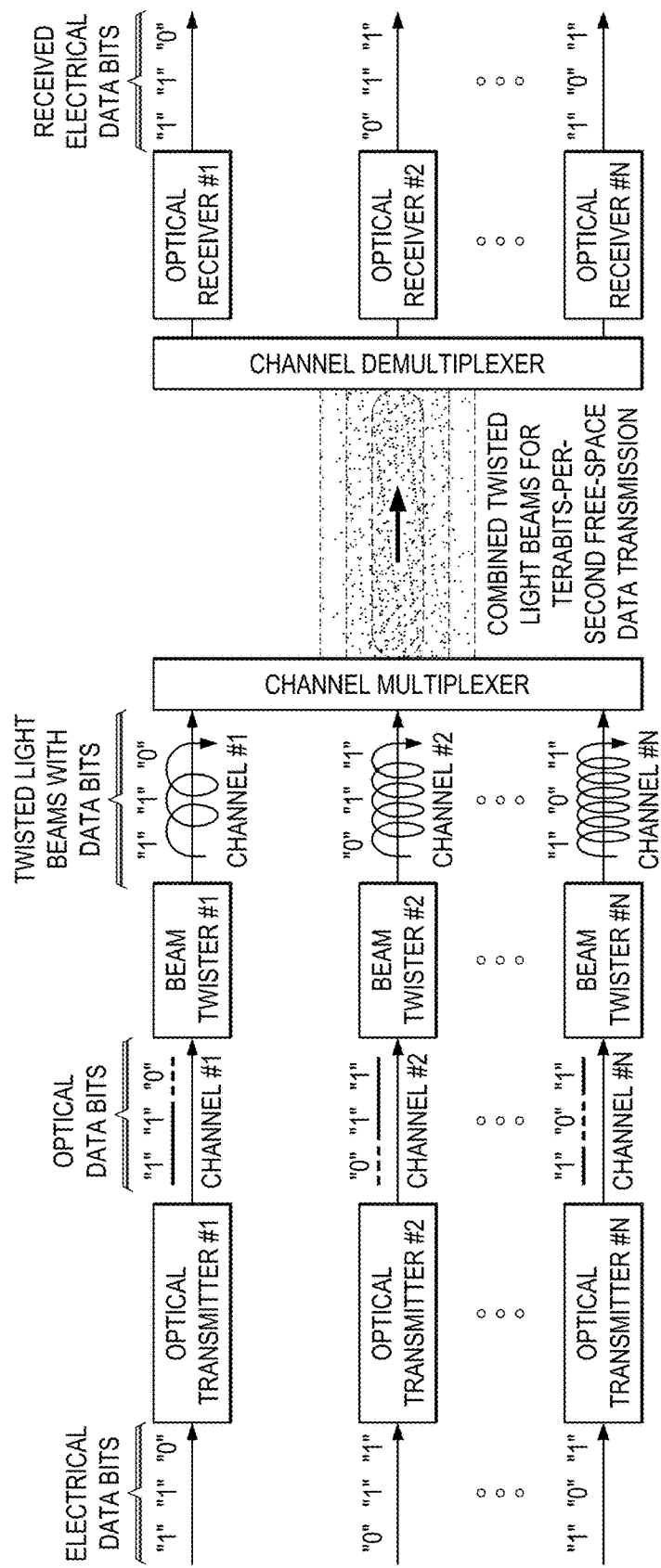
FIG. 26 illustrates a typical OAM multiplexing scheme.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 26. An obvious benefit of OAM multiplexing is the improvement in system spectral efficiency, since the same bandwidth can be reused for additional data channels.

Optical Fiber Communications

Figure 27:
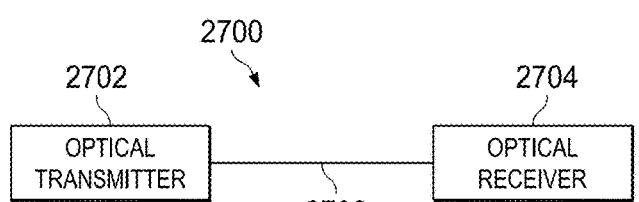
FIG. 27 illustrates the configuration of an optical fiber communication system.

The use of orbital angular momentum and multiple layer overlay modulation processing techniques within an optical communications interface environment as described with respect to FIG. 3 can provide a number of opportunities within the optical communications environment for enabling the use of the greater signal bandwidths provided by the use of optical orbital angular momentum processing, or multiple layer overlay modulation techniques alone. FIG. 27 illustrates the general configuration of an optical fiber communication system. The optical fiber communication system 2700 includes an optical transmitter 2702 and an optical receiver 2704. The transmitter 2702 and receiver 2704 communicate over an optical fiber 2706. The transmitter 2702 includes information within a light wavelength or wavelengths that is propagated over the optical fiber 2706 to the optical receiver 2704.

Optical communications network traffic has been steadily increasing by a factor of 100 every decade. The capacity of single mode optical fibers has increased 10,000 times within the last three decades. Historically, the growth in the bandwidth of optical fiber communications has been sustained by information multiplexing techniques using wavelength, amplitude, phase, and polarization of light as a means for encoding information. Several major discoveries within the fiber-optics domain have enabled today's optical networks. An additional discovery was led by Charles M. Kao's groundbreaking work that recognized glass impurities within an optical fiber as a major signal loss mechanism.

Existing glass losses at the time of his discovery were approximately 200 dB per kilometer at 1 micrometer.

Figure 28A:
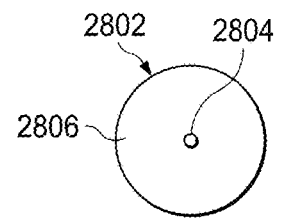
FIG. 28A illustrates a single mode fiber.
Figure 28B:
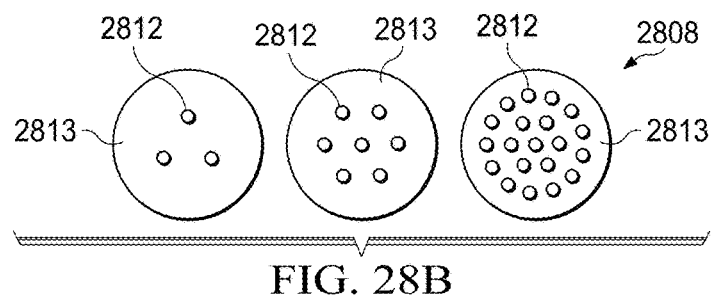
FIG. 28B illustrates multi-core fibers.
Figure 28C:
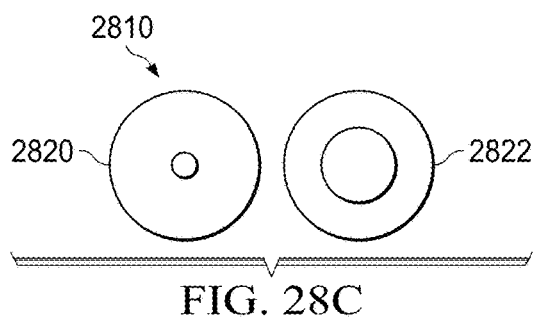
FIG. 28C illustrates multi-mode fibers.
Figure 28D:
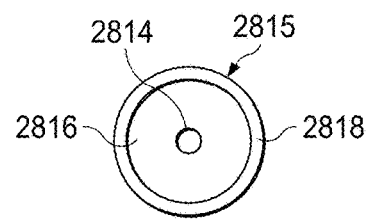
FIG. 28D illustrates a hollow core fiber.

These discoveries gave birth to optical fibers and led to the first commercial optical fibers in the 1970s, having an attenuation low enough for communication purposes in the range of approximately 20 dBs per kilometer. Referring now to FIGS. 28a-28c, there is more particularly illustrated the single mode fiber 2802, multicore fibers 2808, and multimode fibers 2810 described herein above. The multicore fibers 2808 consist of multiple cores 2812 included within the cladding 2813 of the fiber. As can be seen in FIG. 28b, there are illustrated a 3 core fiber, 7 core fiber, and 19 core fiber. Multimode fibers 2810 comprise multimode fibers comprising a few mode fiber 2820 and a multimode fiber 2822. Finally, there is illustrated a hollow core fiber 2815 including a hollow core 2814 within the center of the cladding 2816 and sheathing 2818. The development of single mode fibers (SMF) such as that illustrated at 2802 (FIG. 28a) in the early 1980s reduced pulse dispersion and led to the first fiber-optic based trans-Atlantic telephone cable. This single mode fiber included a single transmission core 2804 within an outer sheathing 2806. Development of indium gallium arsenide photodiodes in the early 1990s shifted the focus to near-infrared wavelengths (1550 NM), were silica had the lowest loss, enabling extended reach of the optical fibers. At roughly the same time, the invention of erbium-doped fiber amplifiers resulted in one of the biggest leaps in fiber capacity within the history of communication, a thousand fold increase in capacity occurred over a 10 year period. The development was mainly due to the removed need for expensive repeaters for signal regeneration, as well as efficient amplification of many wavelengths at the same time, enabling wave division multiplexing (WDM).

Throughout the 2000s, increases in bandwidth capacity came mainly from introduction of complex signal modulation formats and coherent detection, allowing information encoding using the phase of light. More recently, polarization division multiplexing (PDM) doubled channel capacity. Through fiber communication based on SMFs featured tremendous growth in the last three decades, recent research has indicated SMF limitations. Non-linear effects in silica play a significant role in long range transmission, mainly through the Kerr effect, where a presence of a channel at one wavelength can change the refractive index of a fiber, causing distortions of other wavelength channels. More recently, a spectral efficiency (SE) or bandwidth efficiency, referring to the transmitted information rate over a given bandwidth, has become theoretically analyzed assuming nonlinear effects in a noisy fiber channel. This research indicates a specific spectral efficiency limit that a fiber of a certain length can reach for any signal to noise (SNR). Recently achieved spectral efficiency results indeed show that the proximity to the spectral efficiency limit, indicating the need for new technologies to address the capacity issue in the future.

Among several possible directions for optical communications in the future, the introduction of new optical fibers 2706 other than single mode fibers 2802 has shown promising results. In particular, researchers have focused on spatial dimensions in new fibers, leading to so-called space division multiplexing (SDM) where information is transmitted using cores of multi-core fibers (MCF) 2808 (FIG. 28b) or mode division multiplexing (MDM) or information is transmitted using modes of multimode fibers (MMFs) 2810 (FIG. 28c). The latest results show spectral efficiency of 91 bits/S/Hz using 12 core multicore fiber 2808 for 52 kilometer long fibers and 12 bits/S/Hz using 6 mode multimode fiber 2810 and 112 kilometer long fibers. Somewhat unconventional transmissions at 2.08 micrometers have also been demonstrated in two 90 meter long photonic crystal fibers, though these fibers had high losses of 4.5 decibels per kilometer.

While offering promising results, these new types of fibers have their own limitations. Being noncircularly symmetric structures, multicore fibers are known to require more complex, expensive manufacturing. On the other hand, multimode fibers 2810 are easily created using existing technologies. However, conventional multimode fibers 2810 are known to suffer from mode coupling caused by both random perturbations in the fibers and in modal multiplexers/demultiplexers.

Several techniques have been used for mitigating mode coupling. In a strong coupling regime, modal cross talk can be compensated using computationally intensive multi-input multi-output (MIMO) digital signal processing (DSP). While MIMO DSP leverages the technique's current success in wireless networks, the wireless network data rates are several orders of magnitude lower than the ones required for optical networks. Furthermore, MIMO DSP complexity inevitably increases with an increasing number of modes and no MIMO based data transmission demonstrations have been demonstrated in real time thus far. Furthermore, unlike wireless communication systems, optical systems are further complicated because of fiber's nonlinear effects. In a weak coupling regime, where cross talk is smaller, methods that also use computationally intensive adapted optics, feedback algorithms have been demonstrated. These methods reverse the effects of mode coupling by sending a desired superposition of modes at the input, so that desired output modes can be obtained. This approach is limited, however, since mode coupling is a random process that can change on the order of a millisecond in conventional fibers.

Thus, the adaptation of multimode fibers 2810 can be problematic in long haul systems where the round trip signal propagation delay can be tens of milliseconds. Though 2×56 GB/S transmission at 8 kilometers length has been demonstrated in the case of two higher order modes, none of the adaptive optics MDM methods to date have demonstrated for more than two modes. Optical fibers act as wave guides for the information carrying light signals that are transmitted over the fiber. Within an ideal case, optical fibers are 2D, cylindrical wave guides comprising one or several cores surrounded by a cladding having a slightly lower refractive index as illustrated in FIGS. 28a-28d. A fiber mode is a solution (an eigenstate) of a wave guide equation describing the field distribution that propagates within a fiber without changing except for the scaling factor. All fibers have a limit on the number of modes that they can propagate, and have both spatial and polarization degrees of freedom.

Single mode fibers (SMFs) 2802 is illustrated in FIG. 28a support propagation of two orthogonal polarizations of the fundamental mode only (N=2). For sufficiently large core radius and/or the core cladding difference, a fiber is multimoded for N>2 as illustrated in FIG. 28c. For optical signals having orbital angular momentums and multilayer modulation schemes applied thereto, multimode fibers 2810 that are weakly guided may be used. Weakly guided fibers have a core cladding refractive index difference that is very small. Most glass fibers manufactured today are weakly guided, with the exception of some photonic crystal fibers and air-core fibers. Fiber guide modes of multimode fibers 2810 may be associated in step indexed groups where, within each group, modes typically having similar effective indexes are grouped together. Within a group, the modes are degenerate. However, these degeneracies can be broken in a certain fiber profile design.

We start by describing translationally invariant waveguide with refractive index n=n(x, y), with $n_{co}$ being maximum refractive index ("core" of a waveguide), and $n_{cl}$ being refractive index of the uniform cladding, and p represents the maximum radius of the refractive index n. Due to translational invariance the solutions (or modes) for this waveguide can be written as:

$$E_j(x,y,z)=e_j(x,y)e^{i\beta_j z},$$

$$H_j(x,y,z)=h_j(x,y)e^{i\beta_j z},$$

where $\beta_j$ is the propagation constant of the j-th mode. Vector wave equation for source free Maxwell's equation can be written in this case as:

$$(\nabla^2+n^2k^2-\beta_j^2)e_j=-(\nabla_t+i\beta_j\hat{z})(e_{tj}\cdot\nabla_t \ln(n^2))$$

$$(\nabla^2+n^2k^2-\beta_j^2)h_j=-(\nabla_t \ln(n^2))\times([\nabla]_t+i\beta_j\hat{z})\times h_j)$$

where $k=2\pi/\lambda$ is the free-space wavenumber, $\lambda$ is a free-space wavelength, $e_t=e_x\hat{x}+e_y\hat{y}$ is a transverse part of the electric field, $\nabla^2$ is a transverse Laplacian and $\nabla_t$ transverse vector gradient operator. Waveguide polarization properties are built into the wave equation through the $\nabla_t \ln(n^2)$ terms and ignoring them would lead to the scalar wave equation, with linearly polarized modes. While previous equations satisfy arbitrary waveguide profile n(x, y), in most cases of interest, profile height parameter $\Delta$ can be considered small $\Delta\ll 1$, in which case waveguide is said to be weakly guided, or that weakly guided approximation (WGA) holds. If this is the case, a perturbation theory can be applied to approximate the solutions as:

$$E(x,y,z)=e(x,y)e^{i(\beta+\hat{\beta})z}=(e_t+\hat{z}e_z)e^{i(\beta+\hat{\beta})z}$$

$$H(x,y,z)=h(x,y)e^{i(\beta+\hat{\beta})z}=(h_t+\hat{z}h_z)e^{i(\beta+\hat{\beta})z}$$

where subscripts t and z denote transverse and longitudinal components respectively. Longitudinal components can be considered much smaller in WGA and we can approximate (but not neglect) them as:

$$e_z = \frac{i(2\Delta)^{\frac{1}{2}}}{v}(\rho\nabla_t \cdot e_t)$$

$$h_z = \frac{i(2\Delta)^{\frac{1}{2}}}{V}(\rho\nabla_t \cdot h_t)$$

Where $\Delta$ and V are profile height and fiber parameters and transversal components satisfy the simplified wave equation.

$$(\nabla^2+n^2k^2-\beta_j^2)e_j=0$$

Though WGA simplified the waveguide equation, further simplification can be obtained by assuming circularly symmetric waveguide (such as ideal fiber). If this is the case refractive index that can be written as:

$$n(r)=n^2_{co}(1-2f(R)\Delta)$$

where $f(R)\geq 0$ is a small arbitrary profile variation.

For a circularly symmetric waveguide, we would have propagation constants $\beta_{lm}$ that are classified using azimuthal (l) and radial (m) numbers. Another classification uses effective indices $n_{lm}$ (sometimes noted as $n^{eff}_{lm}$ or simply $n_{eff}$, that are related to propagation constant as: $\beta_{lm}=kn^{eff}$). For the case of l=0, the solutions can be separated into two classes that have either transverse electric (T $E_{0m}$) or transverse magnetic (T $M_{0m}$) fields (called meridional modes). In the case of l≠0, both electric and magnetic field have z-component, and depending on which one is more dominant, so-called hybrid modes are denoted as: $HE_{lm}$ and $EH_{lm}$.

Polarization correction $\delta\beta$ has different values within the same group of modes with the same orbital number (l), even in the circularly symmetric fiber. This is an important observation that led to development of a special type of fiber.

In case of a step refractive index, solutions are the Bessel functions of the first kind, $J_l(r)$, in the core region, and modified Bessel functions of the second kind, $K_l(r)$, in the cladding region.

In the case of step-index fiber the groups of modes are almost degenerate, also meaning that the polarization correction $\delta\beta$ can be considered very small. Unlike $HE_{11}$ modes, higher order modes (HOMs) can have elaborate polarizations. In the case of circularly symmetric fiber, the odd and even modes (for example $HE^{odd}$ and $HE^{even}$ modes) are always degenerate (i.e. have equal $n_{eff}$), regardless of the index profile. These modes will be non-degenerate only in the case of circularly asymmetric index profiles.

Figure 29:
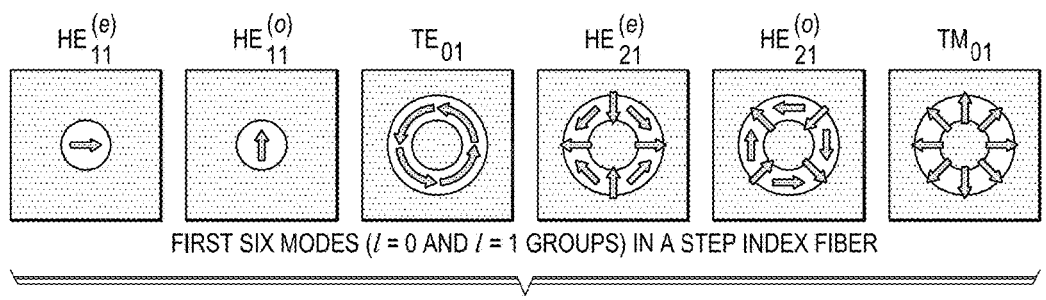
FIG. 29 illustrates the first six modes within a step index fiber.

Referring now to FIG. 29, there are illustrated the first six modes within a step indexed fiber for the groups L=0 and L=1.

When orbital angular momentums are applied to the light wavelength within an optical transmitter of an optical fiber communication system, the various orbital angular momentums applied to the light wavelength may transmit information and be determined within the fiber mode.

Angular momentum density (M) of light in a medium is defined as:

$$M = \frac{1}{c^2}r\times(E\times H) = r\times P = \frac{1}{c^2}r\times S$$

with r as position, E electric field, H magnetic field, P linear momentum density and S Poynting vector.

The total angular momentum (J), and angular momentum flux ($\Phi_M$) can be defined as:

$$J=\iiint M\, dV$$

$$\Phi=\iint M\, dA$$

In order to verify whether certain mode has an OAM let us look at the time averages of the angular momentum flux $\Phi_M$:

$$\langle\Phi_M\rangle=\iint\langle M\rangle dA$$

as well as the time average of the energy flux:

$$\langle\Phi_W\rangle = \iint \frac{\langle S_z\rangle}{c} dA$$

Because of the symmetry of radial and axial components about the fiber axis, we note that the integration in equation will leave only z-component of the angular momentum density non zero. Hence:

$$\langle M\rangle = \langle M\rangle_z = \frac{1}{c^2}r\times\langle E\times H\rangle_z$$

and knowing $\langle S\rangle=\text{Re}\{S\}$ and $S=\frac{1}{2}E\times H^*$ leads to:

$$S_\Phi=\frac{1}{2}(-E_rH_z^*+E_zH_r^*)$$

$S_z = \frac{1}{2}(E_x H_y^* - E_y H_x^*)$

Let us now focus on a specific linear combination of the $HE_{l+1,m}^{even}$ and $HE_{l+1,m}^{odd}$ modes with $\pi/2$ phase shift among them:

$V_{lm}^+ = HE_{l+1,m}^{even} + iEH_{l+1,m}^{odd}$

The idea for this linear combination comes from observing azimuthal dependence of the $HE_{l+1,m}^{even}$ and modes comprising $\cos(\varphi)$ and $\sin(\varphi)$. If we denote the electric field of $HE_{l+1,m}^{even}$ and $HE_{l+1,m}^{odd}$ modes as $e_1$ and $e_2$, respectively, and similarly, denote their magnetic fields as $h_1$ and $h_2$, the expression for this new mode can be written as:

$e = e_1 + ie_2$, (2.35)

$h = h_1 + ih_2$. (2.36)

then we derive:

$e_r = e^{i(l+1)\varphi} F_l(R)$ $h_z = e^{i(l+1)\varphi} n_{co} \left(\frac{\epsilon_0}{\mu_0}\right)^{\frac{1}{2}} \frac{(2\Delta)^{\frac{1}{2}}}{V} G_l^-$ $e_z = ie^{i(l+1)\varphi} \frac{(2\Delta)^{\frac{1}{2}}}{V} G_l^-$ $h_r = -ie^{i(l+1)\varphi} n_{co} \left(\frac{\epsilon_0}{\mu_0}\right)^{\frac{1}{2}} F_l(R)$ Where $F_l(R)$ is the Bessel function and $G_l^{\pm} = \frac{dF_l}{dR} \pm \frac{l}{R} F_l$ We note that all the quantities have $e^{i(l+1)\varphi}$ dependence that indicates these modes might have OAM, similarly to the free space case. Therefore the azimuthal and the longitudinal component of the Poynting vector are:

$S_\varphi = -n_{co} \left(\frac{\epsilon_0}{\mu_0}\right)^{\frac{1}{2}} \frac{(2\Delta)^{\frac{1}{2}}}{V} \text{Re}\{F_l^* G_l^-\}$ $S_z = n_{co} \left(\frac{\epsilon_0}{\mu_0}\right)^{\frac{1}{2}} [F_l]^2$ The ratio of the angular momentum flux to the energy flux therefore becomes:

$\frac{\phi_M}{\phi_W} = \frac{l+1}{\omega}$

We note that in the free-space case, this ratio is similar:

$\frac{\phi_M}{\phi_W} = \frac{\sigma+1}{\omega}$ where $\sigma$ represents the polarization of the beam and is bounded to be $-1 < \sigma < 1$. In our case, it can be easily shown that SAM of the $V^+$ state, is 1, leading to important conclusion that the OAM of the $V^{+lm}$ state is 1. Hence, this shows that, in an ideal fiber, OAM mode exists.

Thus, since an orbital angular momentum mode may be detected within the ideal fiber, it is possible to encode information using this OAM mode in order to transmit different types of information having different orbital angular momentums within the same optical wavelength.

Figure 30:
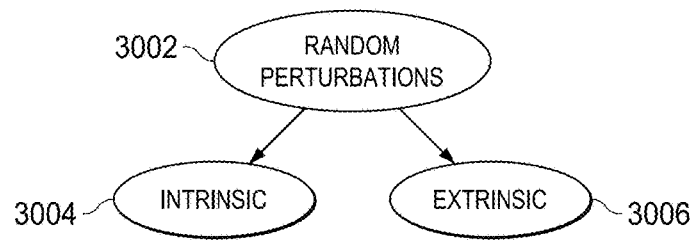
FIG. 30 illustrates the classes of random perturbations within a fiber.

The above description with respect to optical fiber assumed an ideal scenario of perfectly symmetrical fibers having no longitudinal changes within the fiber profile. Within real world fibers, random perturbations can induce coupling between spatial and/or polarization modes, causing propagating fields to evolve randomly through the fiber. The random perturbations can be divided into two classes, as illustrated in FIG. 30. Within the random perturbations 3002, the first class comprises extrinsic perturbations 3004. Extrinsic perturbations 3004 include static and dynamic fluctuations throughout the longitudinal direction of the fiber, such as the density and concentration fluctuations natural to random glassy polymer materials that are included within fibers. The second class includes extrinsic variations 3006 such as microscopic random bends caused by stress, diameter variations, and fiber core defects such as microvoids, cracks, or dust particles.

Mode coupling can be described by field coupling modes which account for complex valued modal electric field amplitudes, or by power coupling modes, which is a simplified description that accounts only for real value modal powers. Early multimode fiber systems used incoherent light emitting diode sources and power coupling models were widely used to describe several properties including steady state, modal power distributions, and fiber impulse responses. While recent multimode fiber systems use coherent sources, power coupling modes are still used to describe effects such as reduced differential group delays and plastic multimode fibers.

By contrast, single mode fiber systems have been using laser sources. The study of random birefringence and mode coupling in single mode fibers which leads to polarization mode dispersion (PMD), uses field coupling modes which predict the existence of principal states of polarization (PSPs). PSPs are polarization states shown to undergo minimal dispersion and are used for optical compensation of polarization mode dispersion in direct detection single mode fiber systems. In recent years, field coupling modes have been applied to multimode fibers, predicting principal mode which are the basis for optical compensation of modal dispersion in direct detection multimode fiber systems.

Mode coupling can be classified as weak or strong, depending on whether the total system length of the optical fiber is comparable to, or much longer than, a length scale over which propagating fields remain correlated. Depending on the detection format, communication systems can be divided into direct and coherent detection systems. In direct detection systems, mode coupling must either be avoided by careful design of fibers and modal D (multiplexers) and/or mitigated by adaptive optical signal processing. In systems using coherent detection, any linear cross talk between modes can be compensated by multiple input multiple output (MIMO) digital signal processing (DSP), as previously discussed, but DSP complexity increases with an increasing number of modes.

Figure 31:
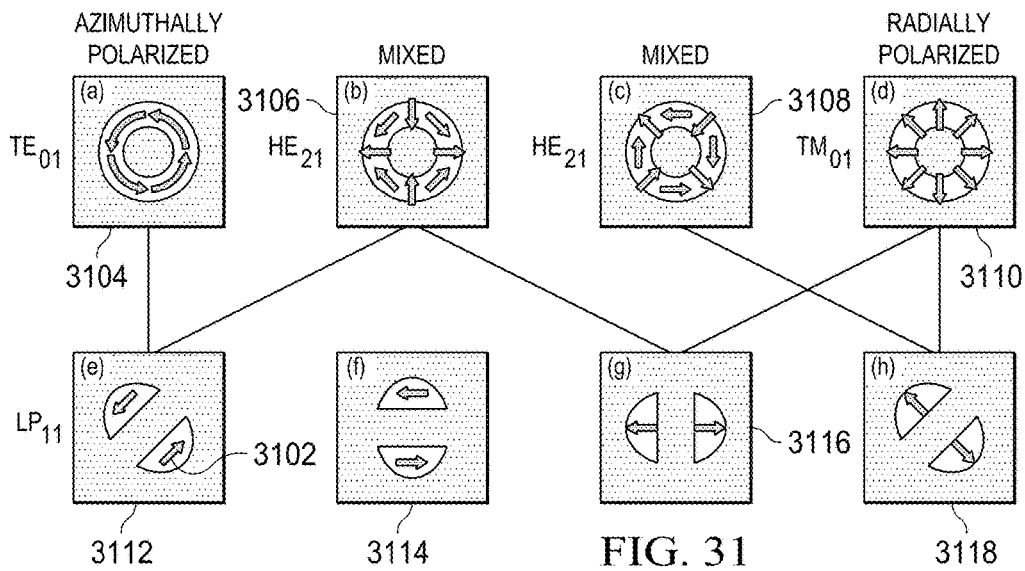
FIG. 31 illustrates the intensity patterns of first order groups within a vortex fiber.

Referring now to FIG. 31, there were illustrated the intensity patterns of the first order mode group within a vortex fiber. Arrows 3102 within the illustration show the polarization of the electric field within the fiber. The top row illustrates vector modes that are the exact vector solutions, and the bottom row shows the resultant, unstable LP11 modes commonly obtained at a fiber output. Specific linear combinations of pairs of top row modes resulting in the variety of LP11 modes obtained at the fiber output. Coupled mode 3102 is provided by the coupled pair of mode 3104 and 3106. Coupled mode 3104 is provided by the coupled pair of mode 3104 and mode 3108. Coupled mode 3116 is provided by the coupled pair of mode 3106 and mode 3110, and coupled mode 3118 is provided by the coupled pair of mode 3108 and mode 3110.

Typically, index separation of two polarizations and single mode fibers is on the order of 10-7. While this small separation lowers the PMD of the fiber, external perturbations can easily couple one mode into another, and indeed in a single mode fiber, arbitrary polarizations are typically observed at the output. Simple fiber polarization controller that uses stress induced birefringence can be used to achieve any desired polarization at the output of the fiber.

By the origin, mode coupling can be classified as distributed (caused by random perturbations in fibers), or discrete (caused at the modal couplers and the multiplexers). Most importantly, it has been shown that small, effective index separation among higher order modes is the main reason for mode coupling and mode instabilities. In particular, the distributed mode coupling has been shown to be inversely proportional to A-P with P greater than 4, depending on coupling conditions. Modes within one group are degenerate. For this reason, in most multimode fiber modes that are observed in the fiber output are in fact the linear combinations of vector modes and are linearly polarized states. Hence, optical angular momentum modes that are the linear combination of the HE even, odd modes cannot coexist in these fibers due to coupling to degenerate TE01 and TM01 states.

Thus, the combination of the various OAM modes is not likely to generate modal coupling within the optical systems and by increasing the number of OAM modes, the reduction in mode coupling is further benefited.

Figure 32A:
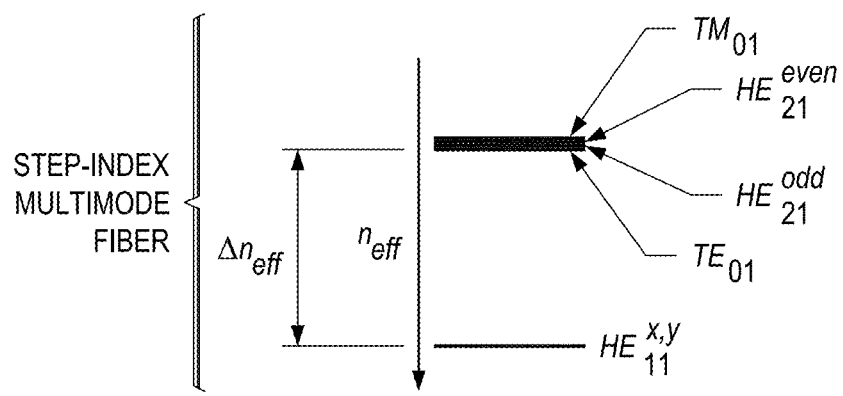
FIGS. 32A and 32B illustrate index separation in first order modes of a multi-mode fiber.
Figure 32B:
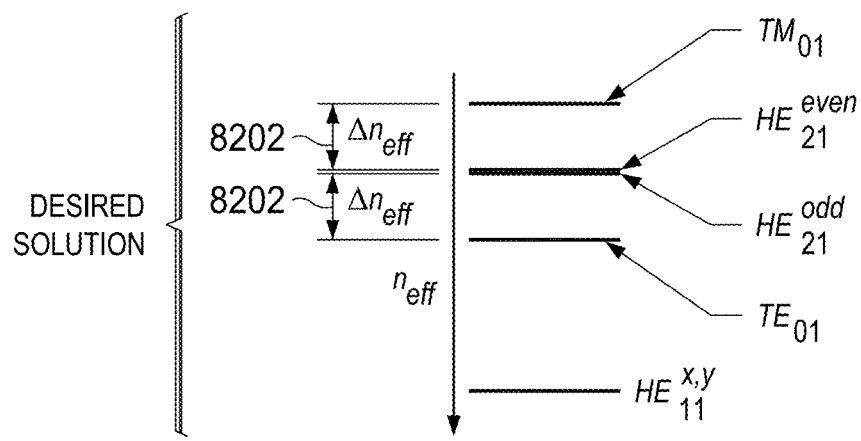

Referring now to FIGS. 32A and 32B, there is illustrated the benefit of effective index separation in first order modes. FIG. 32A illustrates a typical step index multimode fiber that does not exhibit effective index separation causing mode coupling. The mode $TM_{01}$ $HE^{even}{}_{21}$, mode $HE^{odd}{}_{21}$, and mode $TE_{01}$ have little effective index separation, and these modes would be coupled together. Mode $HE^{x,1}{}_{11}$ has an effective index separation such that this mode is not coupled with these other modes.

This can be compared with the same modes in FIG. 32B. In this case, there is an effective separation 3202 between the $TM_{01}$ mode and the $HE^{even}{}_{21}$ mode and the $TE_{01}$ mode and the $HE^{odd}{}_{21}$ mode. This effective separation causes no mode coupling between these mode levels in a similar manner that was done in the same modes in FIG. 32A.

In addition to effective index separation, mode coupling also depends on the strength of perturbation. An increase in the cladding diameter of an optical fiber can reduce the bend induced perturbations in the fiber. Special fiber design that includes the trench region can achieve so-called bend insensitivity, which is predominant in fiber to the home. Fiber design that demonstrates reduced bends and sensitivity of higher order Bessel modes for high power lasers have been demonstrated. Most important, a special fiber design can remove the degeneracy of the first order mode, thus reducing the mode coupling and enabling the OAM modes to propagate within these fibers.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarization.

The topological charges can be created using Spiral Phase Plates (SPPs) such as that illustrated in FIG. 11*e*, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges. When signals are muxed together, multiple signals having different orthogonal functions or helicities applied thereto are located in a same signal. The muxed signals are spatially combined in a same signal.

As Spiral Phase plates can transform a plane wave (l=0) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Optical Fiber Communications Using OAM Multiplexing

OAM multiplexing may be implemented in fiber communications. OAM modes are essentially a group of higher order modes defined on a different basis as compared to other forms of modes in fiber, such as "linearly polarized" (LP) modes and fiber vector modes. In principle each of the mode sets form an orthogonal mode basis spanning the spatial domain, and may be used to transmit different data channels. Both LP modes and OAM modes face challenges of mode coupling when propagating in a fiber, and may also cause channel crosstalk problems.

In general, two approaches may be involved in fiber transmission using OAM multiplexing. The first approach is to implement OAM transmission in a regular few mode fiber such as that illustrated in FIG. 28. As is the case of SDM using LP modes, MIMO DSP is generally required to equalize the channel interface. The second approach is to utilize a specially designed vortex fiber that suffers from less mode coupling, and DSP equalization can therefore be saved for a certain distance of transmission.

OAM Transmission in Regular Few Mode Fiber

Figure 33:
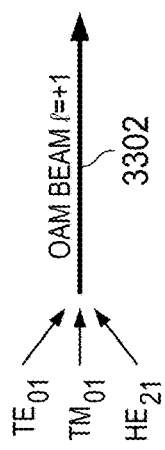
FIG. 33 illustrates a few mode fiber providing a linearly polarized OAM beam.

In a regular few mode fiber, each OAM mode represents approximately a linear combination of the true fiber modes (the solution to the wave equation in fiber). For example, as illustrated in FIG. 33, a linearly polarized OAM beam 3302 with l=+1 comprises the components of Eigen modes including $TE_{01}$, $TM_{01}$ and $HE_{21}$. Due to the perturbations or other non-idealities, OAM modes that are launched into a few mode fiber (FMF) may quickly coupled to each other, most likely manifesting in a group of LP modes at the fiber output. The mutual mode coupling in fiber may lead to inter-channel crosstalk and eventually failure of the transmission. One possible solution for the mode coupling effects is to use MIMO DSP in combination with coherent detection.

Figure 34:
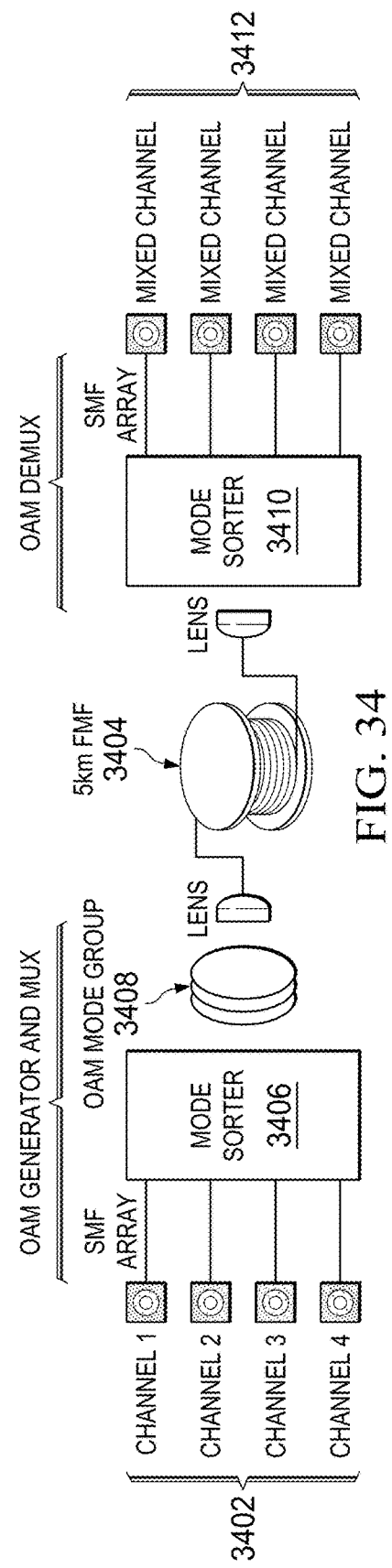
FIG. 34 illustrates the transmission of four OAM beams over a fiber.
Figure 35A:
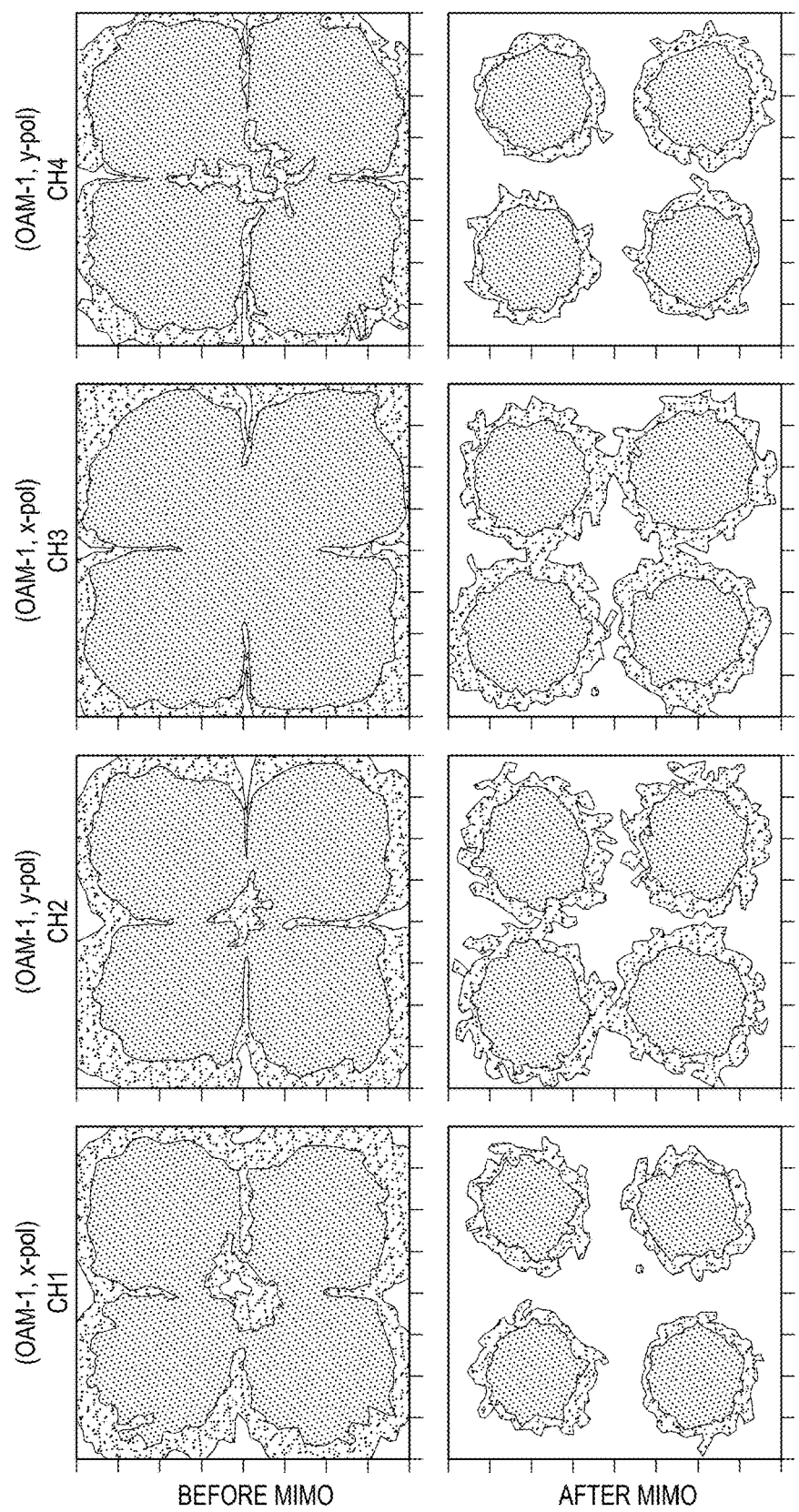
FIG. 35A illustrates the recovered constellations of 20 Gbit/sec QPSK signals carried on each OAM beam of the device of FIG. 34.
Figure 35B:
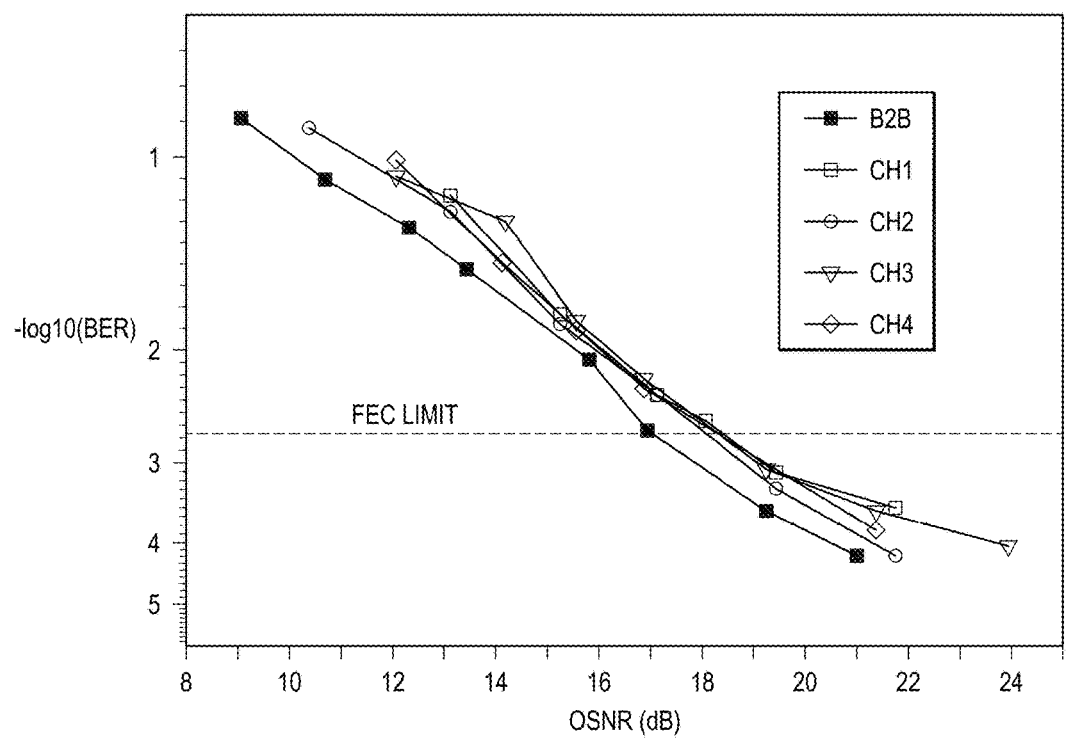
FIG. 35B illustrates the measured BER curves of the device of FIG. 34.

Referring now to FIG. 34, there is illustrated a demonstration of the transmission of four OAM beams (l=+1 and −1 each with 2 orthogonal polarization states), each carrying 20 Gbit/s QPSK data, in an approximately 5 kilometer regular FMF (few mode fiber) 3404. Four data channels 3402 (2 with x-pol and 2 with y-pol) were converted to pol-muxed OAM beams with l=+1 and −1 using an inverse mode sorter 3406. The pol-muxed to OAM beams 3408 (four in total) are coupled into the FMF 3404 for propagation. At the fiber output, the received modes were decomposed onto an OAM basis (l=+1 and −1) using a mode sorter 3410. In each of the two OAM components of light were coupled onto a fiber-based PBS for polarization demultiplexing. Each output 3412 is detected by a photodiode, followed by ADC (analog-to-digital converter) and off-line processing. To mitigate the inter-channel interference, a constant modulus algorithm is used to blindly estimate the channel crosstalk and compensate for the inter-channel interference using linear equalization. Eventually, the QPSK data carried on each OAM beam is recovered with the assistance of a MIMO DSP as illustrated in FIGS. 35A and 35B.

OAM Transmission in a Vortex Fiber

Figure 36:
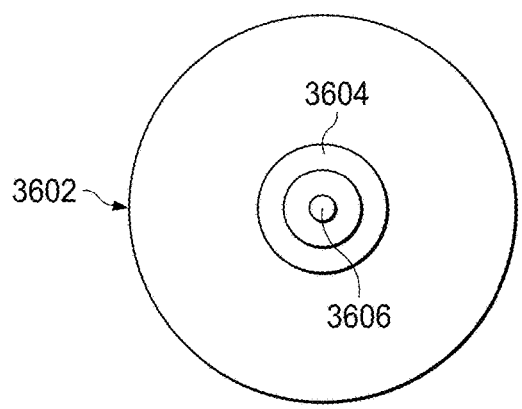
FIG. 36 illustrates a vortex fiber.

A key challenge for OAM multiplexing in conventional fibers is that different OAM modes tend to couple to each other during the transmission. The major reason for this is that in a conventional fiber OAM modes have a relatively small effective refractive index difference ($\Delta n_{eff}$). Stably transmitting an OAM mode in fiber requires some modifications of the fiber. One manner for stably transmitting OAM modes uses a vortex fiber such as that illustrated in FIG. 36. A vortex fiber 3602 is a specially designed a few mode fiber including an additional high index ring 3604 around the fiber core 3606. The design increases the effective index differences of modes and therefore reduces the mutual mode coupling.

Using this vortex fiber 3602, two OAM modes with l=+1 and −1 and two polarizations multiplexed fundamental modes were transmitted together for 1.1 km. The measured mode cross talk between two OAM modes was approximately −20 dB. These four distinct modes were used to each carried a 100 Gbuad QPSK signal at the same wavelength and simultaneously propagate in the vortex fiber. After the mode demultiplexing, all data was recovered with a power penalty of approximately 4.1 dB, which could be attributed to the multipath effects and mode cross talk. In a further example, WDM was added to further extend the capacity of a vortex fiber transmission system. A 20 channel fiber link using to OAM modes and 10 WDM channels (from 1546.642 nm to 1553.88 nm), each channel sending 80 Gb/s 16-QAM signal was demonstrated, resulting in a total transmission capacity of 1.2 Tb/s under the FEC limit.

There are additional innovative efforts being made to design and fabricate fibers that are more suitable for OAM multiplexing. A recently reported air-core fiber has been demonstrated to further increase the refractive index difference of eigenmodes such that the fiber is able to stably transmit 12 OAM states (l=±7, ±8 and ±9, each with two orthogonal polarizations) for 2 m. A few mode fibers having an inverse parabolic graded index profile in which propagating 8 OAM orders (l=±1 and ±2, each with two orthogonal polarizations) has been demonstrated over 1.1 km. The same group recently presented a newer version of an air core fiber, whereby the supported OAM states was increased to 16. One possible design that can further increase the supported OAM modes and a fiber is to use multiple high contrast indexed ring core structure which is indicated a good potential for OAM multiplexing for fiber communications.

Shorter Wavelength TX of OAM Beams in Conventional Single Mode Fiber

By using shorter wavelength transmissions of OAM beams the manner and number of mode couplings within a fiber can be controlled. The diameter of a core of a fiber determines how many spatial modes of OAM can be multiplexed into an optical fiber. However, the wavelength of the signal transmitted over the fiber is also a major driver. Thus, by controlling a ratio of the diameter of the fiber core to the wavelength of a transmitted signal the number of modes that may be transmitted in a fixed diameter fiber may be controlled and determined. By lowering the wavelength more OAM mode can be multiplexed into a given diameter fiber.

A generated 1064 nm or smaller wavelength OAM beam may be launched in free space and launched into a single mode fiber. In one example, the single mode fiber may comprise a SMF28e fiber. The SMF28e fiber is a commonly used fiber fabricated by Corning. The parameters of an SMF28e fiber include a regular operating wavelength from 1260 nm-1625 nm; a mode field diameter of 9.2 μm at 1310 nm and 10.4 μm at 1550 nm; a numerical field aperture of 0.14; cladding thickness of 125 μm; a cutoff wavelength of less than 1260 nm and the supported OAM at 1064 nm of OAM+1 mode, OAM−1 mode and Gaussian mode.

While the described system is made with respect to OAM signals and OAM modes, it should be realized that the system would also operate with respect to controlling crosstalk between modes for LaGuerre-Gaussian modes, Hermite-Gaussian modes, or Ince-Gaussian modes at lower wavelength transmissions when transmitting using LaGuerre-Gaussian functions, Hermite-Gaussian functions, or Ince-Gaussian functions.

Mode Purity

Figure 37A:
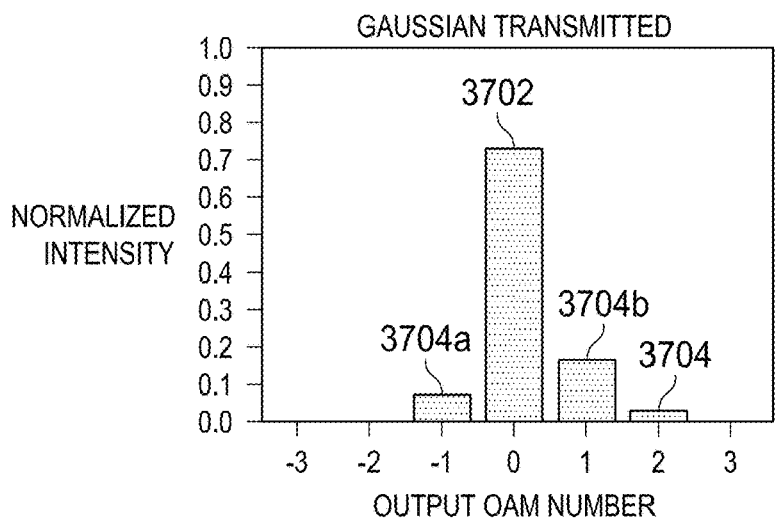
FIGS. 37A-C illustrate power leakage between adjacent modes in a single mode fiber.
Figure 37B:
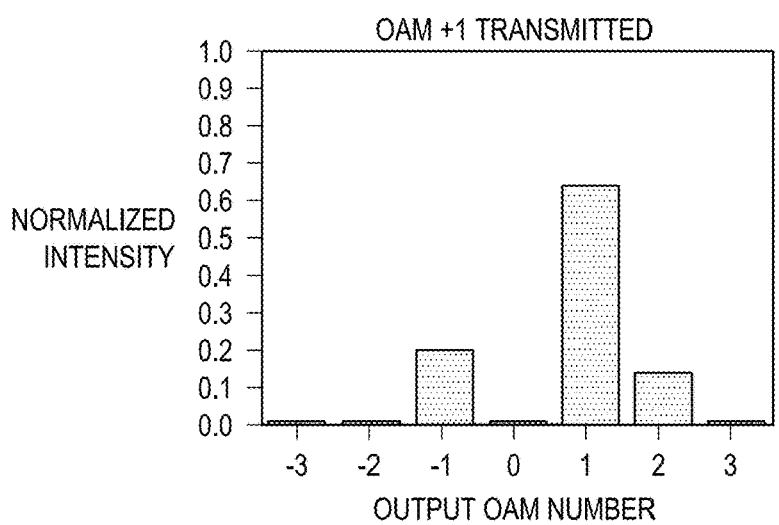
Figure 37C:
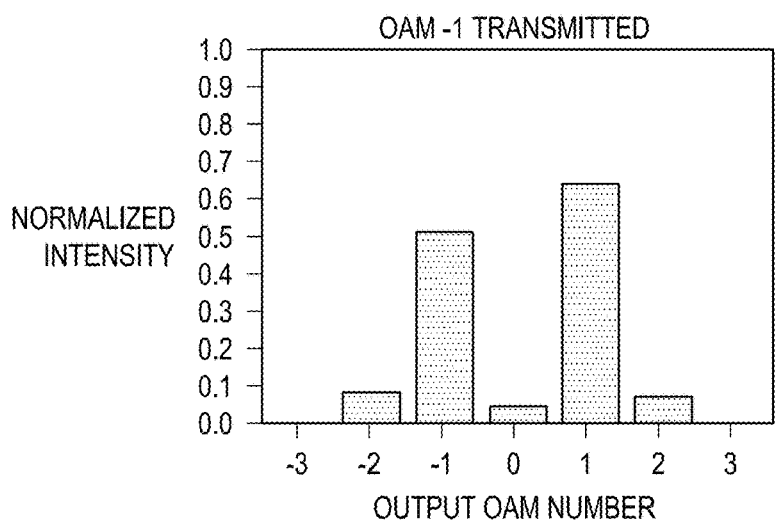
Figure 38:
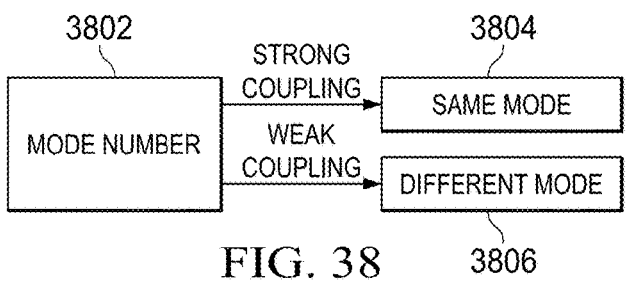
FIG. 38 illustrates mode coupling within a single mode fiber.

The mode purity of a 1064 nm wavelength OAM beam after propagating through a 2.2 km SMF28e fiber will have a small power leakage as illustrated in FIGS. 37a-37c. As shown in FIG. 37a, the Gaussian beam 3702 has very small power leakage to neighboring modes 3704. However, the OAM+1 mode 3704a and OAM−1 mode 3704b "cross talk" with each other. OAM+1 has some power leaked to OAM−1 but very little power leakage to other modes. OAM−1 has some power leaked to OAM+1 and very little power leaked to the other modes. The reason is that OAM+1 and OAM−1 are in the same mode group while the Gaussian beam 3702 is within another mode group. Thus, as illustrated in FIG. 38, after propagation in the SMF28e fiber, a mode 3802 will have strong coupling with modes in the same mode group 3804 and will have weak coupling with modes in different mode groups 3806. Thus, the mode 2002 will couple with modes in its own mode group but will not couple much with modes in different mode groups.

Power Loss

Figure 39:
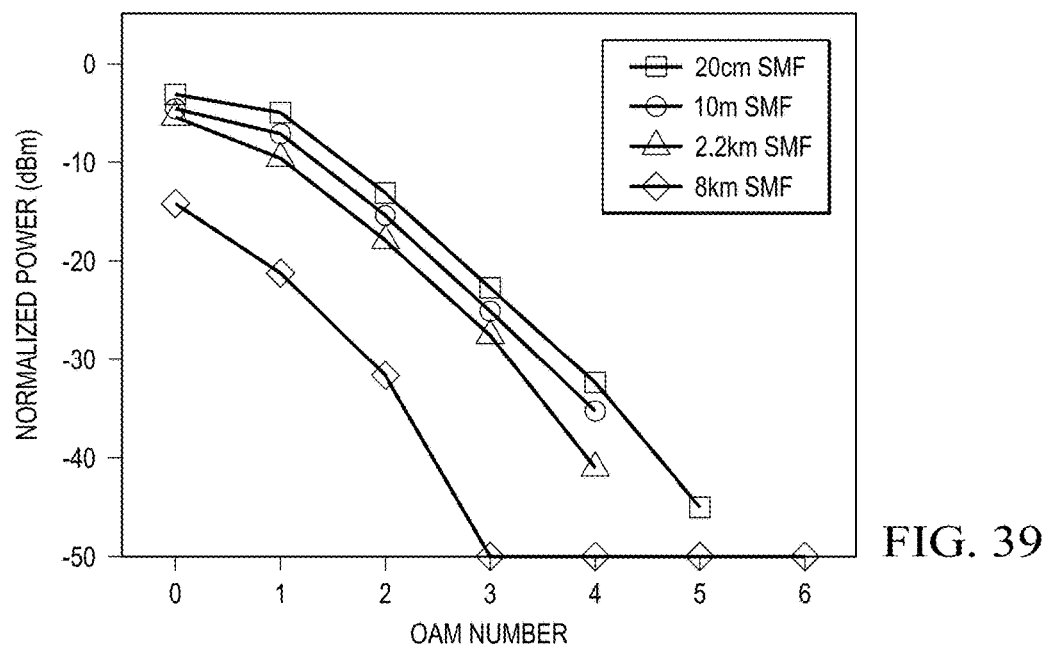
FIG. 39 illustrates power losses for different modes of OAM beams in a single mode fiber.

Referring now also to FIG. 39, there is illustrated the power loss for different orders of OAM beams after propagation through various lengths of SMF28e fiber. FIG. 39 illustrates the normalized power losses for a 20 cm single mode fiber, 10 m single mode fiber, 2.2 km single mode fiber and 8 km single mode fiber. By comparing the power loss of different lengths of fiber, the propagation power loss of the 1064 nm laser in the SMF28e fiber is approximately 1 dB/km. Most of the power of a Gaussian beam and an OAM+1 beam may be coupled into the SMF28e fiber, while very little power of the higher order (greater than one) OAM beams could be coupled into the SMF28e fiber. Theoretically, no power could be coupled into the fiber for OAM beams with an order greater than or equal to two. However, experimental results show that a little power of these beams is also coupled into the fiber. A number of factors may cause this including the generated OAM beam is not perfect (i.e., not 100% mode purity). For example, the generated OAM+2 beam has a little power leaked into the OAM+1 mode which could be coupled into the fiber. Another reason may be that the fiber launching system is not perfect and misalignment may lead to the OAM+2 beam being coupled to the OAM+1 mode or Gaussian mode. By comparing the power loss of different lengths of fiber, it may be determined that the propagation power loss of it the 1064 nm laser in the SMF28e fiber is approximately 1 dB per kilometer.

Intensity Profiles

Figure 40:
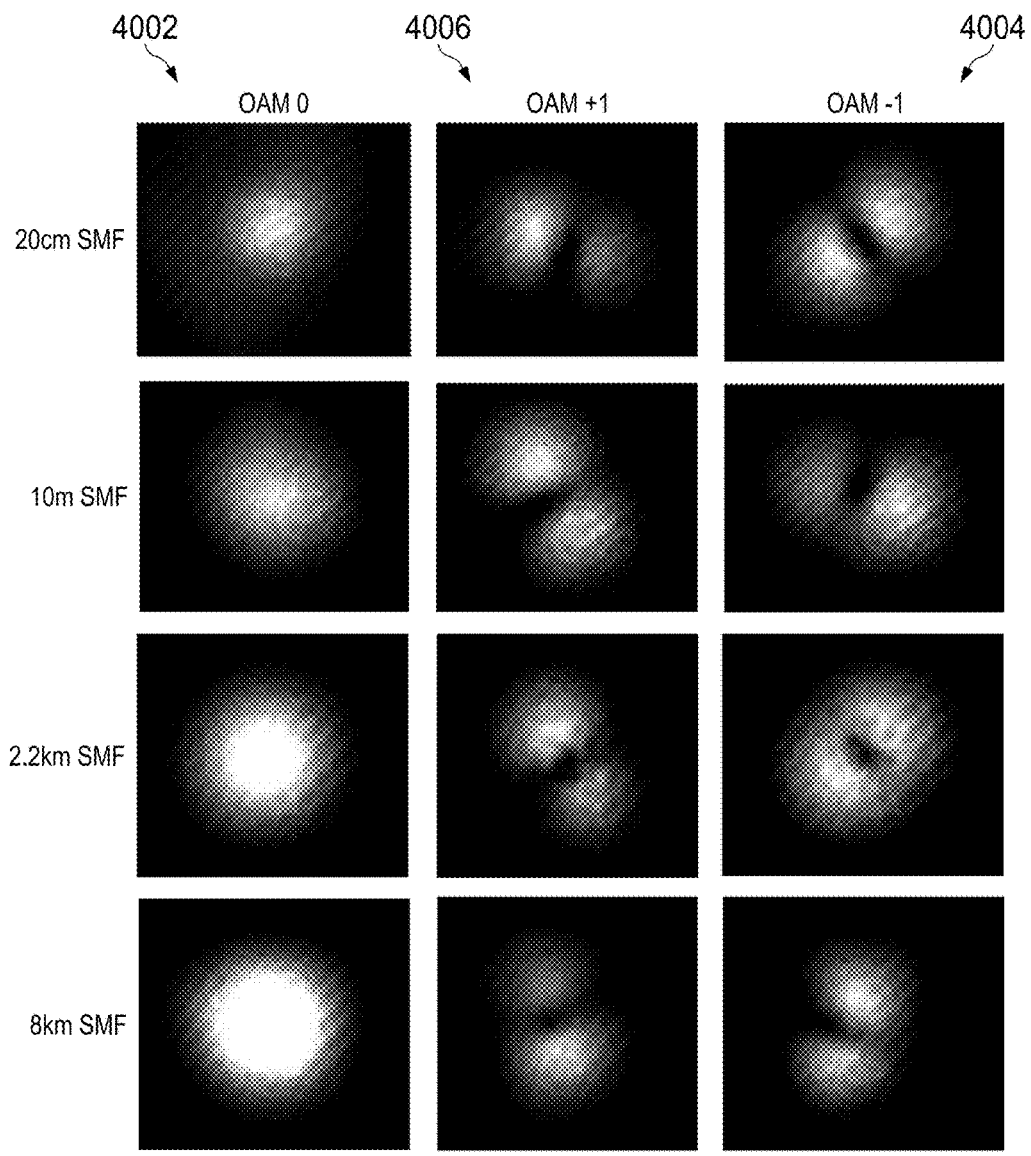
FIG. 40 illustrates intensity profiles for various modes of OAM beams after propagation over various length single mode fibers.

The intensity profiles of Gaussian, OAM−1 and OAM+1 modes after propagation through various lengths of SMF28e fiber are illustrated in FIG. 40. As can be seen, the intensity profiles for OAM 0, OAM+1 and OAM−1 are illustrated for 20 cm, 10 m, 2.2 km and 8 km single mode fibers. The intensity profiles illustrate that after propagation through the fiber, the Gaussian beam 4002 still maintains its ideal intensity shape. However, the intensity profile of OAM−1 4004 and OAM+1 4006 are no longer rings. The intensity profiles seem to become interface patterns between OAM−1 4004 and OAM+1 4006. This agrees with previous measurements indicating that Gaussian beams do not "crosstalk" with OAM−1 4004 or OAM+1 4006, while OAM−1 and OAM+1 "crosstalk" with each other.

Figure 41:
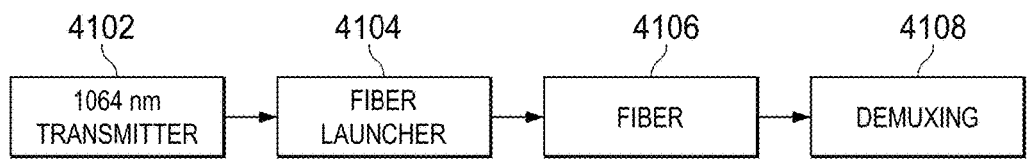
FIG. 41 illustrates a block diagram of a system for multiplexing signals onto a single mode fiber.

Referring now to FIG. 41, there is illustrated a block diagram of a system for multiplexing 1064 nm wavelength data carrying beams into an SMF28e fiber. A 1064 nm wavelength transmitter 4102 generates the light beam at the 1064 nm wavelength that is transmitted to a fiber launcher 4104. The fiber launcher 4104 launches the light beam for transmission through the SMF28e fiber 4106. The fiber launcher 4104 is not perfect and misalignment can lead to the OAM+2 mode coupling into the OAM+1 mode and Gaussian mode. The beam transmitted over the fiber is received at a demultiplexer 4108 wherein the received information is demultiplexed into the transmitted data carrying beams.

Figure 42:
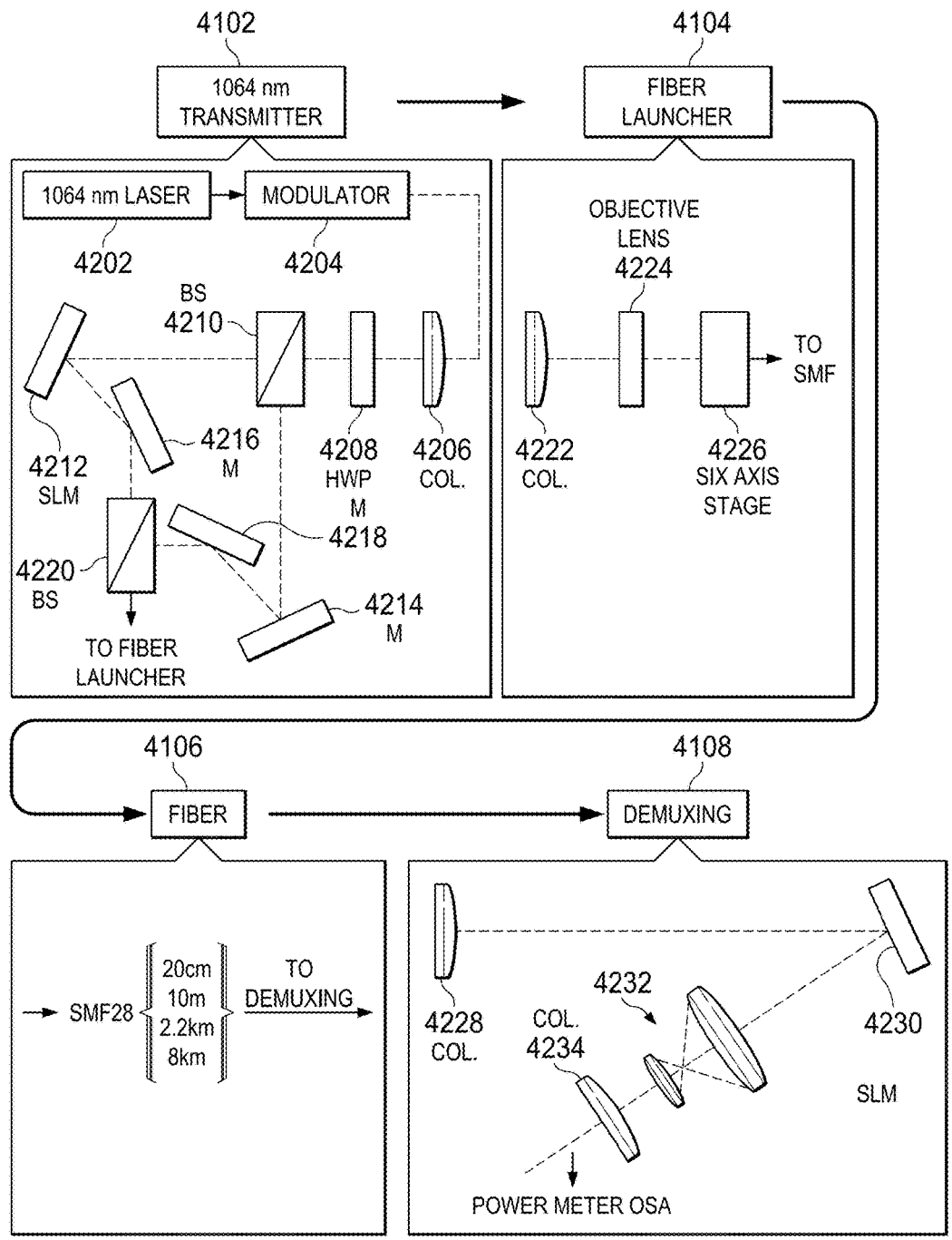
FIG. 42 provides a more detailed illustration of the components of FIG. 41.

Referring now also to FIG. 42, there is shown a more detailed view of the block diagram of FIG. 41. The transmitter 4102 includes a 1064 nm laser 4202 that transmits a beam through a modulator 4204. Collimator 4206 collimates to the beam for transmission through a half wave plate 4208. A beam splitter 4210 splits the beam into an SLM modulator 4212 for imparting the OAM signature thereto and to a mirror 4214. Each of the beams are further reflected off mirrors 4216 and 4218, respectively, to a further beam splitter 4220 which recombines the beams and provides the combined beam to the fiber launcher 4104.

The fiber launcher 4104 passes the beam through a collimator 4222 and objective lens 4224. Finally, the six axis stage 4226 further processes the beam before launching it over the single mode fiber 4106. The single mode fiber 4106 comprises the SMF28e fiber that may be a number of distances including 20 cm, 10 m, 2.2 km and 8 km as discussed earlier. The beam is transmitted over the fiber 4106 to demultiplexer circuitry 4108. The demultiplexer 4108 consists of a collimator 4228 that focuses the beam onto a spatial light modulator 4230. The beam from the spatial light modulator 4230 passes through a beam focusing lenses 4232 to a further collimator 4234. The collimated beam is shown on an optical spectrum analyzer in order to read the enclosed data.

Using the system of FIG. 42, the bit error rate of the 1064 nm wavelength multiplexed beam with OAM+1 and a Gaussian beam after transmission through various lengths of fiber may be measured. In addition to measuring the bit error rate of 1064 nm wavelength signals, the bit error rates of shorter wavelength signals may also be measured using the system of FIG. 42. Parameters such as distance traveled and mode purity also influence bit error rate.

In a further embodiment, for a 250 m elliptical core fiber, a fiber launcher for the elliptical core fiber may be set up. The cross talk among different LG modes and HG modes they then be tested and a mode division multiplexing data link set up through the elliptical core fiber according to the crosstalk measurements.

It will be appreciated by those skilled in the art having the benefit of this disclosure that this system and method for communication using orbital angular momentum provides improved transmission of shorter wavelengths OAM beams on a single mode fiber. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for transmission of orbital angular momentum (OAM) data over an optical fiber, comprising:
   generating an optical signal at a selected wavelength, wherein a ratio of a diameter of a core of the optical fiber to the selected wavelength of the optical signal enables transmission of a predetermined number of orbital angular momentum modes over the optical fiber, wherein generation of the selected wavelength at a first wavelength enables transmission of a first number of OAM modes over the optical fiber and generation of the selected wavelength at a second wavelength enables transmission of a second number of OAM modes over the optical fiber, further wherein the second wavelength of the optical signal is lower than the first wavelength of the optical signal and the second number of OAM modes is higher than the first number of OAM modes;
   modulating the optical signal with at least one input data stream;
   applying an OAM signal to the modulated optical signal to generate an OAM data signal;
   transmitting the OAM data signal over the optical fiber using a fiber launcher; and
   processing a received OAM data signal to extract the at least one input data stream.

2. The method of claim 1, wherein the optical fiber comprises a single mode fiber.

3. The method of claim 2, wherein the single mode fiber comprises an SMF28e fiber.

4. The method of claim 1, wherein the selected wavelength comprises 1064 nm.

5. The method of claim 1, wherein the step of applying further comprises applying the OAM signal that includes a plurality of modes, further wherein modes within a same mode group crosstalk with each other but modes within different mode groups have substantially no crosstalk with each other.

6. The method of claim 1, wherein the step of transmitting further comprises coupling power from the OAM data signal from OAM modes less than 2.

7. A method for transmission of data over an optical fiber, comprising:
   generating an optical signal at a selected wavelength, wherein a ratio of a diameter of a core of the optical fiber to the selected wavelength of the optical signal enables transmission of a predetermined number of orthogonal function modes over the optical fiber;

modulating the optical signal with at least one input data stream;

applying an orthogonal function to the modulated optical signal to generate a data signal;

transmitting the data signal over the optical fiber using a fiber launcher; and processing a received data signal to extract the at least one input data stream.

8. The method of claim 7, wherein generation of the selected wavelength at a first wavelength enables transmission of a first number of modes over the optical fiber and generation of the selected wavelength at a second wavelength enables transmission of a second number of modes over the optical fiber, further wherein the second wavelength of the optical signal is lower than the first wavelength of the optical signal and the second number of modes is higher than the first number of modes.

9. The method of claim 7, wherein the optical fiber comprises a single mode fiber.

10. The method of claim 9, wherein the single mode fiber comprises an SMF28e fiber.

11. The method of claim 7, wherein the selected wavelength comprises 1064 nm.

12. The method of claim 7, wherein the step of applying further comprises applying the data signal that includes a plurality of modes, further wherein modes within a same mode group crosstalk with each other but modes within different mode groups have substantially no crosstalk with each other.

13. The method of claim 7, wherein the step of transmitting further comprises coupling power from the data signal from modes less than 2.

14. The method of claim 7, wherein the orthogonal function comprises one of a Hermite-Gaussian function, a LaGuerre-Gaussian function and an Ince-Gaussian function.

15. A system for transmission of data over an optical fiber, comprising:

a laser for generating an optical signal at a selected wavelength, the laser generating the optical signal that has a ratio of a diameter of a core of the optical fiber to the selected wavelength of the optical signal that enables transmission of a predetermined number of orbital angular momentum modes over the optical fiber;

a modulator for modulating the optical signal with at least one input data stream;

an orthogonal function generator for generating and applying an orthogonal function to the modulated optical signal to generate a data signal;

a fiber launcher for receiving the data signal and transmitting the data signal over the optical fiber; and a demultiplexer for receiving the data signal and processing the received data signal to extract the at least one input data stream.

16. The system of claim 15, wherein the laser generates the selected wavelength at a first wavelength enabling transmission of a first number of modes over the optical fiber and generates the selected wavelength at a second wavelength enabling transmission of a second number of modes over the optical fiber, wherein the second wavelength of the optical signal is lower than the first wavelength of the optical signal and the second number of modes is higher than the first number of modes.

17. The system of claim 15, wherein the optical fiber comprises a single mode fiber.

18. The system of claim 17, wherein the single mode fiber comprises an SMF28e fiber.

19. The system of claim 15, wherein the selected wavelength comprises 1064 nm.

20. The system of claim 15, wherein the data signal transmitted on the optical fiber includes a plurality of modes, further wherein modes within a same mode group crosstalk with each other on the optical fiber modes but within different mode groups have substantially no crosstalk with each other on the optical fiber.

21. The system of claim 15, wherein the fiber launcher couples power from the data signal from modes less than 2 onto the optical fiber.

22. The system of claim 15, wherein the orthogonal function comprises one of a Hermite-Gaussian function, a LaGuerre-Gaussian function and an Ince-Gaussian function.

23. The system of claim 15, wherein the orthogonal function generator comprise a spatial light modulator.

24. A method for transmission of orbital angular momentum (OAM) data over an optical fiber, comprising:

generating an optical signal at a selected wavelength, wherein a ratio of a diameter of a core of the optical fiber to the selected wavelength of the optical signal enables transmission of a predetermined number of orbital angular momentum modes over the optical fiber, wherein the optical fiber comprises a single mode fiber;

modulating the optical signal with at least one input data stream;

applying an OAM signal to the modulated optical signal to generate an OAM data signal;

transmitting the OAM data signal over the optical fiber using a fiber launcher; and processing a received OAM data signal to extract the at least one input data stream.

* * * * *